US006301339B1

(12) United States Patent
Staples et al.

(10) Patent No.: US 6,301,339 B1
(45) Date of Patent: *Oct. 9, 2001

(54) SYSTEM AND METHOD FOR PROVIDING A REMOTE USER WITH A VIRTUAL PRESENCE TO AN OFFICE

(75) Inventors: Leven E. Staples, Granbury; W. B. Barker; Ken Witt, both of San Antonio, all of TX (US)

(73) Assignee: Data Race, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/995,765

(22) Filed: Dec. 22, 1997

Related U.S. Application Data

(63) Continuation-in-part of application No. 08/740,775, filed on Nov. 1, 1996, which is a continuation of application No. 08/559,472, filed on Nov. 15, 1995, now Pat. No. 5,764,639, which is a continuation-in-part of application No. 08/708,267, filed on Sep. 6, 1996.

(51) Int. Cl.[7] .................................................. H04M 11/00
(52) U.S. Cl. ..................................... 379/93.01; 379/93.21; 379/211
(58) Field of Search ........................ 379/100.09, 100.17, 379/100.01, 93.08, 93.17, 93.21, 211, 93.07, 93.05, 93.09, 93.01, 93.14

(56) References Cited

U.S. PATENT DOCUMENTS

| 3,072,746 | 1/1963 | Zimmerman . |
| 3,334,190 | 8/1967 | Jenkins et al. . |
| 3,363,063 | 1/1968 | Kandel et al. . |

(List continued on next page.)

FOREIGN PATENT DOCUMENTS

| 43 29 172 | 8/1993 | (DE) . |
| 0 367 455 A2 | 5/1990 | (EP) . |
| 0 536 949 A2 | 4/1993 | (EP) . |

(List continued on next page.)

OTHER PUBLICATIONS

"Office Features on Home Phones," Internet Week/CMP Publications, Dec. 12, 1994, 1 page.
"Remote Telemarketing Technology Introduced," Telecommuting Review, Information Access Company, a Thomson Corporation Company, Apr. 1, 1992, 2 pages.
"The World," Radio Communications Report, Crain Communications, Inc., Sep. 19, 1994, 2 pages.

(List continued on next page.)

Primary Examiner—Stella Woo
(74) Attorney, Agent, or Firm—Conley, Rose & Tayon, PC; Robert C. Kowert; Jeffrey C. Hood

(57) ABSTRACT

Disclosed is a system and method for providing a remote user with a virtual presence to an office. The method allows a user operating a remote computer system to receive a fax on a first communication line while simultaneously performing voice communications on the first communication line. The first communication line has an associated first telephone number. The remote computer system includes a user telephony communication device coupled to the first communication line. The method includes establishing a connection between the user telephony communication device and a virtual presence server. The user telephony communication device connects through the first communication line to the virtual presence server. The virtual presence server is located remotely from the user telephone communication device. A fax transmission is made to a second telephone number. The fax transmission is forwarded to the virtual presence server. The virtual presence server transits the fax transmission to the user telephony communication device. The user telephony communication device performs voice communications on the first communications line as the virtual presence server transmits the fax transmission to the user telephony communication device. The user telephony communication device is operable to receive the fax transmission for display by the user.

112 Claims, 47 Drawing Sheets

U.S. PATENT DOCUMENTS

| | | |
|---|---|---|
| 3,406,262 | 10/1968 | Grandstaff . |
| 3,409,741 | 11/1968 | Odom . |
| 3,427,402 | 2/1969 | Stokes . |
| 3,469,036 | 9/1969 | Meri . |
| 3,484,561 | 12/1969 | Matthews . |
| 3,531,597 | 9/1970 | Andrews et al. . |
| 3,573,389 | 4/1971 | Greenstein et al. . |
| 3,959,600 | 5/1976 | Sousa . |
| 4,247,571 | 1/1981 | Flament . |
| 4,313,036 | 1/1982 | Jabara et al. . |
| 4,348,554 | 9/1982 | Asmuth . |
| 4,546,212 | 10/1985 | Crowder et al. . |
| 4,547,880 | 10/1985 | De Vita et al. . |
| 4,757,267 | 7/1988 | Riskin . |
| 4,757,495 | 7/1988 | Decker et al. . |
| 4,792,967 | 12/1988 | Ladd et al. . |
| 4,812,786 | 3/1989 | Davarian et al. . |
| 4,899,373 | 2/1990 | Lee et al. . |
| 4,914,619 | 4/1990 | Harris et al. . |
| 5,012,511 | 4/1991 | Hanle et al. . |
| 5,023,868 | 6/1991 | Davidson et al. . |
| 5,073,890 | 12/1991 | Danielsen . |
| 5,077,789 | 12/1991 | Clark, Jr. et al. . |
| 5,159,592 | 10/1992 | Perkins . |
| 5,159,594 | 10/1992 | Bales et al. . |
| 5,164,982 | 11/1992 | Davis . |
| 5,173,934 | 12/1992 | Marquet et al. . |
| 5,185,742 | 2/1993 | Bales et al. . |
| 5,206,899 | 4/1993 | Gupta et al. . |
| 5,214,641 | 5/1993 | Chen et al. . |
| 5,287,199 * | 2/1994 | Zoccolillo ..................... 379/100.09 |
| 5,289,528 | 2/1994 | Ueno et al. . |
| 5,291,551 | 3/1994 | Conn et al. . |
| 5,315,647 | 5/1994 | Araujo . |
| 5,323,398 * | 6/1994 | Wake et al. ..................... 379/100.17 |
| 5,361,295 | 11/1994 | Solomon et al. . |
| 5,392,345 | 2/1995 | Otto . |
| 5,392,346 | 2/1995 | Hassler et al. . |
| 5,410,543 | 4/1995 | Seitz et al. . |
| 5,416,834 | 5/1995 | Bales et al. . |
| 5,422,940 | 6/1995 | Endo et al. . |
| 5,428,608 | 6/1995 | Freeman et al. . |
| 5,450,482 | 9/1995 | Chen et al. . |
| 5,452,347 | 9/1995 | Iglehart et al. . |
| 5,459,780 | 10/1995 | Sand . |
| 5,471,318 | 11/1995 | Ahuja et al. . |
| 5,490,212 | 2/1996 | Lautenschlager . |
| 5,513,251 | 4/1996 | Rochkind et al. . |
| 5,533,102 | 7/1996 | Robinson et al. . |
| 5,537,401 | 7/1996 | Tadamura et al. . |
| 5,544,229 | 8/1996 | Creswell et al. . |
| 5,546,452 | 8/1996 | Andrews et al. . |
| 5,548,636 | 8/1996 | Bannister et al. . |
| 5,550,906 | 8/1996 | Chau et al. . |
| 5,577,110 | 11/1996 | Aquino . |
| 5,583,862 | 12/1996 | Callon . |
| 5,583,997 | 12/1996 | Hart . |
| 5,598,536 | 1/1997 | Slaughter, III et al. . |
| 5,602,846 | 2/1997 | Holmquist et al. . |
| 5,619,557 | 4/1997 | Van Berkum . |
| 5,625,681 | 4/1997 | Butler, II . |
| 5,636,218 | 6/1997 | Ishikawa et al. . |
| 5,649,105 | 7/1997 | Aldred et al. . |
| 5,652,866 | 7/1997 | Aldred et al. . |
| 5,657,377 | 8/1997 | Pinard et al. . |
| 5,657,383 | 8/1997 | Gerber et al. . |
| 5,689,550 | 11/1997 | Garson et al. . |
| 5,689,553 | 11/1997 | Abuja et al. . |
| 5,703,943 | 12/1997 | Otto . |
| 5,737,333 | 4/1998 | Civanlar et al. . |
| 5,742,675 | 4/1998 | Kilander et al. . |
| 5,751,338 | 5/1998 | Ludwig, Jr. . |
| 5,764,279 * | 6/1998 | Ford et al. ..................... 379/100.17 |
| 5,764,639 * | 6/1998 | Staples et al. ..................... 379/93.02 |
| 5,784,546 | 7/1998 | Benman, Jr. . |
| 5,805,587 | 9/1998 | Norris et al. . |
| 5,809,128 | 9/1998 | McMullin . |
| 5,812,533 | 9/1998 | Cox et al. . |
| 5,812,786 | 9/1998 | Seazholtz et al. . |
| 5,812,819 | 9/1998 | Rodwin et al. . |
| 5,828,746 | 10/1998 | Ardon . |
| 5,870,465 * | 2/1999 | Hosbach et al. .................. 379/93.07 |

FOREIGN PATENT DOCUMENTS

| | | |
|---|---|---|
| 590863 | 4/1994 | (EP) . |
| 2270814 | 3/1994 | (GB) . |
| 2271912 | 4/1994 | (GB) . |
| 2280334 | 1/1995 | (GB) . |
| 2 259 627 | 7/1995 | (GB) . |
| 2 287 610 | 9/1995 | (GB) . |
| 97/47127 | 12/1997 | (WO) . |

OTHER PUBLICATIONS

"Mitel's Remarkable Vision," Computer Technology, Jan. 1995, 2 pages.

"Revitalize Your Clunker Phone System with Magic," Computer Technology, Jan. 1995, 2 pages.

"Call Forwarding," Byte, McGraw–Hill, Inc., May 1988, 2 pages.

"Third IEEE Conference on Telecommunications," Institute of Electrical and Electronics Engineers, 6 pages.

"Corporate Networking Applications," AT&T Technical Journal, Sep./Oct. 1991, 9 pages.

"ISDN Centrex Applications in a Large Multinational Company," Institute of Electrical and Electronics Engineers, 1992, 7 pages.

"Mobility and Private Networks," International Switching Systems, Oct. 1992, vol. 1, X000337613, 6 pages.

"Implementation of the Intelligent Network in France," Electrical Communication, vol. 63, No. 4, 1989, pp. 337–338.

"Services Offered by Intelligent Networks," Electrical Communication, vol. 63, No. 4, 1989, pp. 331–336.

"ISDN Professional Services," Electrical Communication, vol. 65, No. 1, 1989, pp. 366–373.

"Intelligent Networks: Dedicated to Services," Electrical Communication, vol. 65, No. 1, 1991, 6 pages.

"Corporate Networks," Electrical Communication, vol. 65, No. 1, 1991, pp. 32–37.

"International Virtual Private Network Service," Proceedings International Council for Computer Communications Intelligent Networks,May 4–6, 1992, 18 pages.

"Virtual Private Network Call Processing in the Intelligent Network," Institute of Electrical and Electronics Engineers, vol. 2, Paper 321.1, 1992, 5 pages.

"Dynamic Virtual Communications Networks: The Telcom Europe Range," Communication and Transmission, Bol. 14, No. 1, 10 pages.

"Fourth Institute of Electrical and Electronics Engineers Conference on Telecommunications," Institute of Electrical and Electronics Engineers, Apr. 18–21, 1993, pp. 31–36.

"Virtual Private Networks in Europe," Institute of Electrical and Electronics Engineers, Apr. 18–21, 1993, pp. 334–338.

"Virtual Offices," Institute of Electrical and Electronics Engineers, 1993, 3 pages.

"AT&T Delivers First Product For New Multimedia Networks," News Release, Oct. 30, 1995, AT&T, 5 pages.
"AT&T's Voice, LAN Plan", Communications Week, Oct. 30, 1995, 5 pages.
"InSoft Communique!™ Key Component In AT&T GBCS New Multimedia Communications System", InSoft, Oct. 30, 1995, New York City, NY, 2 pages.
"AT&T Spins Off a Killer App for ATM", Data Communications Wan Views, By Robin Layland, Editor, Nov. 1995, 2 pages.
Museum of Radio and Television, Announcement Remarks by Pat Russo, Oct. 30, 1995, New York, NY, 17 pages.
"Vision 2000, The Multimedia Age: Business Communication in the $21^{st}$ Century", AT&T Global Business Communications Systems, Oct. 1995, 13 pages.
"MultiMux", MMV101 Series Data/Voice/Fax Concentrator, Multi Systems, Copyright by Multi–Tech Systems, Inc., 1995, Sections 1–7, Appendices A–I, Glossary, Index.
"A Next Generation Private Personal Communication System", Ohta, et al., Systems Development Laboratory, Japan, ISS, Apr. 23, 1995, vol. 1, 5 pages.
"HP Introduces Dial A LAN", CMP Publications, Inc., InternetWeek, May 22, 1995, 1 page.
Howard Baldwin, Publication, Information Access Company, a Thomson Corporation Company ASAP Ziff–Davis Publishing Company, PC–Computing, May 1995, vol. 8, No. 5, p. 150, ISSN: 0899–1847, 10 pages.
Mier, et al. "Product Testing—Remote LAN Access", CMP Publications, Inc., InternetWeek, Aug. 21, 1995, 5 pages.
Bill Whyte, "The World at Work and Play", British Telecommunications Engineering, vol. 14, Oct. 1995, pp. 233–239.
"Virtual Office Runs on Telecommunications", Managing Office Technology, Jun. 1994, pp. 57–58.
Tom Thompson, "System 7.5: A Step Toward the Future", Section: Core Technologies; Operating Systems; vol. 19, No. 8, p. 187, Copyright 1994 McGraw–Hill, Inc., BYTE, 4 pages.
Michael Cooney, "NetLink Switches to SNA/LAN Market", Section: Enterprise Internets; p. 15, Copyright 1994 Network World, Inc. Aug. 1, 1994, 1 page.
"Sync and Async Share a Box", Section: New Products; Remote Access Devices; vol. 23, No. 12, p. 154, Copyright 1994 CMP Media, Inc., Data Communications, Sep. 1994, 1 page.
Michael Csenger, "Firm Offers Multipurpose Comm Server", Section: Enterprise Internets; LAN/WAN Integration, p. 19, Copyright 1994 Network World, Inc., Oct. 17, 1994, 2 pages.
Section: Global Services; Briefs; p. 31, "Briefs", Network World, Jan. 23, 1995, 1 page.
By Joanie M. Wexler, Cw Staff, "Remote User Please Reach Vendor Ears", Section :News; Networld '93, p. 12, Copyright 1993 ComputerWorld, Inc. Oct. 11, 1993, 2 pages.
Jim Seymour, "A New Industry . . . ", Section: vol. 11; No. 9; p. 61; ISSN: 0740–1604, Copyright 1994 Information Access Company, A Thomson Corporation Company ASAP Copyright 1994 Ziff–Davis Publishing Company, PC Week, Mar. 7, 1994, 2 pages.
Ken Siegal, "The Week In Review", Section: vol. 11; No. 16; p. 4; ISSN: 0740–1604, Copyright 1994 Information Access Company, a Thomson Corporation Company ASAP Copyright 1994 Ziff–Davis Publishing Company, PC Week, Apr. 25, 1994, 2 pages.

"Telecommuting Review: the Gordon Report", Section: vol. 9; No. 9; p. 2; ISSN: 8756–7431, Copyright 1994 Information Access Company, a Thomson Corporation Company ASAP Copyright 1992 Gil Gordon Associates, Sep. 1, 1992, 3 pages.
"Intel Speeds Up Remote Access with ISDN . . . " PC Week, Section: vol. 11; No. 16; p. N11; ISSN: 0740–1604, Copyright 1994 Information Access Company, a Thomson Corporation Company ASAP Copyright 1994 Ziff–Davis Publishing Company, Apr. 25, 1994, 1 page.
Ahuja, et al., "The Rapport Multimedia Conferencing System", Conference on Office Information Systems, Mar. 23–25, 1988, Palo Alto, CA, Sponsored by ACM SIGOIS and IEEECS TC–OA.
"Evolution in Business Networking", Business Services Portfolio, 1988, pp. 23–31.
Intelligent Network Control of Private Virtual Network Service Using The Service Control Point.
"Special Services (SS) and virtual Private Network (VPN) Planning", A. Chatterjee, Phoenix, AZ, IEEE, 1987, 7 pages.
"Teleworking and Teleconferencing", Computing and Control Division, Digest No.: 1994/144, Jun. 7, 1994, 9 pages.
"Micom Devices Links Data, Voice, Fax, LAN Communications; . . . ", Section: vol. 11; No.; 31; p. 56; ISSN: 0740–1604, Copyright 1994 Information Access Company, a Thomson Corporation Company ASAP Copyright 1994 Ziff–Davis Publishing Company, PC Week, Aug. 8, 1994, 1 page.
Lind, Y., "Virtual Networking: The New Battleground for Hub/Router Vendors", IEE 1995, Telecommunications (International Edition) vol. 28, No. 11, p. 124, 126, 3 page.
Suzanne Neufang, "Telecommuting and Techno–Work Solutions", PTC '95', Proceedings, Pacific Telecommunications Council Seventeenth Annual Conference, Jan. 22–26, 1995, Sheraton Waikiki Hotel, Honolulu, Hawaii, 7 pages.
Ahuja, et al. "Multimedia Collaboration", AT&T Technical Journal, Sep./Oct. 1995, 8 pages.
Article "Law Firm Builds Remote Access For Roving Teams", Nov. 1995, CN, 1 page.
"Telecommuting Still Limited, But Growing", Communications News, Dec. 1993, pp. 30 and 35.
"Call Forwarding", BYTE, 1988, McGraw–Hill, Inc., 2 pages.
"Corporate Networks—Requirements and Objectives", Telecom Report, vol. 16, No. 5, Se./Oct. 1993, 30 pages.
"Revitalize Your Clunker Phone System With Magic", Computer Technology, Jan. 1995, 2 pages.
The Telephony Server and the Communicating PC Client, Teleconnect, No.4, vo. 13, Apr. 1995, 5 pages.
"New Protocol Positions Telecom as Just Another Computer Peripheral", Computer Technology Review, Summer 1993, vol. 13, No. 11, 4 pages.
"Syntu Intros Magic Call Management", Newsbytes, Nov. 7, 1994, 1 page.
"Telecommuter Module User Guide, Issue 1.1", AT&T, Jun. 1995, 62 pages.
"Telecommuter Module User Guide Issue 1", AT&T, Oct. 1994, 74 pages.
"ISDN Watch", Computer Technology, Oct. 1, 1995, 12 pages.
"Hayes to Ship 28.8 Modem With Messaging", Newsbytes, Jun. 14, 1995, 12 pages.
"PBX Functionality in the Field", Communications Week, Feb. 6, 1995.

"Talking Data", OEM Magazine, Jun. 1994, 2 pages.

Data Race, Inc. vs. Lucent Technologies, Inc., "Video Deposition of Data Race, Inc., by and through its designated representative, Kenneth L. Witt", Oct. 27, 1998, vol. 1 or 2, pages.

Data Race, Inc. vs. Lucent Technologies, Inc., Oral Deposition of Leven Staples, Apr. 21, 1999, 51 pages.

"Multi–Tech Granted Second DSVD patent", Multi–Tech Systems, Inc. 1995, 2 pages.

"Telecommute with the MCK Off Premise Extender and Your Company Hits Home", MCK Telecommunications, Inc., 1995, 6 pages.

"Dial–Up Desktop", PC Magazine, Jul. 1995, 7 pages.

"AT&T Microelectronics to License Multi–Tech DSVD Modem Technology", Multi–Tech Systems, Inc., SVD Licenses, Jun. 21, 1995, 2 pages.

"Remote Access Market and Computer Telephony Market", Letter to Data Race, Jul. 31, 1995, 2 pages.

"Making the Highest Performance Product Even More User Friendly", LAN Access, Dec. 23, 1994, 2 pages.

"Remote Access Technology: Evaluating the Options", Telecommunications, Jul. 1994, 5 pages.

"Technology and Market Drivers in the Remote Access Marketplace", Maureen Molloy, Telecommunications, Jul. 1994, 4 pages.

"Meridian Off–Premise Extender", Computer Technology Interface Operations, MCK Telecommunications, Original Feb. 1994, Revision Mar. 17, 1995, 88 pages.

"Apple Remote Access Personal Server User's Guide for Macintosh", Apple Computers, Inc., 1993, Chapters 1–4, Appendices A–B, pp. 1–64.

"Multi–Tech's Voice & Data ISDN Adapter", Communications Week, Apr. 24, 1995, 1 page.

"EXTender 1000 for POTS Lines", MCK Communications, 1997, 4 pages.

"EXTender 2000c for ISDN", MCK Communications, 1997, 4 pages.

"Now There's a Better Way to Commute", Teltone Office Link, Teltone, 1992, 2 pages.

"Multi–Tech Shipping Enhanced Voice/Data/Fax Concentrator for Telecommuters", Multi–Tech Systems, Inc., Mar. 28, 1995.

"MCK Off Premise Extender Systems. The Most Computer Communications For Offsite Workstations", MCK Communications, Inc., 1996, 13 pages.

"Ex–Digital Off–Premise Extender", Installation Manual, MCK Telecommunications, Inc., original May 1992, revision Jun. 1994, 29 pages.

"Multi–Tech Announces MultiMux MMV101 Models Featuring Integrated ISDN and IP/IPX Routing Capabilities", Multi–Tech Systems, Nov. 5, 1995, 4 pages.

"Virtual Networks: Past, Present and Future", IEEE Communications magazine, Mar. 1992, 6 pages.

"Remote Access", CN, Nov. 1995, p. 33.

"New Products", CN, Jul. 1995, p. 57.

"MultiMedia Calling Whitepaper", AT&T, 11 pages.

"Local and Wide Area Network Considerations: An AT&T MultiMedia Communications eXchange White Paper", AT&T, 10 pages.

"Communications Middleware White Paper", AT&T, 14 pages.

"AT&T Technology Products, Systems and Services", AT&T, 6 pages.

"MCK Telecommunications, Model 843/844", MCK Telecommunications, 3 pages.

"MCK Analog Extender", MCK Communications, Inc., 2 pages.

"843 Technical Description".

"Definitiy Off–Premise Extender", MCK Communications, Inc., 16 pages.

"AT&T's Transformation Strategy", Executive Summary, 11 pages.

"AT&T Multimedia Communications eXchange", Customer and Partner Comments, AT&T, 5 pages.

"AT&T MultiMeida Communications eXchange Server Backgrounder", AT&T, 4 pages.

"Workstation Communications Systems", IBM Technical Disclosure Bulletin, vol. 37, No. 9, Sep. 1994, 2 pages.

*Findings of Fact and Conclusions of Law and Memorandum Opinion*, Civil Action No. SA–98–CA–746–PMA, filed Oct. 29, 1999.

*The ITU Telecommunication Standardization Sector (ITU–T)*, Draft V.DSVD–S (Draft of Dec. 8, 1995), Copyright 1996, 22 pages.

*The ITU Telecommunication Standardization Sector (ITU–T)*, Draft V.75 (Draft of Feb. 2, 1996), pp. 1–23.

*Teltone OfficeLink*, Teltone advertising brochure (Pub. Jan. 10, 1995).

Patent Abstract of Japan, Publication No. 60030248, dated Feb. 15, 1985.

Dieter Hochreuter, Michael Nash, "Hicom 300—eine Vielfalt neuer Möglichkeiten," Telcom Report (Siemens), vol. 18, No. 5, Oct. 1995, München, DE, XP000543153, pp. 265–267.

International Search Report for PCT/US96/16455 dated Apr. 24, 1997.

* cited by examiner

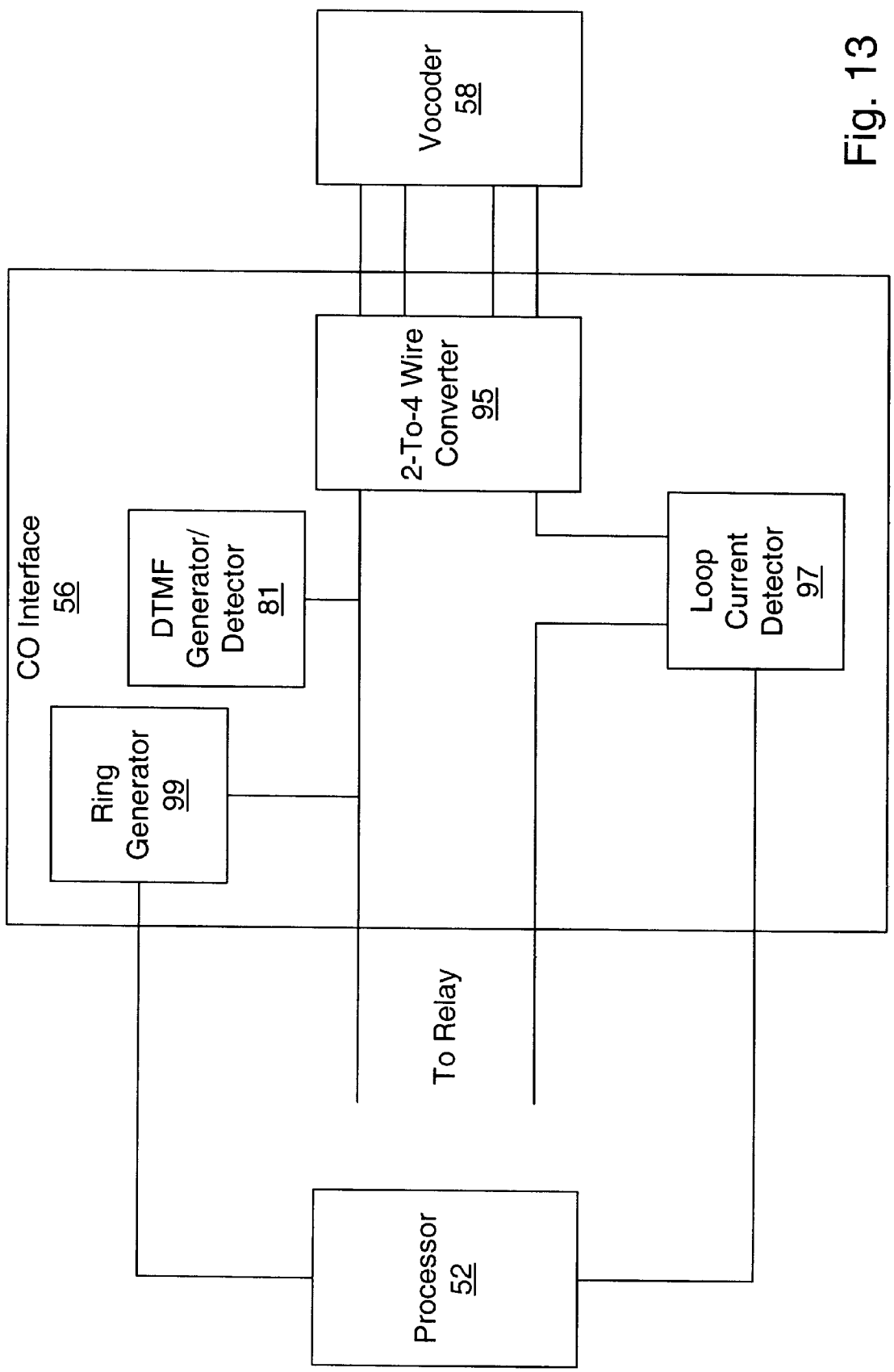

Fig. 28

| Name | Status | PBX # | User Conne... | Fwd From | Diag | F/W | PBX Type |
|---|---|---|---|---|---|---|---|
| COM11 | Offhook | 263-0403 | NT3 | | 1RB264 0... | 8.01a | AT&T 5ESS |
| COM12 | Disabled | 263-0404 | | | | 8.01a | AT&T 5ESS |
| COM13 | Connected | 263-0405 | NT4 | | 1LB288 00... | 8.01a | AT&T 5ESS |
| COM14 | Connected | 263-0406 | NT2 | | 1RR264 0... | 8.01a | AT&T 5ESS |
| COM15 | Connected | 263-0407 | NT5 | | 1RR240 0... | 8.01a | AT&T 5ESS |
| COM16 | Connected | 263-0408 | NT6 | | 1RB264 0... | 8.01a | AT&T 5ESS |
| COM17 | Connected | 263-0409 | NT8 | | 1LR264 00... | 8.01a | AT&T 5ESS |
| COM18 | Connected | 263-0410 | NT7 | | 1RR264 00... | 8.01a | AT&T 5ESS |
| COM19 | Connected | 263-0411 | NT1 | | 1RB240 0... | 8.01a | AT&T 5ESS |
| COM20 | Connected | 263-0412 | NT9 | | 1RF264 00... | 8.01a | AT&T 5ESS |
| COM21 | Offhook | 263-0413 | NT10 | | 1RB264 0... | 8.01a | AT&T 5ESS |
| COM22 | Connected | 263-0414 | NT11 | | 1LF264 00... | 8.01a | AT&T 5ESS |
| COM23 | Offhook | 263-0415 | NT12 | | 1RF264 00... | 8.01a | AT&T 5ESS |
| COM24 | Connected | 263-0416 | NT13 | | 1RF216 00... | 8.01a | AT&T 5ESS |
| COM25 | Connected | 263-0417 | NT14 | | 1RB240 0... | 8.01a | AT&T 5ESS |
| COM26 | Connected | 263-0418 | NT15 | | 1RF240 00... | 8.01a | AT&T 5ESS |
| COM27 | Connected | 263-0419 | NT16 | | 1LF240 00... | 8.01a | AT&T 5ESS |
| COM28 | Offhook | 263-0420 | Client3 | 263-2399 | 1RF216 00... | 8.01a | AT&T 5ESS |
| COM29 | Offhook | 263-0421 | Client5 | 263-2401 | 1LF240 00... | 8.01a | AT&T 5ESS |
| COM30 | Offhook | 263-0422 | Client4 | 263-2400 | 1LF240 00... | 8.01a | AT&T 5ESS |
| COM31 | Offhook | 263-0423 | cooperr | 263-2398 | 1LF240 00... | 8.01a | AT&T 5ESS |
| COM32 | Offhook | 263-0424 | Client1 | 263-2397 | 1LF240 00... | 8.01a | AT&T 5ESS |
| COM33 | Offhook | 263-0425 | Client2 | 263-2398 | 1LF240 00... | 8.01a | AT&T 5ESS |
| COM34 | Running | 263-0426 | | | | | |

SYSTEM AND METHOD FOR PROVIDING A REMOTE USER WITH A VIRTUAL PRESENCE TO AN OFFICE

CONTINUATION DATA

This is a continuation-in-part of co-pending U.S. application Ser. No. 08/740,775 titled "System And Method For Providing A Remote User With A Virtual Presence To An Office", and filed Nov. 1, 1996, whose inventors were Leven E. Staples, W. B. Barker and Kenneth L. Witt, and which was assigned to Data Race, Inc., which is a continuation of application Ser. No. 08/559,472 titled "System And Method For Providing A Remote User With A Virtual Presence To An Office", and filed Nov. 15, 1995, now U.S. Pat. No. 5,764,639, whose inventors were Leven E. Staples, W. B. Barker and Kenneth L. Witt, and which was assigned to Data Race, Inc.

This is also a continuation-in-part of co-pending application Ser. No. 08/708,267 titled "System And Method for Providing User Connectivity to a Remote Data Site on a Communication Line While Maintaining Telephone Connectivity on the Communication Line", and filed Sep. 6, 1996, whose inventor was W. B. Barker, and which was assigned to Data Race, Inc.

FIELD OF THE INVENTION

The present invention relates a system and method which provides connectivity between one or more remote users and a corporate office, wherein the remote users have a virtual presence at the corporate office, including access to the facilities and features provided by the corporate office telephone system and local area network, wherein the invention also provides the ability to receive home telephone calls on the same communication line used for the virtual presence connection.

DESCRIPTION OF THE RELATED ART

Connectivity between remote workers and an office is becoming increasingly important in today's business climate. Business people who travel, commonly referred to as "road warriors", desire to "stay connected" to the corporate office as much as possible. In addition, a current trend in business is the "telecommuter", e.g., an employee who works primarily at home and is remotely connected to the corporate office. Another recent trend in business is referred to as the "remote small office" (RSO) or "branch office" (BO), wherein a group of workers or employees are in a location remote from the company's headquarters or corporate office and are electronically connected to the corporate office.

In each of the above situations, the remote individuals require remote and transparent connectivity to the corporate office, including connectivity to the corporate office local area network (LAN) and the corporate office private branch exchange (PBX) or Centrex Facility. In the present disclosure, a PBX and a Centrex Facility, as well as other types of telephony server systems, are referred to collectively as a PBX for convenience. Further, the remote individuals desire a "virtual presence" at the corporate office, wherein the remote users operate remotely just as if they were physically located in the corporate office.

As corporations move away from mainframe based systems to PC based systems and local area networks (LANs), the options for remote connectivity have improved. In general, personal computers and LANs facilitate remote access to computing resources. Remote connectivity is also made possible with the arrival of affordable, reliable, digital telecommunications services and inexpensive network hardware. Currently, a variety of digital telecommunications services now support remote connections to enterprise networks, among these being Frame Relay, ISDN, Digital Data Service, and T1.

Current remote connectivity software solutions provide remote access between computer systems at different physical locations. For example, one class of remote connectivity software, referred to as "remote control software", allows a user at a local computer system to control and manipulate a remote computer system as if the user were present at the remote computer system. The user enters commands into the local computer, either through a command line or a graphical user interface (GUI), and software executing on the local computer transmits the commands from the local computer to the remote computer. The remote computer executes the commands and provides the output or response back to the local computer.

Applicant is aware of products from various PBX vendors which provide a degree of connectivity to the remote office based upon certain types of transmission media, such as ISDN. Applicant is specifically aware of a product from Siemens Rolm referred to as the Rolm Officepoint Communications system, which provides an integrated ISDN system for remote and small offices. Applicant is also aware of products offered by various remote access vendors which provide data only connectivity to the remote office. These products generally do not address the voice communication requirements of the user. Further, these products do not address the particular requirements of the road warrior.

Therefore, a system and method is desired which provides remote connectivity between a remote computer or communications device and a corporate office, wherein the system provides remote and transparent telephony and data access to the corporate office Private Branch Exchange (PBX) and local area network (LAN). A system and method is also desired which provides a remote user with a virtual presence at the corporate office, including access to all of the facilities and features of the corporate office PBX and LAN. It would also be highly desirable for a user to be able to receive home telephone calls while the user has a virtual presence connection to the corporate office. It would further be desirable for the user to be able to receive home telephone calls on the same telephone line or communication line being used for the virtual presence connection.

SUMMARY OF THE INVENTION

The present invention comprises a system and method for enabling a remote user to maintain a virtual presence at a corporate office. The present invention allows a remote user to connect to a corporate office and behave just as if the user were physically present at the corporate office. Thus the remote user's telephone behaves as a PBX extension. In addition, the remote user may send and receive faxes and email, have Internet access and maintain LAN connectivity, just as if the user were present at the corporate office.

The remote computer system includes a user telephony communication device, and the remote computer executes virtual presence software according to the present invention. The corporate office includes a virtual presence server according to the invention which connects to the corporate PBX and also to the corporate LAN. The virtual presence server executes software which enables the remote user to maintain a virtual presence at the corporate office.

When the remote user desires to establish a virtual presence at the corporate office, the remote user dials the virtual presence server and establishes a connection. This includes providing identification information and security information to the virtual presence server. Once the remote user is connected, the virtual presence server instructs the corporate PBX to automatically forward all calls to the remote user. The virtual presence server also routes email, faxes, and LAN data to the remote user. The virtual presence server also extends the corporate PBX and corporate LAN features to the remote user, just as if the remote user were physically located in the corporate office.

The present invention enables the concept of virtual presence or "telepresence", whereby a user at a remote location has the full capabilities and user interfaces of the corporate office just as if the user were physically located at the corporate office. Thus the telephone of the remote user mirrors the telephone the user sees at the corporate office, including substantially the same button configurations at substantially the same locations and performing substantially the same functions. According to the present invention, the remote user dials the local extension number or DID (direct inward dialing) number of co-workers in the corporate office, and can be reached with a local extension number, just as if the remote user were physically located in the corporate office.

According to the invention, the remote user makes outgoing telephone calls, sends faxes, transmits data, sends email and performs Internet access as if the remote user were physically present in the corporate office. Likewise, incoming calls, faxes, data transmissions and email received at the corporate office are routed to the remote user as if the remote user were physically present in the corporate office.

Therefore, a co-worker or external party who telephones the user at the corporate office, or sends email or a fax to the user at the corporate office, is unaware that the user is actually not physically located at the corporate office, but rather is at a remote location. In general, a secretary or receptionist located just outside the user's physical corporate office location is unable to discern, without opening the door, whether the user is located in his office at the corporate office or at a remote location.

The present invention includes methods for disconnecting and re-establishing virtual presence to reduce message rate charging. When a connection first occurs, the system determines if message rate charging is in effect. If so, and if the user desires temporary disconnects, the remote computer system monitors activity and disconnects after certain elapsed periods of inactivity. When the remote user desires to contact the corporate office, or the virtual presence server desires to route data to the remote user, then the respective system automatically and transparently reconnects to reestablish vial presence and perform the communication. These reconnects preferably occur transparently to the user, and thus a virtual presence is maintained from the user's perspective, even during temporary disconnects.

For the telecommuter, the present invention optionally instructs the telephone company Central Office to automatically route calls made to the telecommuter's home number, i.e., personal calls, to the corporate office. These calls are then routed to the telecommuter's home by the virtual presence server. Thus when a telecommuter is connected to the corporate office according to the virtual presence system of the invention, an external party who attempts to call the telecommuter at home is not blocked out, but rather is routed through the corporate office virtual presence server to the telecommuter.

BRIEF DESCRIPTION OF THE DRAWINGS

A better understanding of the present invention can be obtained when the following detailed description of the preferred embodiment is considered in conjunction with the following drawings, in which:

FIG. 13 is a block diagram of the Central Office interface of FIG. 8a;

FIG. 28 is a screen shot of one embodiment of the user interface of software executing on the virtual presence server of FIG. 2 to monitor status;

Figure 1:
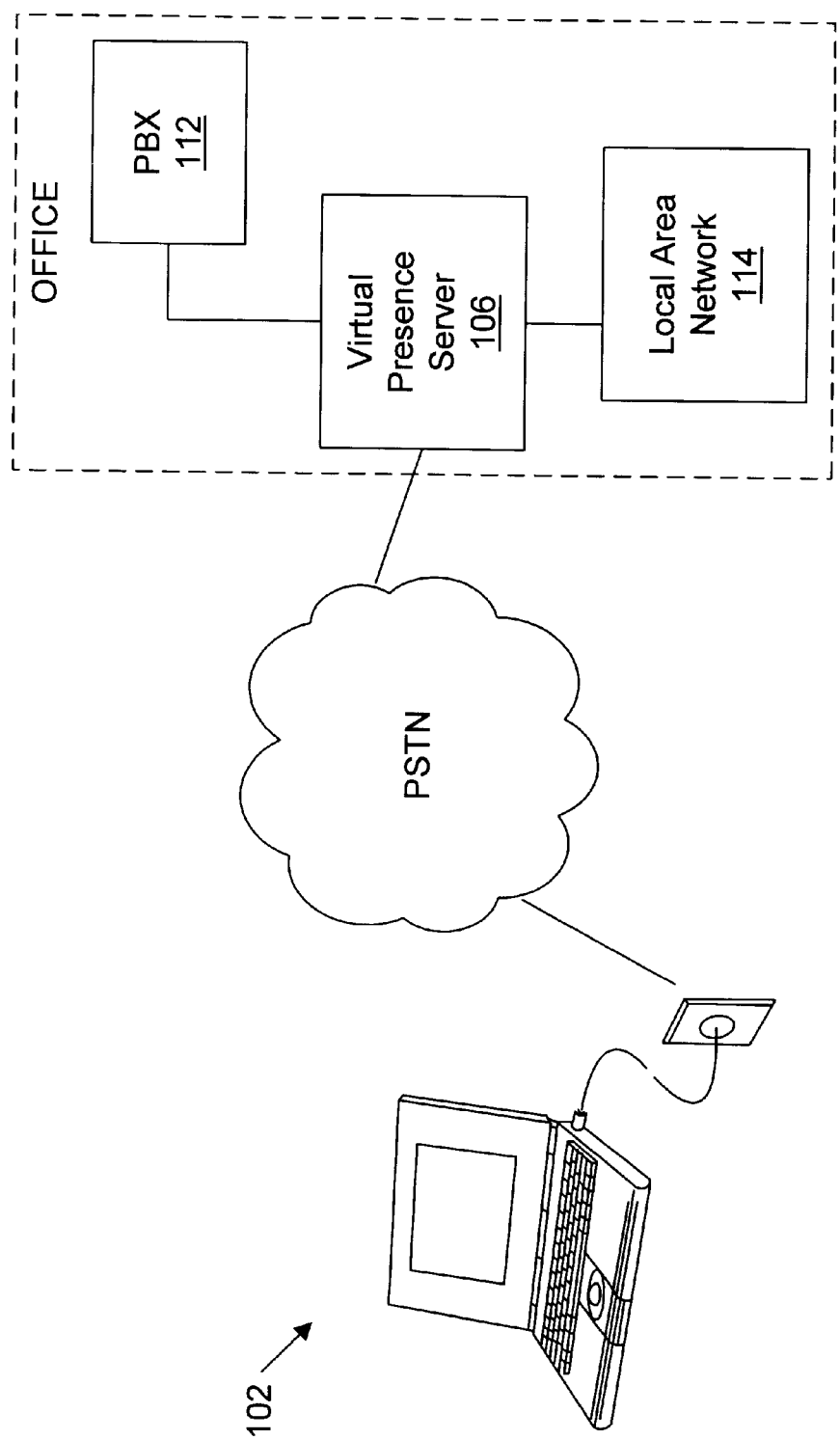
FIGS. 1 and 2 illustrate a system wherein a remote user maintains a virtual presence to a corporate office according to the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But, on the contrary, the invention is to cover all modifications, equivalents and alternative following within the spirit and scope of the present invention as defined by the appended claims.

DETAILED DESCRIPTION OF THE PREFERRED EMBODIMENT

Incorporation By Reference

U.S. patent application Ser. No. 08/559,472 titled "System And Method For Providing A Remote User With A Virtual Presence To An Office", and filed Nov. 15, 1995, whose inventors were Leven E. Staples, W. B. Barker and Kenneth L. Wilt, and which was assigned to Data Race, Inc., is hereby incorporated by reference in its entirety.

U.S. patent application Ser. No. 08/740,775 titled "System And Method For Providing A Remote User With A Virtual Presence To An Office", and filed Nov. 1, 1996, whose inventors were Leven E. Staples, W. B. Barker and Kenneth L. Witt, and which was assigned to Data Race, Inc., is hereby incorporated by reference in its entirety.

U.S. patent application Ser. No. 08/708,267 titled "System And Method for Providing User Connectivity to a Remote Data Site on a Communication Line While Maintaining Telephone Connectivity on the Communication Line", and filed Sep. 6, 1996, whose inventor was W. B. Barker, and which was assigned to Data Race, Inc., is hereby incorporated by reference in its entirety.

U.S. patent application Ser. No. 08/708,267 titled "System And Method For Ringing Other Subscriber Telephones Connected To A Telephone Line During Data Communications On The Telephone Line", and filed Jul. 7, 1997, whose inventors were Leven E. Staples and W. B. Barker, and which was assigned to Data Race, Inc., is hereby incorporated by reference in its entirety.

U.S. patent application Ser. No. 08/915,920 titled "Telephony Adapter System For Providing A User With A Virtual Presence To An Office" and filed Aug. 21, 1997, whose inventors were Thomas D. Hosbach, Bryan E. Albert and Frank A. Altschuler, and which is assigned to Data Race, Inc., is hereby incorporated by reference in its entirety.

FIG. 1—Virtual Presence System

Referring now to FIG. 1, a block diagram of a Remote Connectivity and Virtual Presence System according to the present invention is shown. As shown, a user who is remote from his/her "corporate office" utilizes a computer system or other communications device, referred to generally as computer system 102, to communicate and/or connect with the corporate office, also referred to as the home office. In the present disclosure, the term "corporate office" is intended to generally mean an office location or a data site where a remote user is desired to be connected. In general, the corporate office will be a headquarters office or corporate office, a government agency office, or another type of office, to which the user desires a "virtual presence." The "corporate office" may be another type of remote data site, such as an Internet Service Provider (ISP).

The remote user preferably uses a computer system, such as laptop 102, to connect to the corporate office. The remote user may also use other types of communication devices, such as a personal digital assistant (PDA) or a cellular phone, as desired. The computer system 102 includes a user telephony communication device 104 (FIG. 2) according to the present invention which provides transparent telephone and data connectivity and virtual presence to the corporate office. The user telephony communication device 104 preferably comprises a hardware card and/or software comprised in the computer system 102 which facilitate the remote connectivity and virtual presence.

The user telephony communication device 104 couples through a communication mechanism or channel to a virtual presence server 106 at the corporate office, i.e., the office where the user desires to have a "virtual presence" or have "telepresence". In the preferred embodiment, as shown, the communication mechanism is the public switched telephone network (PSTN), using either conventional analog transmission or ISDN (Integrated Services Digital Network) transmission. In the present disclosure, the term "public switched telephone network" (PSTN) includes any of various types of communications mechanisms, including analog or digital telephony transmission as mentioned above, DSL (Digital Subscriber Line), such as ADSL or HDSL, ATM (Asynchronous Transfer Mode), FDDI (Fiber Distributed Data Networks), and T1 lines, among others.

The virtual presence server 106 preferably supports one or more user telephony communication devices 104 via the public switched telephone network (PSTN). The virtual presence server 106 at the corporate office preferably supports a mixture of simultaneous analog and ISDN connections for connecting to various user telephony communication devices 104. The virtual presence server 106 is preferably a high performance computer system executing virtual presence software according to the invention.

The virtual presence server 106 interfaces to a telephony server 112, such as a private branch exchange (PBX) or Centrex unit in the corporate office. In embodiments where the corporate office includes a call server instead of a conventional PBX, the virtual presence server 106 connects to the call server. In the present disclosure, the term "telephony server" is intended to include a PBX, Centrex system, and other devices or systems which perform telephony switching services or functions. Also, the term "PBX" is used herein to be equivalent to "telephony server" for convenience.

In one embodiment, the virtual presence server 106 performs the functions of a call server as well as a virtual presence server. For example, the virtual presence server 106 in one embodiment comprises a SCSA (Signal Computing System Architecture) or MVIP (Multi-Vendor Integration Protocol) server for performing call management functions as well as virtual presence functions. That is, the virtual presence server 106 comprises one or more SCSA or MVIP buses which facilitate the communication of digital data between two or more communications devices.

The virtual presence server 106 also interfaces to a local area network (LAN) 114 at the corporate office. The LAN 114 may use Ethernet, Token Ring, or other types of protocols. The LAN 114 may also use the Isochronous Ethernet (IsoEthernet) protocol, which is IEEE specification 802.9a.

Figure 2:
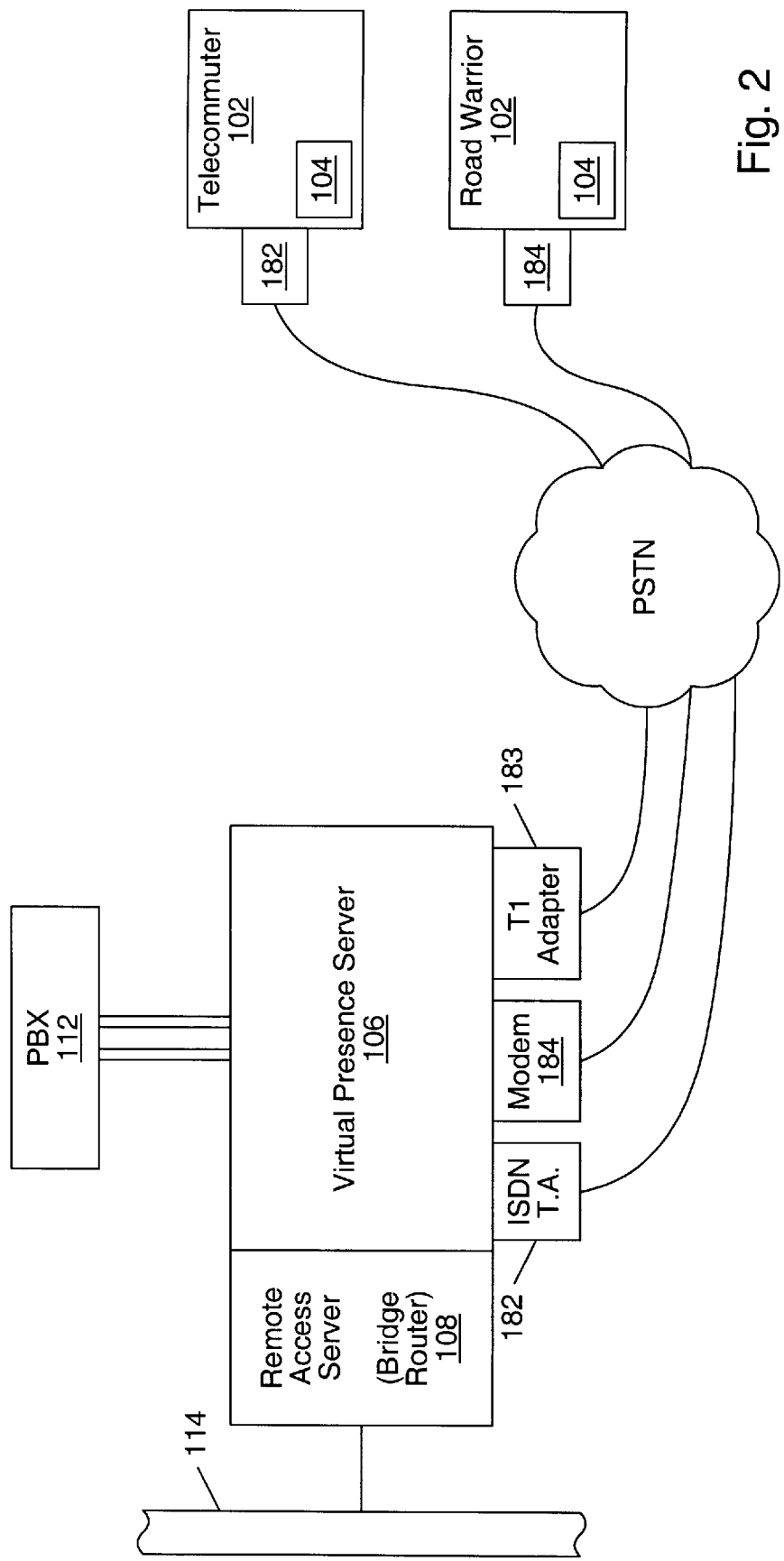

Referring now to FIG. 2, the virtual presence server 106 preferably includes one or more analog modems 184 for communicating analog signals over telephone lines, one or more ISDN terminal adapters 182 for ISDN communications, and/or one or more T1 adapters 183 for T1 communications. It is noted that the virtual presence server 106 may include only analog modems 184, only ISDN terminal adapters 182, T1 adapters 183, or may include a combination thereof. The virtual presence server 106 may include other types of communications devices and/or use other types of communications media, as desired.

As shown in FIG. 2, the corporate office may also include a remote access server 108 and/or a bridge router for performing more conventional remote access functions. Alternatively, the virtual presence server 106 includes remote access software for performing remote accessing functions in addition to the virtual presence functions of the present invention.

As shown, the remote user may either be a telecommuter or a road warrior, or may be a resident in a branch office, also referred to as a remote small office. The remote user may also be a user who desires to connect to an ISP for Internet access. As noted above, the remote user preferably uses a computer system 102 which includes a user telephony communication device 104. The user telephony communication device 104 comprised in the remote computer system 102 and used by the remote user may comprise either an analog modem 184 or an ISDN terminal adapter 182, or another type of communications device, as mentioned above. It is noted that the computer 102 and/or user telephony communication device 104 may connect to the PSTN using any of various communications devices and any of various communications media, as desired. In the present disclosure, the term "user telephony communications device" is intended to include analog modems, ISDN terminal adapters, xDSL or ATM devices, and any of various other types of communications devices which use any of various types of communications media.

The virtual presence server 106 located at the corporate office connects to the corporate PBX 112 as one or more extensions and connects to the corporate LAN 114 as one or more remote terminals, LAN nodes, or a separate LAN segment. The virtual presence server 106 then provides these features over the public switched telephone network (PSTN) to a remote site, i.e., to the remote user. Thus, the virtual presence server 106 of the present invention operates to extend PBX features, as well as LAN features, to the remote users. It is noted that the system shown in FIGS. 1 and 2 does not include a key system or PBX intervening between the virtual presence server 106 and the remote users.

The user telephony communication device 104 in the computer system 102, as well as the virtual presence server 106 at the corporate office, allow a remote user to seamlessly access and use resources at the corporate office, such as the corporate office private branch exchange (PBX) 112 and local area network (LAN) 114. Thus, a remote user with a virtual presence connection according to the present invention has all of the facilities and features provided by the PBX 112 and LAN 114 at the corporate office while working from a remote location.

Further, the present invention enables the concept of virtual presence or "telepresence", whereby a user at a remote location has the full capabilities and user interfaces of the corporate office just as if the user were physically located at the corporate office. In other words, the system of the present invention allows the remote user to have a virtual presence at the corporate office as if the user were actually present at the corporate office.

Thus the telecommuter or road warrior using a virtual telephone on his/her computer "sees" a virtual telephone that optionally substantially mirrors the telephone the user sees at the corporate office, including substantially the same button configurations at substantially the same locations and performing substantially the same functions. In one embodiment, the user configures the virtual telephone to provide different and/or more advanced features than the telephone at the corporate office.

Typically, a person physically located in a corporate office dials a local extension number or DID (direct inward dialing) number, such as an N digit extension number, to call a co-worker in the corporate office. According to the present invention, the remote user dials the same local extension number of a co-worker in the corporate office, just as if the remote user were physically located in the corporate office. Similarly, a co-worker in the corporate office dials the local extension of the remote user and accesses the remote user, just as if the remote user were physically located in the corporate office.

According to the invention, the remote user makes outgoing telephone calls, sends faxes, transmits data, sends email and performs Internet access as if the remote user were physically present in the corporate office. Likewise, incoming calls, faxes, data transmissions and email received at the corporate office are routed to the remote user as if the remote user were physically present in the corporate office.

Incoming calls are preferably automatically routed to the remote user. In the preferred embodiment, once the remote user is connected, the virtual presence server 106 instructs the corporate PBX or telephony server to automatically forward the remote user's office calls to the remote user at the remote location. The virtual presence server 106 preferably performs a remote access call forwarding (RACF) operation to direct calls that are made to the remote user's office telephone number to be forwarded to the virtual presence server 106. The virtual presence server 106 then routes these forwarded telephone calls to the user telephony communication device 104 being used by the remote user. Thus, external parties which call the user at the office are automatically routed to the remote user by the virtual presence server 106.

Faxes may also be automatically routed to the remote user if the remote user has a personal fax machine and/or personal fax number at the corporate office. Alternatively, caller ID information can be used in conjunction with a database to selectively route faxes to a user. It is noted that, for faxes to be automatically routed from the corporate office to the remote user, the corporate office is not required to have a physical fax machine, but is only required to have a direct number to receive faxes.

Therefore, a co-worker or other party who telephones the remote user at the corporate office, or sends email, data or a fax to the remote user at the corporate office, is unaware that the user is actually not physically located at the corporate office, but rather is at a remote location. In general, a secretary or receptionist located just outside the user's physical corporate office location is unable to discern whether the user is located in his office at the corporate office or at a remote location. Thus the remote user maintains a virtual presence which is "just like being there".

Figure 3:
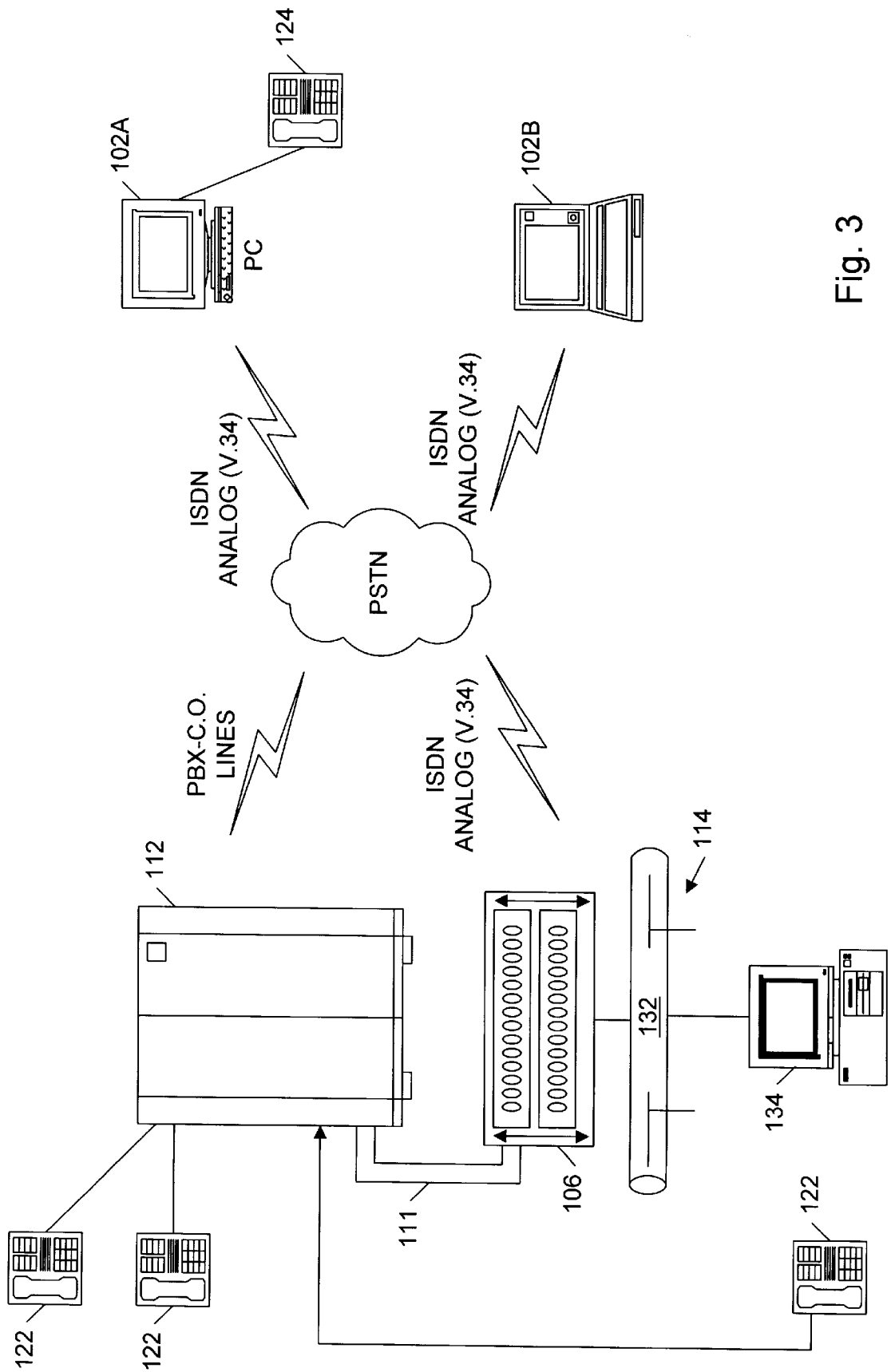
FIGS. 3, 4 and 5 illustrate various embodiments of the virtual presence system of the present invention.
Figure 4:
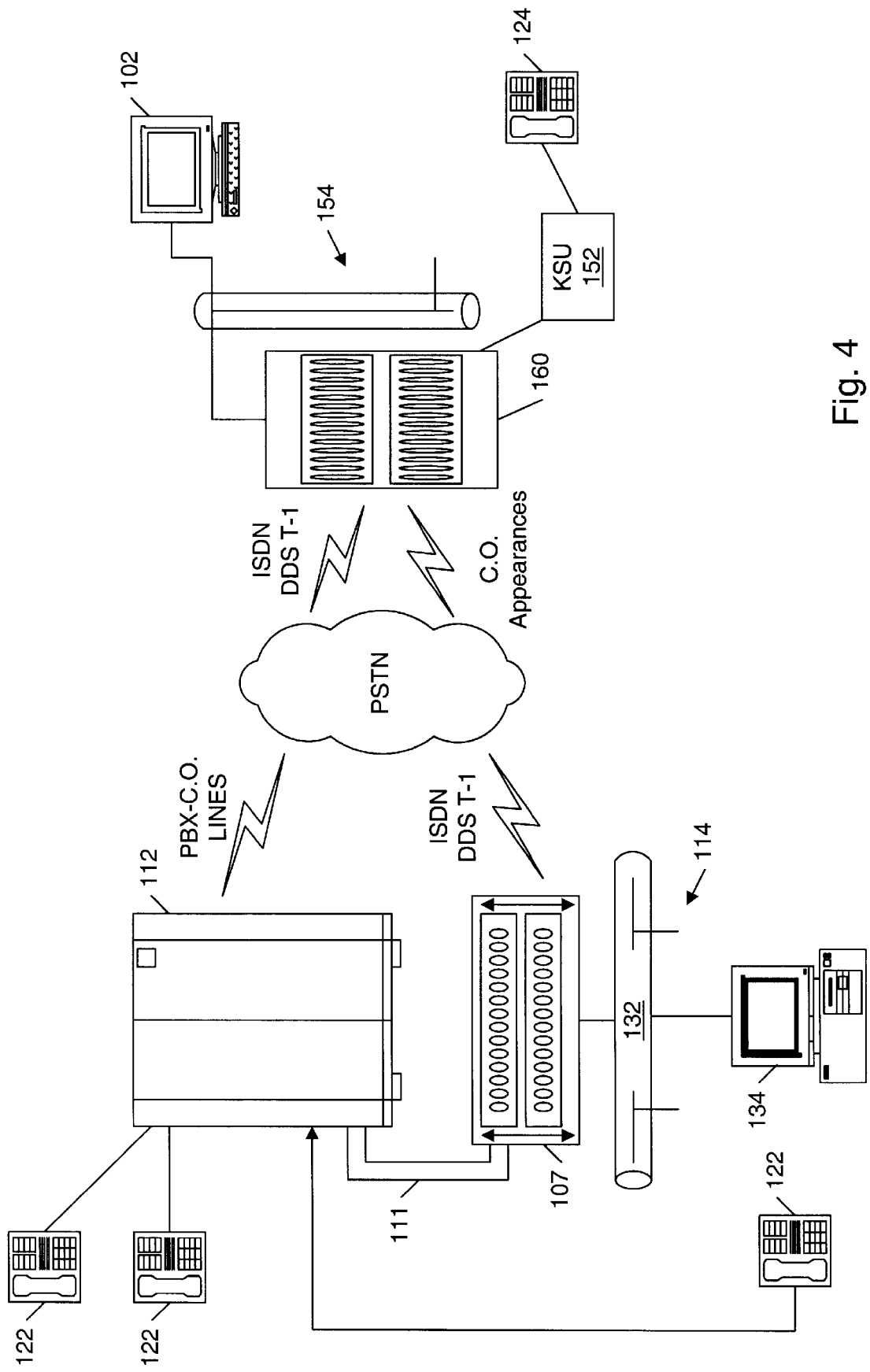
Figure 5:
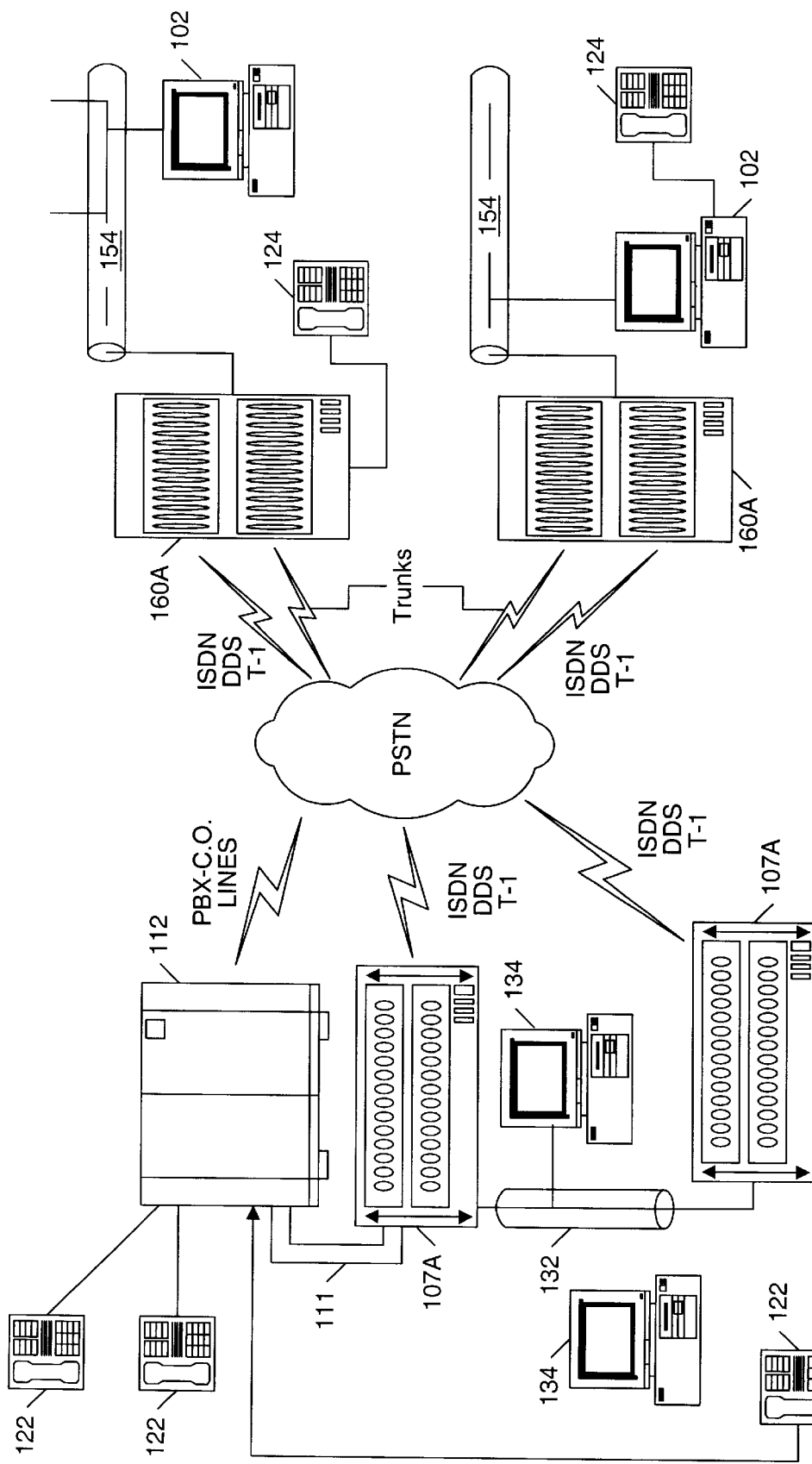

FIGS. 3–5: Embodiments of the Invention

Referring now to FIGS. 3–5, various embodiments of the present invention are shown. As shown, the system of the present invention may be used for various types of remote users.

1. FIG. 3: Telecommuters and Road Warriors

Referring now to FIG. 3, an embodiment used for telecommuters and road warriors is shown. For a user who is a "telecommuter", i.e., a user who is working at home and remotely connects to the corporate office, the telecommuter may operate with either a desktop or portable computer system, or optionally with another type of communications device. FIG. 3 illustrates a telecommuter operating with a desktop computer system, designated as 102A. If the telecommuter operates with a desktop computer system 102A, the user telephony communication device 104 is preferably an add-in card to an expansion bus of the computer system 102A, such as a PCI (Peripheral Component Interconnect) card or AT bus card, or may be an external device.

As shown in FIG. 3, in one embodiment a telephone instrument 124 is connected to the computer system 102A. Alternatively, or additionally, the computer system 102A executes software which presents a "virtual telephone" on the video screen of the computer system 102A. The virtual telephone executing on the computer system preferably uses the computer's speakerphone, or the computer's built-in microphone and speakers, as the voice transmitter and receiver for the virtual telephone. Alternatively, a handset comprising a microphone and speaker are coupled to the telephony communication device 104, as the voice transmitter and receiver for the virtual telephone.

Figure 3A:
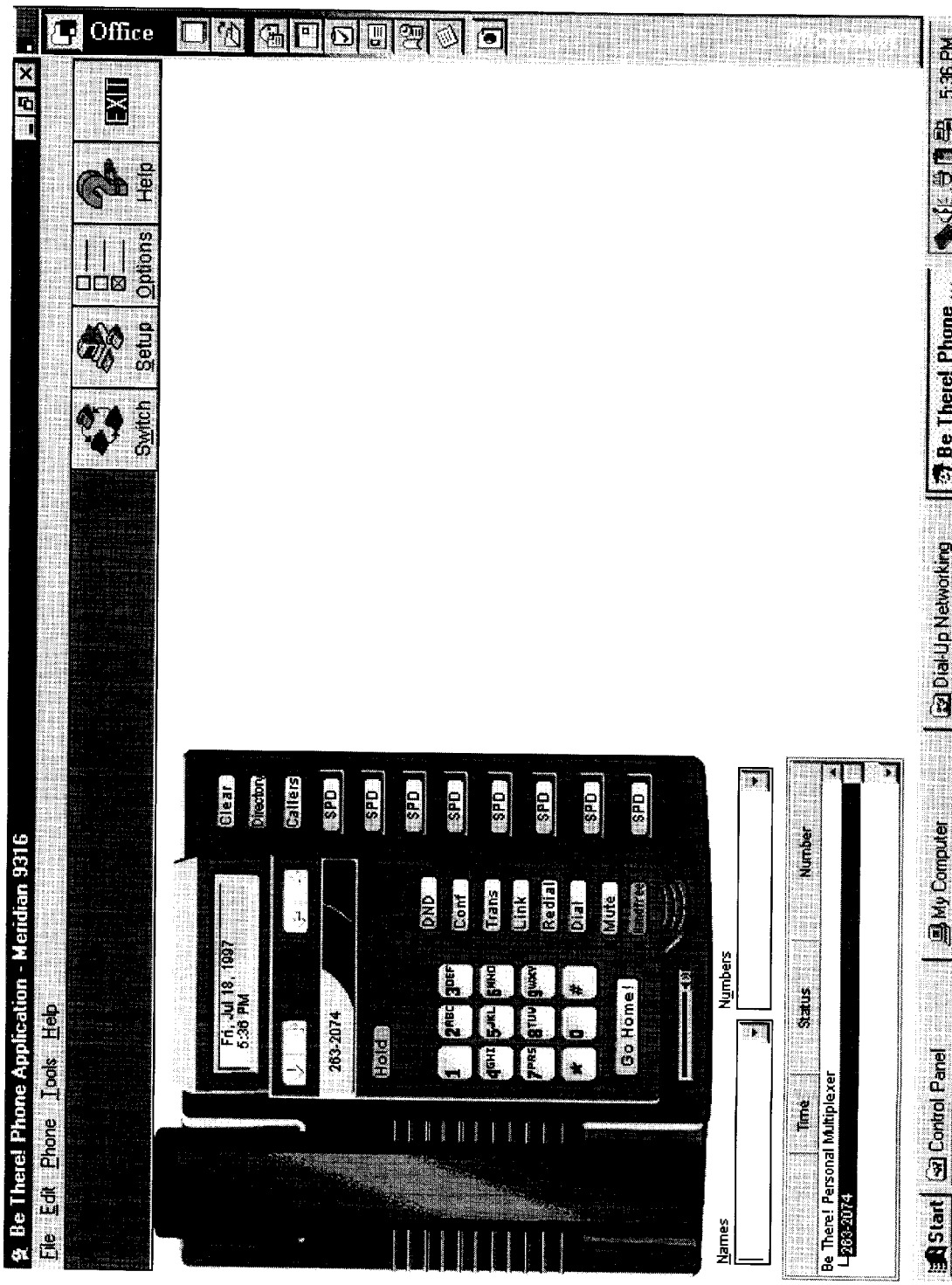
FIG. 3a is a screen shot illustrating a virtual telephone on the video screen of the remote computer system of FIG. 1.

FIG. 3*a* is a screen shot illustrating a virtual telephone on the video screen of the computer system 102. In the embodiment of FIG. 3*a*, the virtual telephone comprises a BeThere! Phone Application manufactured by Data Race, Inc. executing under the Windows 95® operating system.

For a "road warrior", i.e., a business traveler operating with a portable or notebook computer 102B, the user telephony communication device 104 preferably comprises a PC Card, or the user telephony communication device logic is hardwired to the computer motherboard. Users who are "road warriors", i.e., business users who travel and desire to "stay connected" to the corporate office, generally use a portable computer system 102B or a portable communications device (not shown). Thus, for road warriors, the user telephony communication device 104 preferably comprises a PCMCIA card, also referred to as a PC Card, adapted for insertion into a PCMCIA slot of the portable computer system 102B. Also, if the telecommuter uses a portable computer or notebook computer, the user telephony communication device 104 also preferably comprises a PC Card.

The portable computer system 102B may include an external telephone instrument which connects to the computer system 102B. Alternatively, or additionally, as shown, the portable computer system 102B preferably executes software which presents a "virtual telephone" on the video screen of the computer system 102B, as described above. In this embodiment, the portable computer 102B preferably includes an integrated speakerphone which provides transmitter/receiver capabilities.

As shown, each of the computers 102A and 102B are connected to the corporate office virtual presence server 106 via the public switched telephone network (PSTN). Each of the computers 102A and 102B are also connected to the corporate office PBX 112 via the PSTN.

In one embodiment, the user telephony communication device 104 includes an analog modem 184, preferably a V.34 modem, which is used where an ordinary analog telephone line is available to connect to the corporate office. In a second embodiment, the user telephony communication device 104 utilizes an integrated services digital network (ISDN) terminal adapter 182. The ISDN embodiment provides higher speed data transmissions and improved voice quality. Any of the various embodiments preferably also supports a local group three facsimile (fax) machine.

The PSTN connects to the corporate office virtual presence server 106 preferably via either ISDN terminal adapters 182, analog V.34 modems 184, or T1 adapters 183 and the PSTN connects to the corporate PBX via PBX—Central Office phone lines, as is well known. The communication paths or lines which connect the PSTN to the ISDN terminal adapters 182, analog V.34 modems 184, or T1 adapters 183 are commonly referred to as trunk lines or data lines. The communication paths or lines which connect the PSTN to the corporate PBX, i.e., the PBX—Central Office phone lines are commonly referred to as station lines or voice lines.

As shown in FIG. 3, the virtual presence server 106 connects to the corporate PBX 112 via PBX lines. The corporate PBX 112 connects to various telephone instruments 122 in the corporate office, as is well known. The virtual presence server 106 connects to the corporate PBX 112 to extend PBX features to the remote user and also to support voice communication between the corporate office and the remote user.

The virtual presence server 106 also connects to the corporate local area network (LAN) 114. As shown, the corporate LAN 114 may comprise an Ethernet network 132, a Token Ring network, or other type of local area network, as desired. Various computer systems are connected to the LAN 11 4, as is well known.

In one embodiment, the computer systems 102A and 102B comprise DSVD (digital simultaneous voice and data) modems as well as the appropriate software for enabling simultaneous voice and data transmissions. In another embodiment, the computer systems 102A and 102B include a communications device, such as a modem, which utilizes a special protocol for multiplexing multiple data types on a single communications line, such as a telephone line, including voice, LAN data, fax data, and telephony control data. In the present disclosure, the term "telephony control data" includes PBX extension data as well as other telephony control information.

It is noted that a road warrior preferably has virtual phone and virtual fax software applications executing on his computer system. The telecommuter operating from his home may include a "real" fax machine as well as a "real" phone. Where a telecommuter's system includes a physical fax machine, and an ISDN connection is used, the analog facsimile data generated by the fax machine is preferably re-digitized in the remote computer system 102 and communicated over the PSTN to the virtual presence server 106. In this embodiment, each of the remote computer system 102 and the virtual presence server 106 include a fax/modem chip. When the remote user sends a fax using the "real" fax machine, the remote computer 102 receives the fax, converts the analog data to digital data, and transmits the digital data to the virtual presence server 106. The virtual presence server 106 uses its fax modem to perform digital to analog conversion and provides the analog fax data to a "real" or virtual fax machine at any location, such as the corporate office. Alternatively, the virtual presence server may forward the fax data to a fax server for transmission.

2. FIG. 4: Branch Office with Key System or PBX

Referring now to FIG. 4, a system according to the present invention is shown which enables users in a branch office to connect to a corporate office. In a branch office, the user telephony communication device 104 is preferably a rack mounted device, referred to as an BO Server 160, which includes multiple inputs and which handles multiple phone lines. As shown, the branch office preferably includes its own local area network (LAN) 154 for connecting multiple computer systems. The branch office also preferably includes a key system unit (KSU) 152 or small PBX which provides telephone connectivity for telephones in the branch office.

As shown, each of the computers 102 in the branch office are connected to the remote office LAN 154, and the LAN 154 in turn connects to the BO Server 160. The BO Server 160 connects to a corporate office BO virtual presence server 107 via the PSIN. The BO virtual presence server 107 is similar to the virtual presence server 106 described above. The BO Server 160 also connects to the corporate office PBX 112 via the public switched telephone network (PSTN).

The BO virtual presence server 107 in the corporate office which interfaces to the BO server 160 in a branch office is preferably different than the virtual presence server 106 which interfaces to Telecommuters and road warriors. The BO virtual presence server 107 is preferably different due to the need of the BO virtual presence server 107 to interface to a small key system or small PBX in the remote office. In the embodiments of FIGS. 4 and 5, if telecommuters and road warriors desire to remotely connect to the corporate office, then the corporate office preferably includes a separate virtual presence server 106 dedicated to the telecommuters and road warriors. Thus in the preferred embodiment the functionality between the two different types of virtual presence servers 106 and 107 is not mixed. In an alternate embodiment, the corporate office includes a single virtual presence server 106 which serves both a branch office as well as telecommuters and road warriors.

The computers 102 and telephones 124 in the remote office are connected to the corporate office through the BO Server 160 and the PSTN. The BO Server 160 connects to the PSTN using either ISDN service, DDS (digital data service), leased lines, such as T1 lines, or other communications devices or media The BO Server 160 may also connect to the corporate office virtual presence server 107 using a plurality of analog modems, as desired. The PSTN connects to the corporate office virtual presence server 107 via communications media such as ISDN, DDS, T1 lines, or analog V.34 modems, and the PSTN connects to the corporate PBX via PBX—Central Office phone lines, as is well known.

As discussed above with reference to FIG. 3, in FIG. 4 the BO virtual presence server 107 in the corporate office connects to the corporate PBX 112 via PBX lines. The corporate PBX 112 connects to various telephone instruments 122 in the corporate office, as is well known. The BO virtual presence server 107 also connects to the corporate local area network (LAN) 114. As shown, the corporate LAN 114 may comprise an Ethernet network 132, a Token Ring network, or other local area network, as desired. Various computer systems 134 are connected to the LAN 11 4, as is well known.

In a branch office application, the BO server 160 supports telephone connectivity, also referred to as Central Office (C.O.) appearances, wherein a user in the remote office is not required to "back-call" telephone calls to other users in the remote office. In other words, for a user in the remote office to call a user next door in the remote office, the user is not required to call the corporate office and then have the virtual presence server 107 in the corporate office call back to the next door user in the remote office.

In one embodiment of FIG. 4, the computer systems 102 and/or the BO server 160 further comprise DSVD (digital simultaneous voice and data) modems as well as the appropriate software for enabling simultaneous voice and data transmissions. As discussed firther below, one embodiment includes communications devices such as modems which utilize a special protocol for multiplexing multiple data types on a single communications line, including two or more of voice, LAN data, fax data, and telephony control data It is noted that the key system unit 152 does not provide the user with complete virtual presence because the user is noticeably in a remote office where he is required to select an outside line. Thus the user does not enter the same sequence of button entries that the user would enter if the user were physically in the corporate office. A key system unit also places a different protocol between the user and the telephone, depending on whether the user is calling someone in the remote office or in the corporate office. Thus a branch office which uses KSU 152 does not have the same level of telepresence as a branch office including a BO Server 160 embodying an internal PBX function. This is because the KSU 152 is located between the remote users and the BO server 160.

In one embodiment, the BO server 160 displaces a key system unit at the branch office. In other words, the BO server 106 executes software which provides at least a subset of the functionality of a key system or PBX, and this "soft" key system or PBX is operated over the remote office LAN 154. The BO Server 160 is thus programmed to behave as a PBX, wherein the BO Server 160 offers a local intercom between the stations.

Thus, in a remote office with 10 people and having an BO server 160, one remote office worker can talk to someone in the next office using a local extension in the remote office or place a local call in the BO area code. The BO server 160 also provides the same user interface to each remote worker as if the respective remote worker were physically located in the corporate office.

The BO Server 160 also may act as a file server or application server in the remote office LAN 154, as desired. Alternatively, the BO Server 160 acts as an additional server on the remote office LAN 154 if a server already exists.

3. FIG. 5: Branch Office

Referring now to FIG. 5, a system according to another embodiment of the present invention is shown which enables users in a branch office to connect to a corporate office. FIG. 5 illustrates a corporate office virtual presence server 107A interfacing to two branch offices. The system shown in FIG. 5 is similar to the system shown in FIG. 4, except that the branch offices in FIG. 5 does not include a key system or PBX, but rather includes standard telephone instruments (POTS) or a Centrex telephone system. This configuration in the remote office implies that voice data is transferred over the BO LAN 154. Thus a local extension call is multiplexed on the LAN 154, and the BO server 160 provides local switching.

As discussed above, in a branch office the user telephony communication device 104 is preferably a rack mounted device referred to as the BO Server 160A, which includes multiple inputs and which handles multiple phone lines. Each of the branch offices shown in FIG. 5 includes a LAN 154 for connecting multiple computer systems. Each branch office also preferably includes a BO server 160A corresponding to the LAN 154. The BO server 160A provides telephone connectivity for telephones 124 in the branch office.

As shown, each of the computers 102 in the branch office are connected to the respective remote office LAN 154, and each LAN 154 in turn connects to a respective BO Server 160A. Each BO Server 160A connects to the corporate office virtual presence server (virtual presence server) 107A, and to the corporate office PBX 112, via the public switched telephone network (PSTN). The computers 102 in the remote office connect through a respective BO Server 160A, and the BO Server 160A connects to the PSTN using a communications device and/or media such as analog modems/phone lines, ISDN service, DDS (digital data service) or leased lines, such as T1 lines, among others. The PSTN connects to the corporate office virtual presence server 107A via one or more communications devices and/or media such as ISDN, DDS, T1 lines, or analog V.34 modems, and the PSTN connects to the corporate PBX via PBX—Central Office phone lines, as is well known.

As discussed above with reference to FIG. 3, in FIG. 5 the virtual presence server 107A at the corporate office connects to the corporate PBX 112 via PBX lines. The corporate PBX 112 connects to various telephone instruments 122 in the corporate office, as is well known. The virtual presence server 107A also connects to the corporate local area network (LAN) 114. As shown, the corporate LAN 114 may comprise an Ethernet network 132, a Token Ring network, or other local area network, as desired. Various computer systems 134 are connected to the LAN 114, as is well known.

As discussed above, the virtual presence server 107A which interfaces to users in a branch office is preferably different than the virtual presence server (FIG. 3) 106 which interfaces to telecommuters and road warriors due to the need of the virtual presence server 107A to interface to the BO Server in the remote office via multiple communication paths. In the embodiment of FIG. 5, if telecommuters and road warriors desire to remotely connect to the corporate office, then the corporate office preferably includes a separate virtual presence server 106A dedicated to the telecommuters and road warriors, as discussed above. Alternatively, the virtual presence server 106A includes functionality for one or more branch offices, telecommuters, and road warriors.

In a branch office application, the BO server 160A supports telephone connectivity, wherein a user in the remote office is not required to "back-call" telephone calls to other users in the remote office. In other words, for a user in the remote office to call a user next door in the remote office, the user is not required to call the corporate office and then have the virtual presence server in the corporate office call back to the next door user in the remote office.

In one embodiment of FIG. 5, the computer systems 102 further comprise DSVD (digital simultaneous voice and data) modems as well as the appropriate software for enabling simultaneous voice and data transmissions. As discussed further below, one embodiment preferably utilizes a novel protocol for multiplexing multiple data types on a single communications line, including two or more of voice, LAN data, fax data, and telephony control data.

Figure 6:
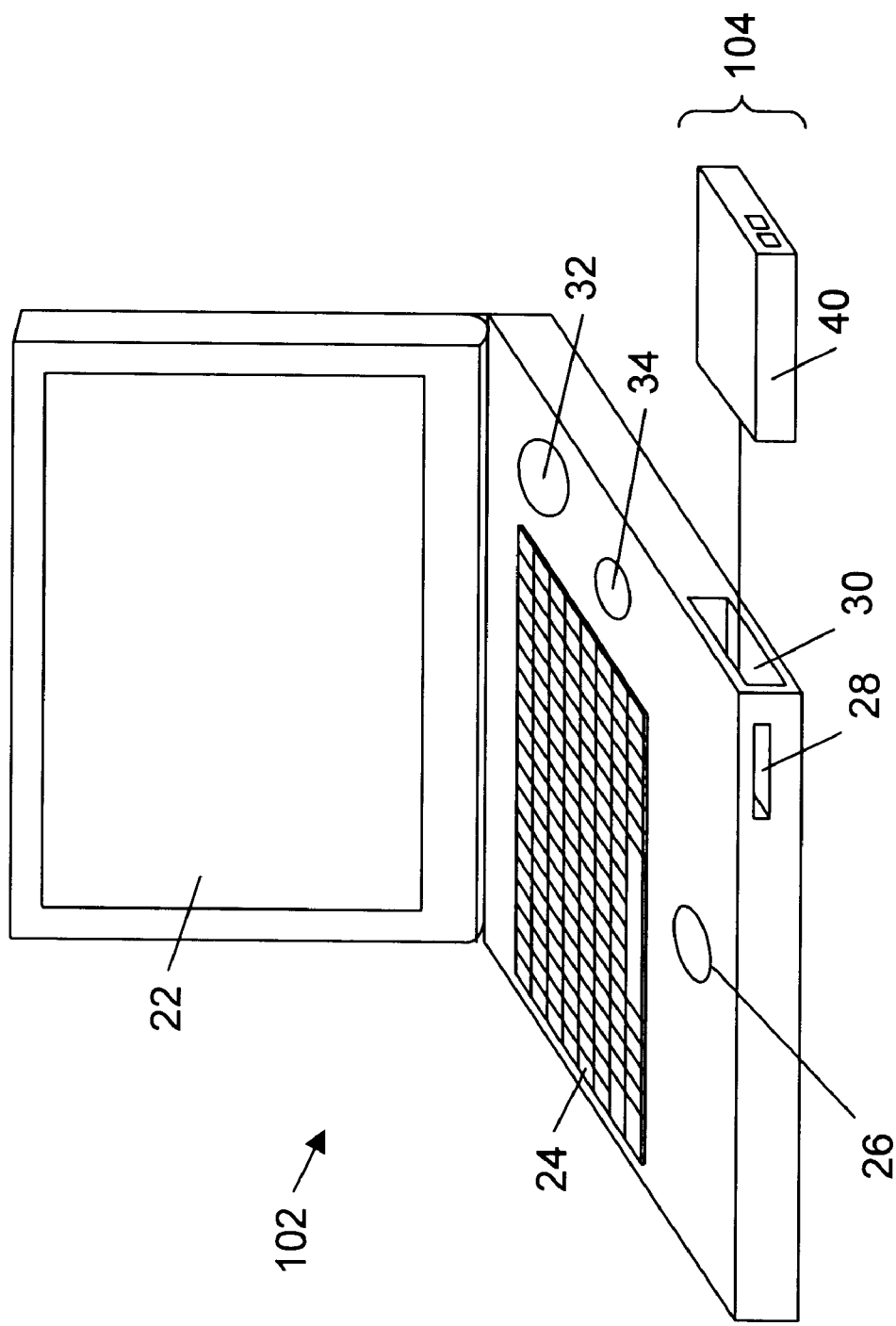
FIG. 6 illustrates the user telephony communication device configured as a PC Card adapted for connecting to the remote computer system of FIG. 1.

FIG. 6—User Telephony Communication Device

Referring now to FIG. 6, a diagram illustrating the user telephony communication device 104 (FIG. 2), shown here implemented as PC Card 40, according to the one embodiment of the present invention used with portable computer system 102 is shown. As shown, the portable computer system 102 includes a video screen 22, a keyboard 24, mouse 26, and a floppy drive 28. The computer system 102 also preferably includes a microphone 34 and speaker 32. The computer system 102 further includes at least one PCMCIA slot 30 for receiving a PC Card.

In this embodiment the user telephony communication device 104 is preferably configured as a PCMCIA (Personal Computer Memory Card International Association) PC Card 40 adapted for insertion into the PCMCIA slot 30 of the computer system 102. This allows the user telephony communication device 104 to be easily used with portable and laptop computer systems. However, it is noted that, for desktop or tower systems, i.e., non-portables, the user telephony communication device 104 may also be configured as an expansion card for insertion into an expansion bus of the computer system. The user telephony communication device 104 may also be configured directly on the motherboard of the computer system 102. The user telephony communication device 104 may have other physical configurations, as desired.

As mentioned above, the user telephony communication device 104 may be adapted for communicating through various communication mechanisms. For example, in one embodiment, the user telephony communication device 104 is an analog unit including a modem for interfacing to an analog phone line. In another embodiment, the user telephony communication device 104 includes an ISDN terminal adapter unit for interfacing to an ISDN line. The user telephony communication device 104 may also be configured for other types of communication mechanisms, such as ATM, and T1 lines, among others.

Figure 7:
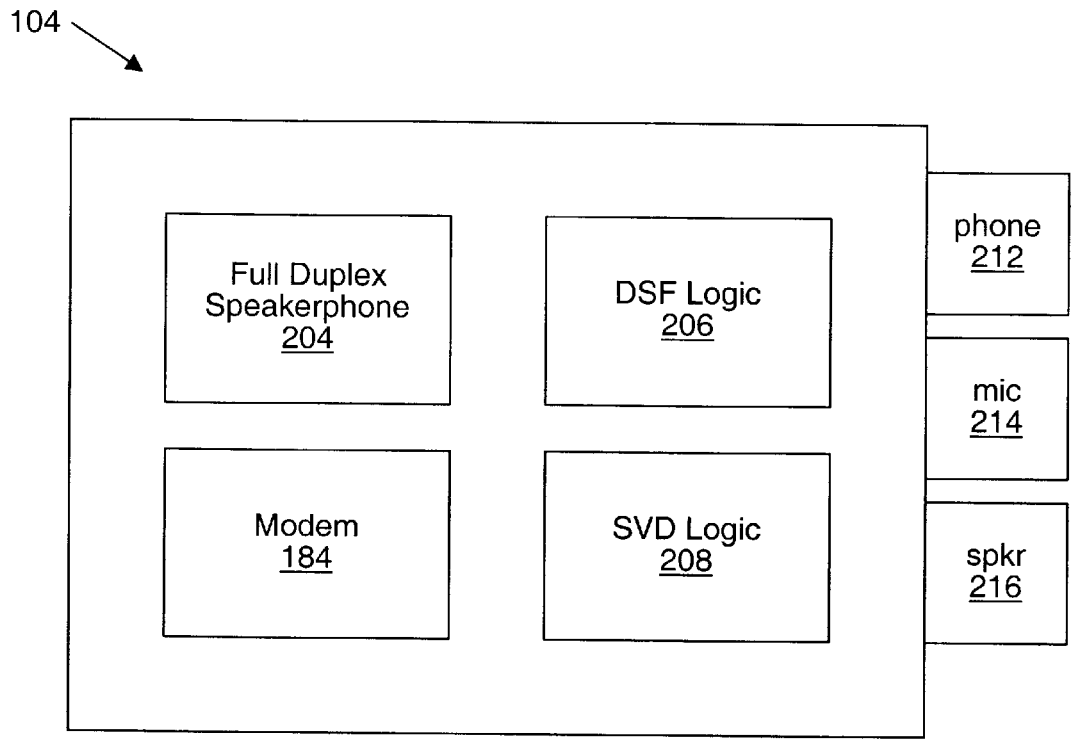
FIGS. 7 and 8 are block diagrams illustrating embodiments of the user telephony communication device of FIG. 1.

FIG. 7 is a block diagram of one embodiment of the user telephony communication device 104 including an analog modem 184. As shown, the user telephony communication device 104 preferably comprises a V.34 modem 184 and also includes a full-duplex speakerphone 204. The analog user telephony communication device 104 also preferably includes simultaneous voice and data (SVD) logic 208 for performing SVD capabilities. The SVD logic 208 operates with the modem 184 and with the full-duplex speakerphone 204. The SVD logic preferably multiplexes a plurality of data types in a single communication channel, such as voice, LAN data, fax data, and telephony control data.

The analog user telephony communication device 104 also preferably includes digital simultaneous facsimile (DSF) logic for performing DSF capabilities. The user telephony communication device 104 preferably includes a phone jack 212 for connecting to an analog phone line, or telco line. The user telephony communication device 104 also preferably includes external jacks 214 and 216 for an external microphone and speaker, respectively, one or more jacks for pass through of microphone and speaker to a computer sound system (not shown), and a jack for an external phone (not shown).

Figure 7A:
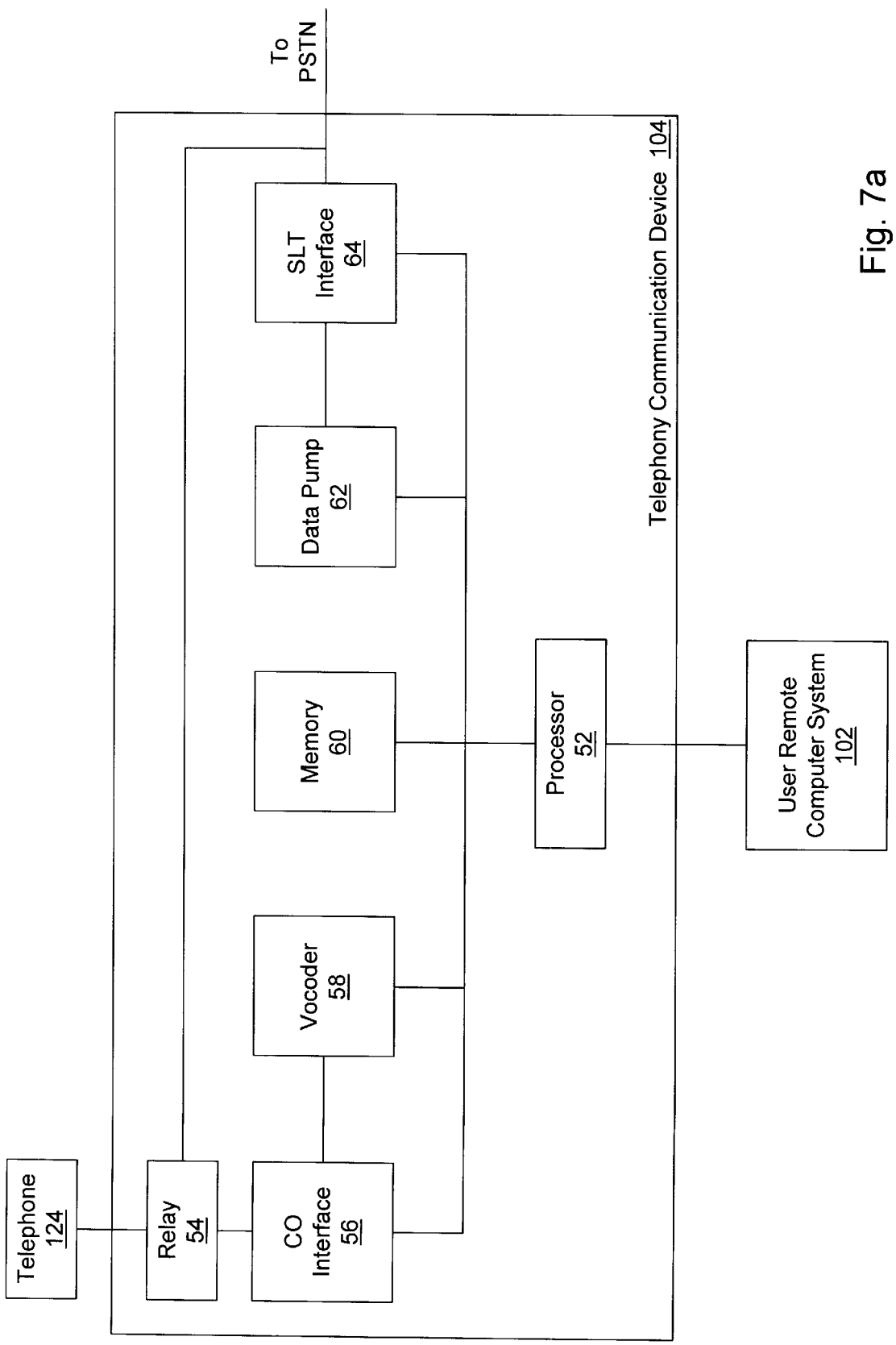
FIGS. 7a, 7b, 8a and 8b are block diagrams illustrating in more detail different embodiments of the user telephony communication device of FIG. 7.

Referring now to FIG. 7a, a block diagram illustrating in more detail the telephony communication device 104 of FIG. 7 is shown. The telephony communication device 104 is coupled to the remote user computer system 102, preferably via an expansion bus slot, such as an Industry Standard Architecture (ISA) slot or Peripheral Component Interconnect (PCI) slot. In another embodiment, the telephony communication device 104 couples to the user computer 102 via an I/O port such as a serial port. The user telephone 124 couples to a voice port of the telephony communication device 104.

In one embodiment, the telephony communication device 104 comprises a BeThere!® Personal Multiplexer (PX) manufactured by Data Race, Inc. BeThere! software executing on the user computer 102, referred to as BeThere! client software, operates to control the telephony communication device 104 to perform various functions as will be described below. A user interface of the BeThere! client software is shown in FIG. 3a. The BeThere! client software will be described in more detail below.

Preferably, the telephony communication device 104 and the user computer 102 communicate over the expansion bus or via the I/O port. Preferably, the telephony communication device 104 comprises status and control registers accessible by the user computer 102 via I/O-mapped or memory-mapped addresses. Preferably, the telephony communication device 104 further comprises memory storage, such as RAM (Random Access Memory), which is accessible by the user computer 102 via memory-mapped addresses. The user computer 102 reads and writes the status and control registers and memory to control the telephony communication device 104. Furthermore, the telephony communication device 104 generates one or more interrupt request signals to the user computer 102 to notify the user computer 102 of events. Examples of the events are the reception of telephony control messages, and the reception of data.

The telephony communication device 104 comprises a data port, or single line telephone (SLT) interface 64, for coupling to the PSTN via a communications path, such as a telephone line. The SLT interface 64 presents an interface which appears to the PSTN substantially like a standard telephone. Modulated data is exchanged between the virtual presence server 106 and the telephony communication device 104 on a telephone line via SLT interface 64. The modulated data comprises voice data multiplexed with telephony control data multiplexed with user data, such as files or Internet data, and/or fax data. The streams of voice data are referred to as a voice channel. The streams of user data are referred to as a data channel. The streams of control data are referred to as a control channel. The streams of fax data are referred to as a fax channel. The SLT interface 64 will be described in more detail below with respect to FIG. 14.

The telephony communication device 104 further comprises a Central Office (CO) interface 56 for coupling to the telephone 124. The CO interface 56 presents an interface which appears to the telephone 124 substantially like a CO of the PSTN. Voice signals are transferred between a third party subscriber and the telephone 124 via the CO interface 56. The CO interface 56 will be described in more detail below with respect to FIG. 13.

The telephony communication device 104 further comprises a relay 54 which selectively couples the telephone 124 to either the CO interface 56 or to the telephone line coupled to the SLT interface 64. Preferably, the relay 54 is controlled by a loop current detector which detects on and off hook conditions on the telephone line. Preferably, when the loop current detector senses an off hook condition on the telephone line, the detector controls the relay 54 to couple the telephone 124 to the CO interface 56. Otherwise, the relay 54 couples the telephone 124 to the telephone line. It is noted that the relay 54 advantageously couples the telephone 124 to the telephone line when the telephony communication device 104 is not receiving power, thereby providing connectivity between the telephone 124 and telephone line as would be present if the telephony communication device 104 were absent from the user system.

The telephony communication device 104 further comprises a processor 52 coupled to a memory 60, a vocoder 58, a data pump 62, the SLT interface 64 and the CO interface 56. The processor 52 receives status information from the SLT interface 64 regarding events such as detection of ringing voltages, and reception of DTMF tones. The processor 52 controls the SLT interface 64 to perform actions such as generating on/off hook conditions to the PSTN, and generating DTMF tones. The processor 52 receives status information from the CO interface 56 regarding events such as the detection of on/off hook conditions generated by the telephone 124. The processor 52 controls the CO interface 56 to perform actions such as generating a ringing voltage to the telephone 124. Preferably, the processor 52 notifies the BeThere! client software of event notifications received from the CO interface 56 and the SLT interface 64. Preferably, the processor 52 controls the CO interface 56 and the SLT interface 64 to perform actions in response to commands from the BeThere! client software. These operations with the SLT interface 64 and CO interface 56 will be described in more detail below.

Preferably, the memory 60 comprises a read-only memory (ROM), programmable ROM (PROM), erasable PROM (EPROM), FLASH memory, dynamic random access memory (DRAM), static random access memory (SRAM), or a combination thereof. The memory 60 is used to store program instructions and data executed by the processor 52. A portion of the memory 60 comprises frame buffers used to buffer data received from the data pump 62 before being provided to the vocoder 58, and to buffer data received from the vocoder 58 before being provided to the data pump 62. The memory 60 may be comprised within and/or without the processor 52.

The data pump 62 is coupled to the PSTN through the SLT interface 64. Data pumps are well known in the art of modem design. In one embodiment, the data pump 62 is a Lucent Technologies M-1634. The data pump performs the functions, among others, of modulating digital data to produce modulated analog signals for transmission on the PSTN to the virtual presence server 106 and demodulating modulated analog signals received from the virtual presence server 106 to produce digital data.

The processor 52 performs various control functions of the telephony communication device 104. Preferably, the telephony communication device 104 is a digital simultaneous voice and data (DSVD) modem, and the processor 52 demultiplexes simultaneously transmitted, i.e., multiplexed, speech, data and/or fax, and control data received from the virtual presence server 106. The processor 52 is operable to receive compressed speech, i.e., voice encoded speech, from the data pump 62 and provide the compressed speech to the vocoder 58. The processor 52 is also operable to receive compressed speech from the vocoder 58 and provide the compressed speech to the data pump 62. In the preferred embodiment, the processor 52 is operably coupled to the user computer 102 by an expansion bus, such as an Industry Standard Architecture (ISA) or Peripheral Component Interconnect (PCI) bus, through bus interface circuitry. The processor 52 receives data from and sends data to the user computer 102. The processor 52 comprises any processor device which is capable of executing a stored program of instructions or embedded controller device. In one embodiment, the processor 52 is a Zilog Z80182 microcontroller.

Vocoders, such as vocoder 58, are well known in the art of voice encoded speech. In one embodiment, the vocoder 58 comprises an AT&T 1635. The vocoder 58 encodes speech signals received from the telephone 124 and provides the compressed speech to the processor 52. The vocoder 58 also receives compressed speech from the processor 52 and decodes the compressed speech back to produce analog voice signals which are provided to the telephone 124 for reproduction to the user.

During operation of the telephony communication device 104, the data pump 62 receives modulated analog data signals from the telephone line transmitted by the virtual presence server 106. The telephone connection between the telephony communication device 104 and the virtual presence server 106 on the virtual presence server 106 trunk lines is commonly referred to as a trunk call or data call. The data pump 62 demodulates the analog data signals into digital data. The processor 52 receives the digital data and determines the type of data received. Generally, the data comprises various types such as voice, user data, fax data and control data In one embodiment, the voice, data, fax and control data are comprised within IP (Internet Protocol) packets transmitted between the telephony communication device 104 and the virtual presence server 106. In one embodiment, the digital data comprises data frames.

The processor 52 forwards the user and/or fax data containing Internet data, for example, to the user computer 102. The processor 52 forwards the voice data to the vocoder 58. The vocoder 58 decompresses the voice data into voice signals, which are provided to the telephone 124. Preferably, the processor 52 notifies the BeThere! client software of the reception of various telephony control data or messages, such as a message to ring the telephone 124. Preferably, the processor 52 also notifies the BeThere! client software of the detection of various telephony control events, such as detection of ringing signal from the telephone line or detection of on/off hook conditions generated by the telephone 124.

Conversely, the vocoder 58 receives voice signals from the telephone 124 and compresses the voice signals into voice data. The telephone connection between the third party subscriber and the telephone 124 on the virtual presence server 106 station lines is commonly referred to as a station call or voice call. The processor 52 receives the voice data from the vocoder 58 and multiplexes the voice data with user and/or fax data received from the user computer 102 and with telephony control messages. An example of a telephony control message is one which indicates the detection of an on/off hook condition generated by the telephone 124. Another example of a control message is one which instructs the virtual presence server 106 to perform a telephony function to the PBX 112, such as to transfer a call or put a call on hold. Preferably, the processor 52 generates telephony control message in response to commands from the BeThere! client software. Preferably, the processor 52 also performs telephony actions in response to commands from the BeThere! client software, such as ringing the telephone 124 and generating on/off hook conditions on the telephone line. The multiplexed data is provided to the data pump 62 which modulates the data onto analog data signals for transmission on the telephone line to the virtual presence server 106.

Figure 7B:
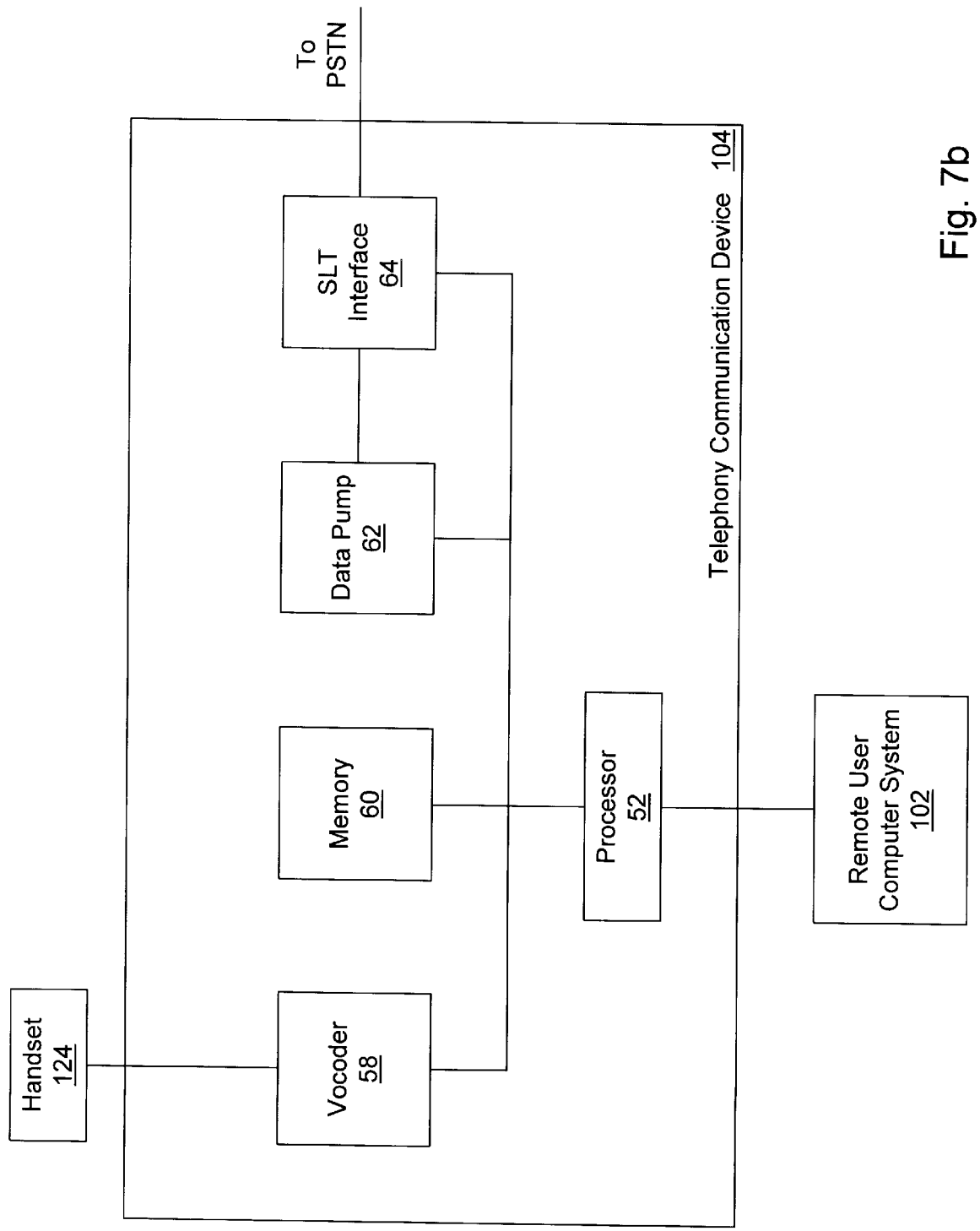

Referring now to FIG. 7b, a block diagram of an alternate embodiment of the user telephony communication device 104 is shown. The user telephony communication device 104 of FIG. 7b is similar to the system of FIG. 7a and like elements are numbered identically for clarity and brevity. Preferably, the telephony communication device 104 couples to a PC Card slot of the user computer 102, such as is commonly found in portable or notebook computers, as shown in FIG. 6. The telephony communication device 104 of FIG. 7b is adapted for coupling to a handset or headset 124 rather than a telephone as in FIG. 7a. The handset 124 comprises a speaker and microphone. In this embodiment, the CO interface 56 of FIG. 7a is not necessary. In particular, the CO interface 56 is not necessary to produce a ringing voltage, to detect on/off hook conditions, or to convert the 4-wire vocoder 58 interface to a 2-wire telephone interface. Thus, the handset 124 couples directly to the vocoder 58. In one embodiment, the user computer 102 includes a speaker and microphone which are used as a speakerphone in place of the handset 124 for the user to perform voice communications with the third party subscriber.

Figure 8:
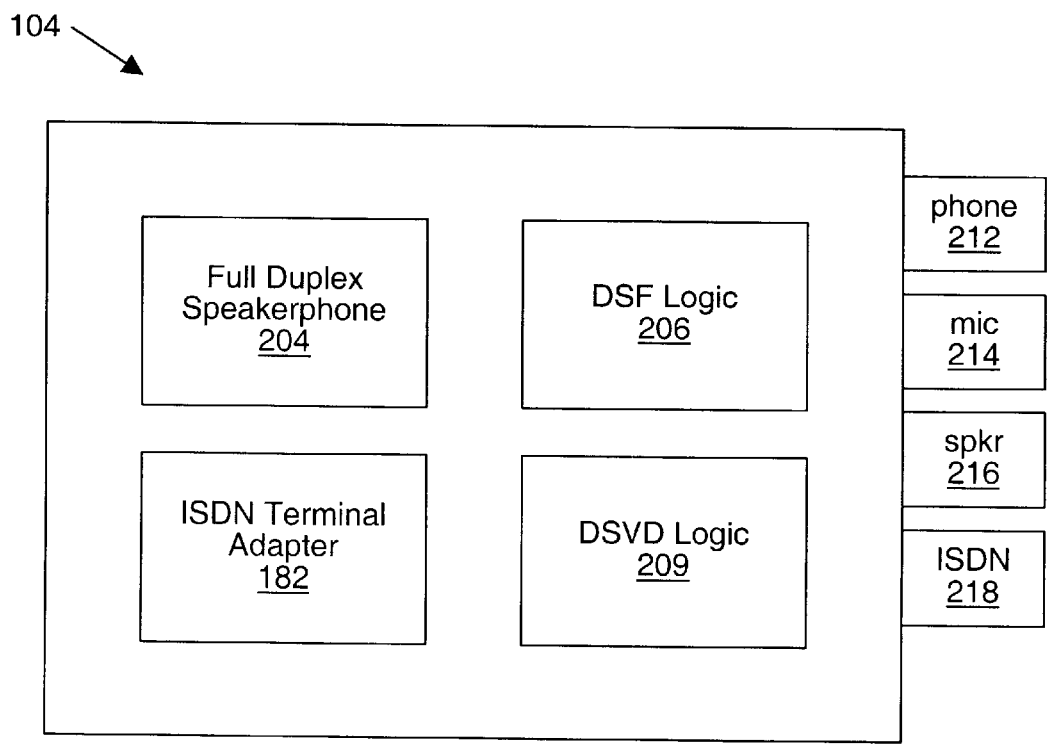

FIG. 8 illustrates an ISDN embodiment of the user telephony communication device 104, wherein the user telephony communication device 104 is adapted for ISDN capability. In this embodiment, the user telephony communication device 104 comprises an card ISDN terminal adapter (TA) 182 adapted for coupling to an ISDN line, i.e., which generates one or more 64 Kbps ISDN B channels. The ISDN terminal adapter 182 preferably includes logic for digitally encoding the voice signal, for example, performing 32 kilobyte analog to digital pulse code modulation (ADPCM). The ISDN user telephony communication device 104 preferably includes a full-duplex speakerphone 204, as well as digital simultaneous voice and data (DSVD) logic 209 for performing DSVD capabilities. The DSVD logic 209 preferably provides or multiplexes a plurality of data types on one or more ISDN B channels, including voice data, LAN data, fax data and telephony control data.

The ISDN user telephony communication device 104 also preferably includes digital simultaneous facsimile (DSF) logic 206 for performing DSF capabilities. The ISDN user telephony communication device 104 also preferably includes an external jack 218 for connecting to an ISDN line, one or more jacks 214 and 216 for an external microphone and speaker, respectively, one or more jacks for pass through of a microphone and speakers, such as to the computer sound system (not shown), and a jack 212 for connecting to an analog phone line.

It is noted that the user telephony communication devices 104 shown in FIGS. 7 and 8 are designed for telecommuters and road warriors. A BO server 160 used for a branch office is preferably similar to either the embodiments of FIGS. 10 and 11, but includes additional functionality for providing LAN access at the branch office and also providing local PBX extensions between the plurality of workers at the branch office, as discussed above, as well as additional inputs and outputs and communication devices.

Figure 8A:
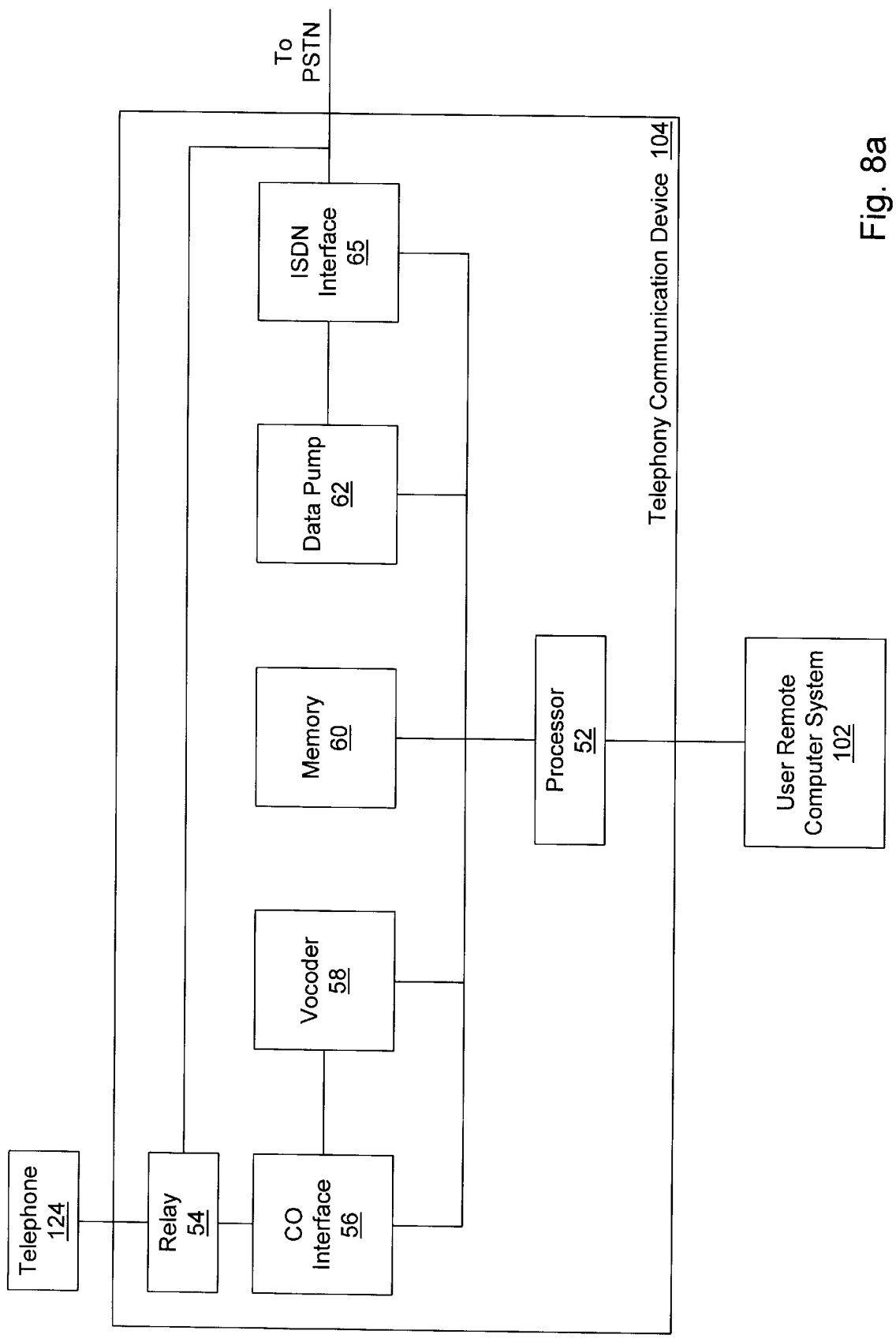

Referring now to FIG. 8a, a block diagram illustrating in more detail the telephony communication device 104 of FIG. 8 is shown. The user telephony communication device 104 of FIG. 8a is similar to the system of FIG. 7a and like elements are numbered identically for clarity and brevity. The telephony communication device 104 of FIG. 8a comprises an ISDN interface 65 for coupling to the PSTN to perform ISDN communications with the PSTN. Preferably, the ISDN interface 65 provides status information to the processor 52 regarding telephony signaling events. Similarly, the processor controls the ISDN interface 65 to perform telephony signaling actions.

Figure 8B:
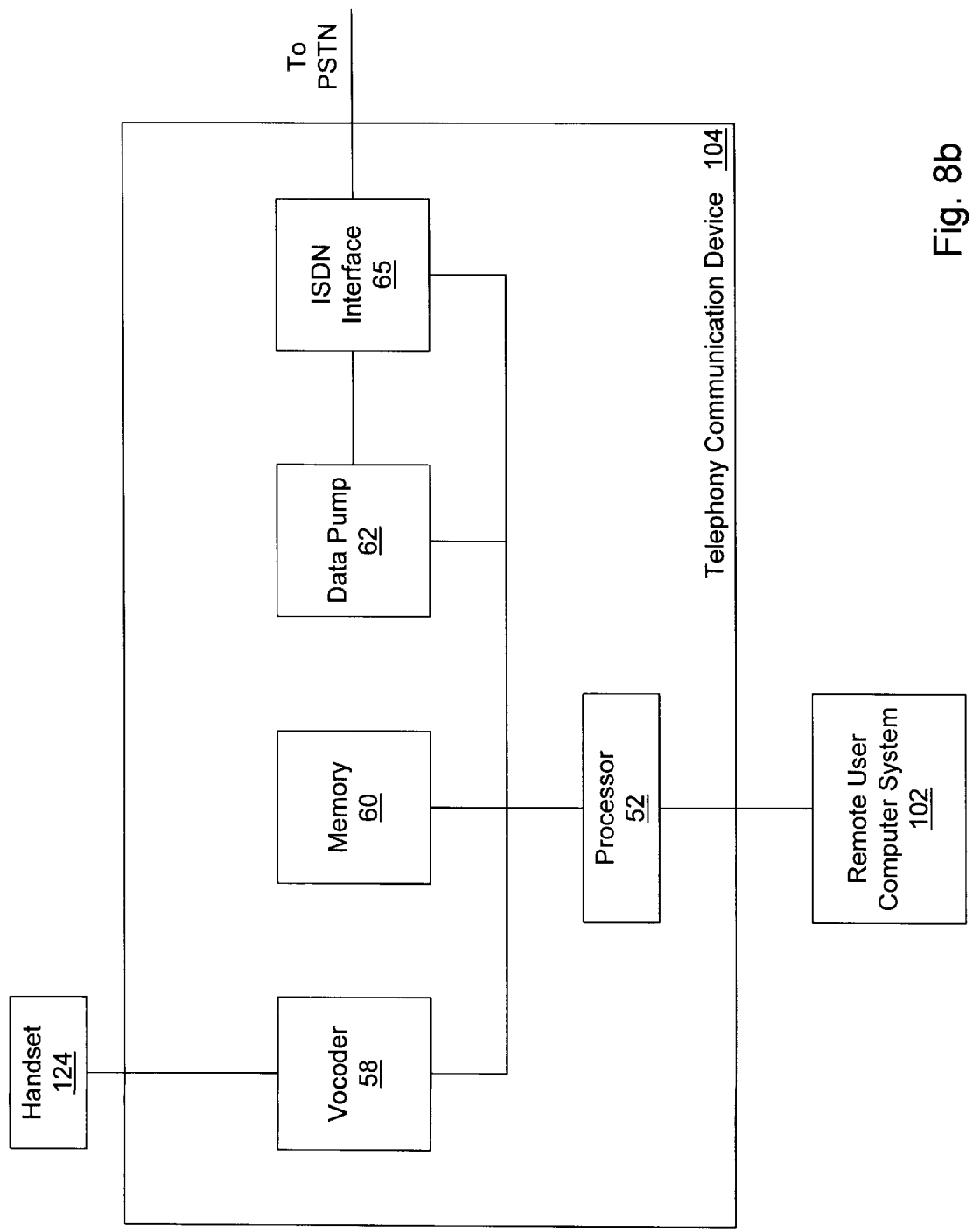

Referring now to FIG. 8b, a block diagram of an alternate embodiment of the user telephony communication device 104 is shown. The user telephony communication device 104 of FIG. 8b is similar to the system of FIG. 8a and like elements are numbered identically for clarity and brevity. Preferably, the telephony communication device 104 of FIG. 8b is adapted for coupling to a handset or headset 124 rather than a telephone as in FIG. 8a.

Figure 9:
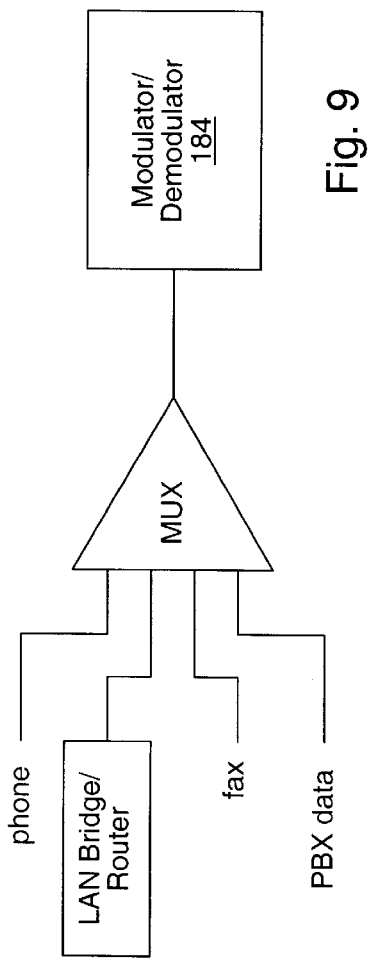
FIG. 9 illustrates a conceptual block diagram of the operation of the modem of FIG. 7.

FIG. 9 is a conceptual diagram illustrating the operation of the modem 184 of FIG. 7. As shown, the modem 184 is adapted for transmitting and/or receiving data having various different data types. For example, one or more of analog phone signals (voice), LAN data, fax data, telephony control data, and other data is provided through a multiplexer to the modem 184. The modem 184 preferably transmits the multiple data types over a single communication media, such as a telephone line. The modem 184 preferably statistically time division multiplexes the data on the phone line in individual packets for each data type. Thus the modem 184 creates a plurality of virtual channels on the single physical channel. The modem 184 also receives data of different data types from a phone line and intelligently distributes the data within the computer system.

Figure 10:
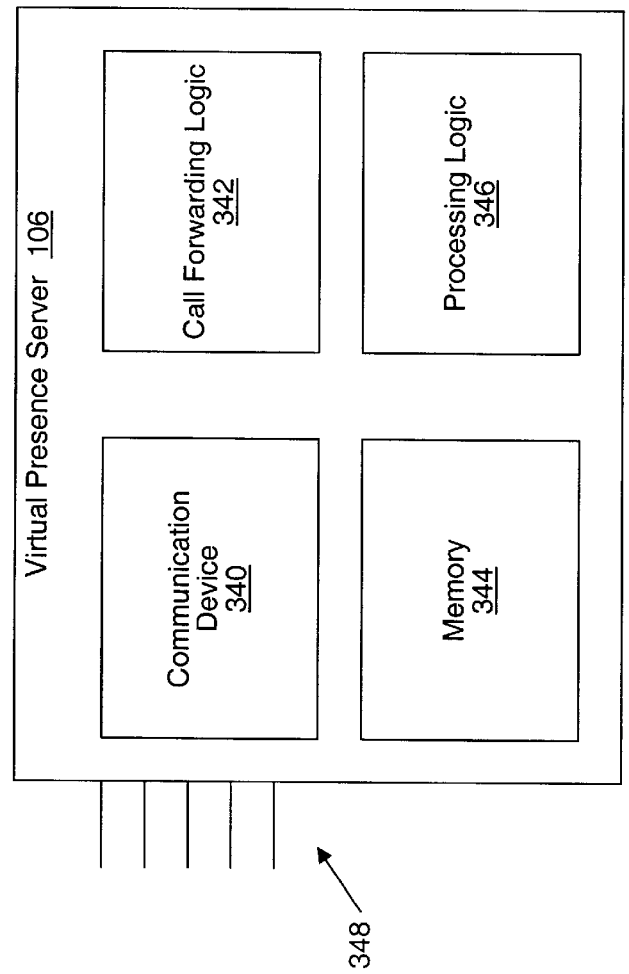
FIG. 10 is a block diagram of the virtual presence server of the preferred embodiment.

FIG. 10—Virtual Presence Server

The virtual presence server 106 preferably comprises a computer system which connects to the LAN 114 and which also connects to the corporate office PBX 112. The virtual presence server 106 preferably comprises a high performance computer system executing the Windows NT operating system. In other words, the virtual presence server 106 is preferably a Windows NT server. The virtual presence server 106 may also comprise a UNIX server or may execute other operating systems, as desired. The virtual presence server 106 preferably includes a plurality of communications interfaces, as shown in FIG. 2. In one embodiment, the virtual presence server 106 includes a plurality of modems 184 which correspond to a plurality of phone lines. The virtual presence server 106 also preferably includes one or more ISDN terminal adapters 182 which connect to a corresponding one or more phone lines. The virtual presence server 106 also preferably includes one or more T1 adapters 183 which connect to a corresponding one or more T1 lines.

The virtual presence server system 106 provides a remote user with a virtual presence to a data site or corporate office, wherein the data site or corporate office includes a first telephone number associated with the remote user which is used to access the remote user at the data site. The virtual presence server system comprises a plurality of inputs 348 for coupling to a transmission media. One or more of the plurality of inputs 348 receive communications from a user telephony communications device 104 operated by the remote user, wherein the user telephony communications device 104 is physically located remotely from the virtual presence server system 106.

Figure 10A:
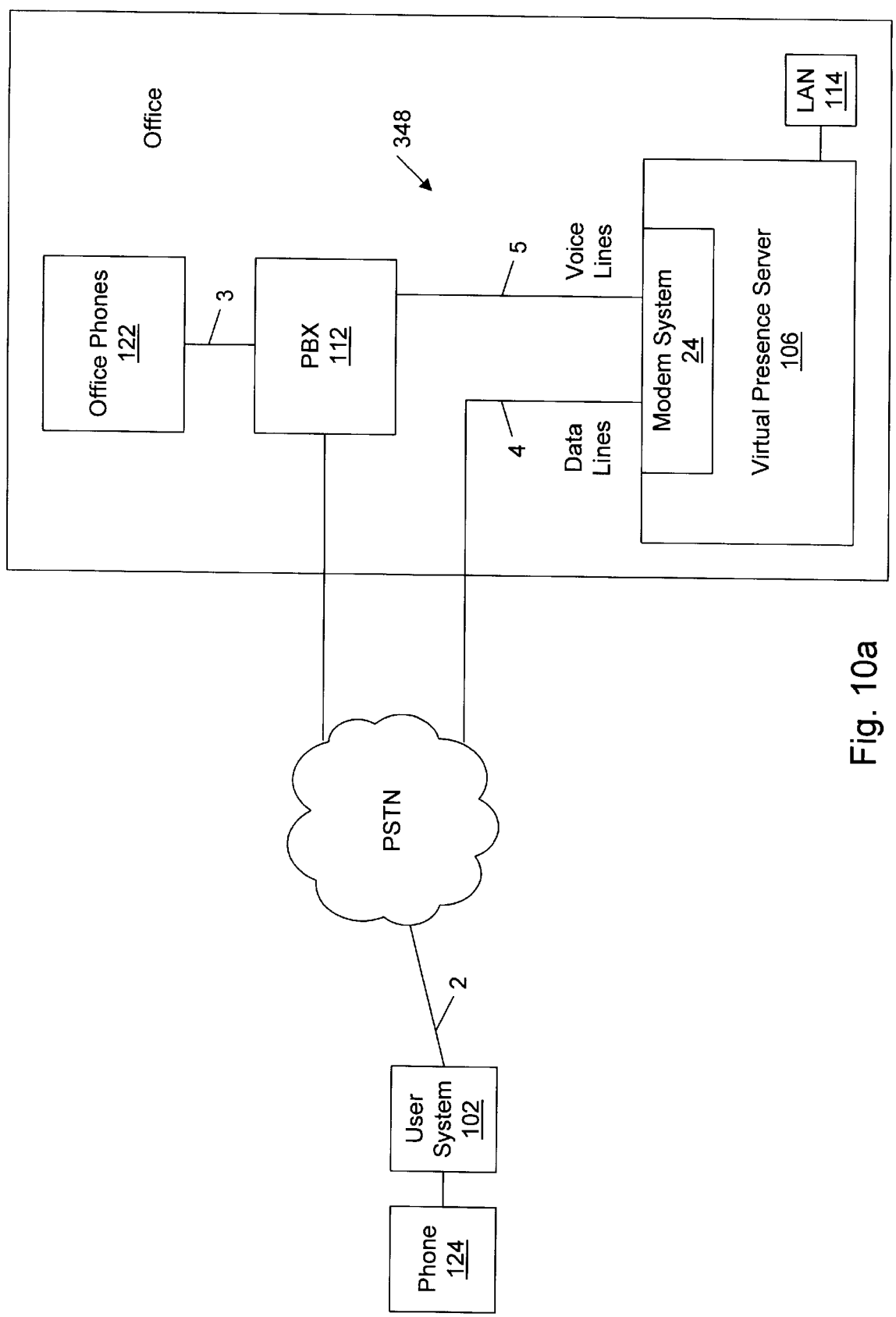
FIGS. 10a and 10b are block diagrams illustrating in more detail the inputs of the virtual presence server for coupling to the transmission media according to two embodiments.

Referring now to FIG. 10a, a block diagram illustrating in more detail the inputs 348 of the virtual presence server 106 for coupling to the transmission media is shown. The inputs 348 comprise data lines 4 or trunk lines 4 coupled to the PSTN and voice lines 5 or station lines 5 coupled to the PBX 112 and/or PSIN. The trunk lines 4 and station lines 5 also couple to the modems 184, ISDN terminal adapters 182, and/or T1 adapters 183 of FIG. 2 (referred to collectively as modem system 24). The voice lines 5 couple to the modem system 24 via voice ports of the modem system 24. The data lines 4 couple to the modem system 24 via data ports of the modem system 24. In the preferred embodiment, the trunk lines 4 and station lines 5 may be either of analog POTS lines or T1 lines. In another embodiment, the trunk lines 4 and/or the station lines 5 may be Integrated Services Digital Network (ISDN) lines. For simplicity a single one of the trunk lines 4 may be referred to as trunk line 4 and a single one of the station lines 5 may be referred to as station line 5.

Figure 10B:
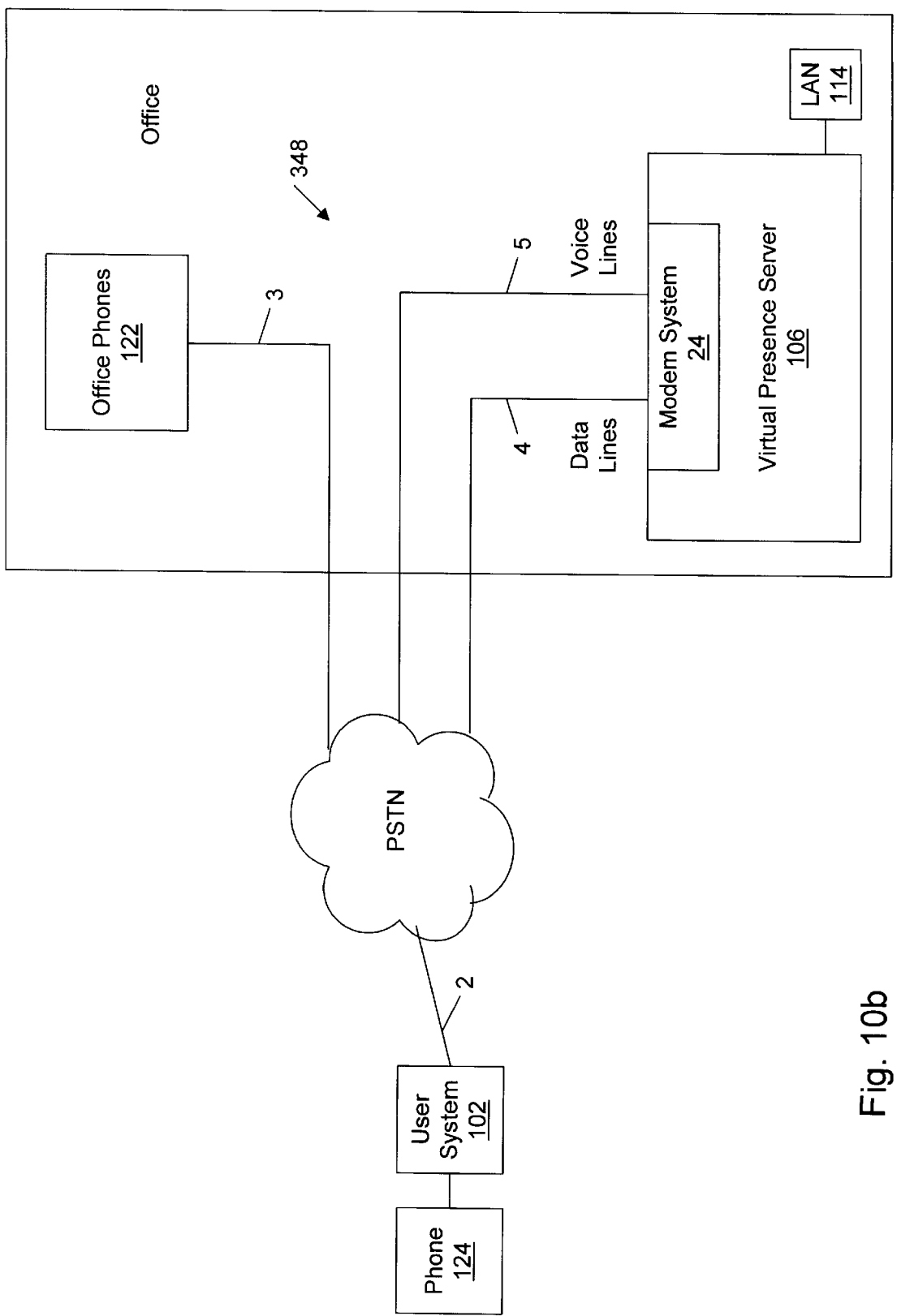

In an alternate embodiment, shown in FIG. 10b, the PBX 112, such as a Plexar® system, may be comprised in a Central Office (CO) of the PSTN rather than in the data site or remote office. Thus, the office telephones 122 are coupled directly to the 15 PSTN by telephone lines 3, and the station lines 5 are coupled directly to the PBX 112 in the PSTN.

Referring again to FIG. 10, the virtual presence server 106 includes a memory 344 for storing identification information received from the user telephony communications device 104. The virtual presence server 106 also includes a communication device 340 coupled to the memory 344 for providing voice and data information to the user telephony communications device 104. The virtual presence server 106 further includes processing logic 346 for accessing and verifying identification information received from the user telephony communications device 104, as well as other operations. The virtual presence server 106 further includes call forwarding logic 342 for performing remote call forwarding and/or remote access call forwarding operations using the identification information.

As discussed below, the virtual presence server 106 is operable to perform a remote call forwarding operation to forward telephone calls made to the first telephone number which are intended for the user at the data site. The remote access call forwarding operation directs the telephone calls made to the first telephone number to be forwarded to the virtual presence server 106. The virtual presence server 106 is operable to route the telephone calls to the first telephone number and forwarded to the virtual presence server 106 to the user telephony communications device 104. In other words, the user telephony communications device 104 includes a second telephone number which is usable to access the user telephony communications device 104, and the virtual presence server 106 is operable to forward or route telephone calls made to the first telephone number to the second telephone number.

In addition, where a second telephone number is used to access the user telephony communications device 104, the virtual presence server is operable to perform a remote access call forwarding operation to forward telephone calls made to the second telephone number which are intended for the user telephony communications device 104. The remote access call forwarding operation directs the telephone calls to the second telephone number to be forwarded to the first number at the data site and/or to the virtual presence server. The virtual presence server 106 is thus operable to receive telephone calls made to the second number and forwarded to the data site, and the virtual presence server 106 is operable to route the telephone calls made to the second telephone number and forwarded to the virtual presence server 106 to the user telephony communications device 104.

As shown in FIG. 2, and as discussed above, the system of the present invention in one embodiment includes a remote access server in addition to the virtual presence server 106. Alternatively, the system includes a bridge router in addition to the virtual presence server 106. In another embodiment, the system includes the remote access server and a bridge router in addition to the virtual presence server 106, depending on the capabilities of the user telephony communication devices 104 which contact the virtual presence server 106. In yet another embodiment, the virtual presence server 106 implements the remote access functionality. In one embodiment, the virtual presence server 106 is a SCSA (Signal Computing System Architecture) or MVIP call server in addition to acting as a virtual presence server.

Data Transfer Protocol

Figure 11A:
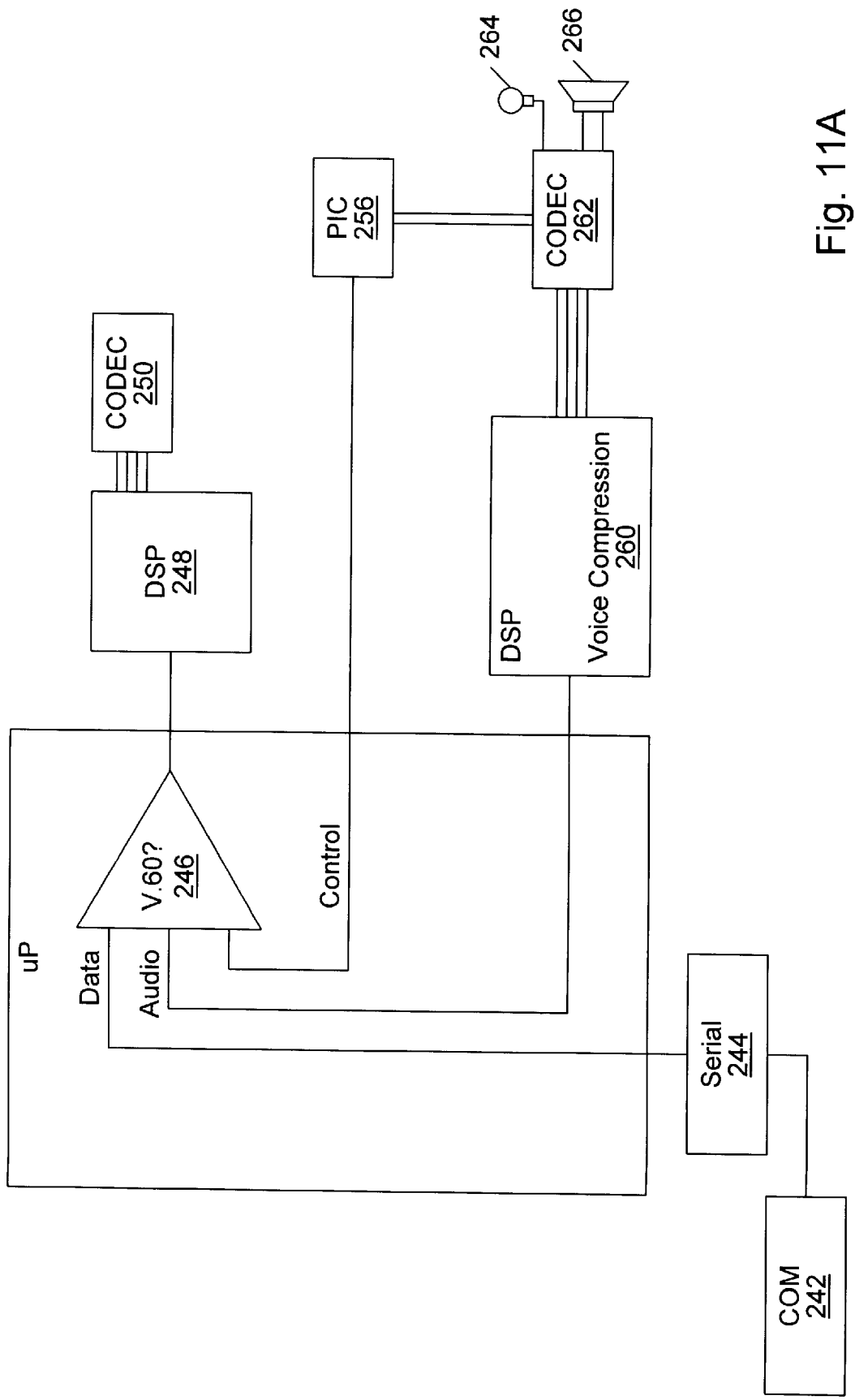
FIG. 11A illustrates a standard DSVD hardware model according to the prior art.

FIG. 11A illustrates a standard DSVD hardware model according to the prior art. As shown, the standard DSVD hardware model comprises a CPU executing software which performs a modem protocol, such as the V.42 protocol or the V.60 protocol. The CPU executing software is represented as a box which includes a V.60 block 246. The computer system includes a COM port 242 which provides data through a serializer 244 to the V.60 block 246. The CPU executing the V.60 protocol, i.e., the V.60 block 246, receives data from and provides data to the serial COM port 242. The computer system includes a microphone 264 and speakers 266 which provide analog audio data through a codec 262 to voice compression logic 260. The voice compression logic 260 provides compressed audio output to the V.60 block 246.

The DSVD modem includes a first phone jack 254 for connecting to an external communication mechanism, i.e., a phone line, and a second phone jack 258 for connecting to a telephone instrument. The second phone jack 258 connects to a phone interface controller (PIC) 256 which provides control data to the V.60 block 246. The V.60 block couples to a DSP 248 and then to a codec 250. The codec 250 and the PIC 256 connect to block 252 which then connects to phone jack 254. The phone jack 254 provides analog data output to an analog phone line and receives analog data from the phone line.

When the DSVD modem receives data from the phone line, the data is received by the phone jack 254 and is provided through the codec 250, the DSP 248, the V.60 block 246 and the serializer 244 to the COM port 242. The data received by the phone jack 254 is also provided through the PIC 256 to the telephone instrument 258. Data is also provided from either the COM port 242 or the telephone instrument jack 258 to the external phone jack 254 in an opposite manner.

Simultaneous voice and data (SVD) modems differ from standard modems in that they require multiple channels created between the two connected modems. SVD modems require a first channel to carry data and a second channel to carry voice. In one embodiment of the present invention, as discussed below, the modems comprised in the user telephony communication device 104 and in the virtual presence server 106 include first and second channels for data and voice, and a third channel between the modems for extending PBX interfaces.

Modem Architecture—Present Invention

Figure 11B:
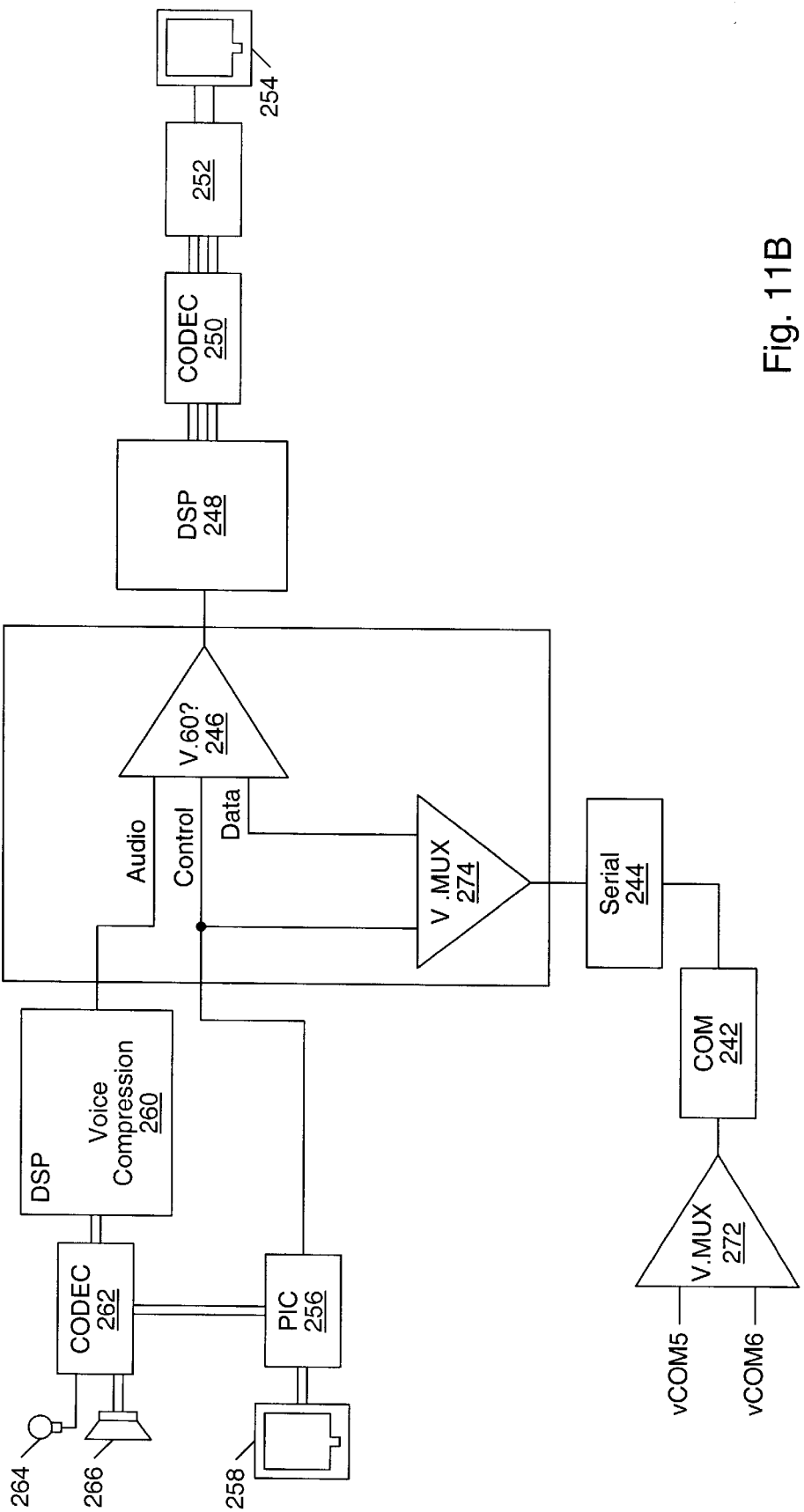
FIG. 11B illustrates a modem architecture according to the present invention.

FIG. 11B illustrates an architecture for the modem comprised in the user telephony communication device 104 according to one embodiment of the present invention. It is noted that the user telephony communication device 104 in the remote computer system 102 may comprise various types of communication devices, including modems and ISDN terminal adapters. The description below presumes that an analog modem is comprised in the user telephony communication device 104.

The present invention preferably maintains multiple virtual COM ports which interface to one or more real or physical COM ports. As shown, the present invention includes a CPU executing software which performs the V.60 protocol. The CPU also executes software which performs a virtual COM port multiplexing (V.MUX) function. The CPU executing software is represented as a box which includes a V.60 block 246 and a V.MUX block 274.

As shown the computer system implements multiple virtual COM ports which are provided to a single physical COM port 242. The COM port 242 connects to a serializer 244 which connects to a virtual COM port multiplexer 274 referred to as V.MUX. The V.MUX block 274 connects through a data path to the V.60 logic. The V.MUX block 274 also connects through a control path to the V.60 block and a phone interface controller 256. The CPU executing the V.60 protocol, i.e., the V.60 block 246, receives data from and provides data to the serial COM port 242.

The computer system includes a microphone 264 and speakers 266 which provide analog audio data through a codec 262 to voice compression logic 260. The voice compression logic 260 provides compressed audio output to the V.60 block 246. The codec 262 also connects to the PIC 256, which connects to a telephone instrument phone jack 258.

The modem includes a first phone jack 254 for connecting to an external communication mechanism, i.e., a phone line, and a second phone jack 258 for connecting to a telephone instrument. The second phone jack 258 connects to the phone interface controller (PIC) 256 which provides control data to the V.60 block 246. The V.60 block 246 couples to a DSP 248 and then to a codec 250. The codec 250 connects to block 252 which then connects to phone jack 254. The phone jack 254 receives and provides analog data output to an analog phone line. Thus, the V.60 block 246 receives data from a serial COM port 242 as well as control data from the PIC 256 and audio data from the voice compression logic.

When the modem receives data from the phone line, the data is received by the phone jack 254 and is provided through the codec 250, the DSP 248, the V.60 block 246 and the serializer 244 to the COM port 242. The data received by the phone jack 254 is also provided through the PIC 256 to the telephone instrument through the jack 258. Data is also provided from either the COM port 242 or the telephone instrument jack 258 to the external phone jack 254. When data is provided from the phone jack 254 to the COM port 242, the CPU multiplexes this data with other data streams which may be provided to the COM port 242, as represented by the V.MUX block 274. Thus the computer system creates multiple virtual COM ports or channels in software which share the single physical COM port. Likewise, when data is provided from the COM port 242 to the phone jack 254, the V.MUX block 272 multiplexes this data with other data streams from multiple virtual comports.

The present invention preferably includes a plurality of protocols, i.e., two or more protocols, which connect the virtual presence server 106 and the remote computer system 102. The preferred embodiment preferably creates three channels between the virtual presence server 106 and the remote computer system 102 to allow data and voice transmissions, as well as the transfer of telephony control data, i.e., PBX extension data. Thus the third channel is reserved for telephony control data between the virtual presence server 106 and the remote computer system 102.

DSVD is currently defined to support a protocol that simultaneously carries voice and carries data at the same time. G.dsvd defines two channels of voice and data. A standard referred to as T-120 includes a virtually unlimited number of self creating logical channels and a standard referred to as H-124 includes 20 or more channels. Thus the preferred embodiment uses the T-120 standard to allow three or more channels between the virtual presence server and the remote computer system. In an alternate embodiment, the data channel runs a network protocol such as NETBEUI, IPX, or TCP/IP, which provides a plurality of logical channels, one of which serves as the telephony control channel Therefore, the present invention creates multiple logical channels between two modems over a single analog line, preferably using time multiplexing techniques. The present invention also creates multiple channels between the modem and the PC itself using multiple virtual COM ports which interface to a single physical COM port.

Thus, multiple channels are created between the remote computer system and the virtual presence server. In one embodiment, the method creates multiple COM port addresses and COM drivers. Currently, when a software application uses or takes control of a modem, the modem is not available for other software applications. Thus the present invention creates a plurality of virtual COM ports. This allows software applications to use virtual COM ports and thus effectively share a single physical COM port.

When a software application makes a call which requests a modem, virtual corn port software executing on the remote computer system 102 determines if the software application should be granted access to a virtual COM port of the modem. It is noted that the COM port is not required to be a real COM port. These plurality of virtual COM ports preferably each reference a channel in the communication line. If access is allowed, then the application is allowed a channel on the communication mechanism. The V.MUX block 272 multiplexes these data accesses to the physical COM port 272.

Under Windows, Windows NT, UNIX, and other modern operating systems, the present invention creates multiple virtual software COM ports with no hardware implications. In an alternate embodiment, the computer system includes multiple physical hardware COM ports.

The protocol of the present invention operates to extend the PBX features to the remote users, as well as manage the PBX features used by the remote users. The present invention also combines voice and data transmissions. The combined voice and data transmissions are preferably very compressed. Alternatively, the combined voice and data transmissions are "spoofed" to remove extraneous or unneeded data traffic, i.e., maintenance and handshaking traffic.

User Telephony Communication Device—Software

The remote computer system or communication device 102 includes software which interfaces to the user telephony communication device 104 in the remote computer system 102 which allows remote access and virtual presence to the corporate office according to the present invention. The virtual presence software of the present invention preferably resides on the hard disk drive of the computer system 102 and is loaded into system memory during use. The virtual presence software preferably executes in the background of other applications as one or more device drivers, i.e. one or more network drivers. For example, the virtual presence software may comprise a suite of drivers, including a virtual presence protocol driver and a virtual phone application.

The remote computer system 102 preferably uses a virtual network protocol (VNP) to perform a plurality of activities simultaneously. Thus, the remote computer system 102 can automatically connect to the corporate office on an as needed basis.

The user telephony communication device 104 in the remote computer system includes transparent access capabilities to the corporate office LAN 114 as a remote LAN node (RLN). The remote computer system 102 preferably includes NDIS and/or ODI drivers for Microsoft and Novell local area networks.

The remote computer system 102 also preferably includes transparent access capability to the corporate office telephone system or PBX I 12 as an extension telephone set. As mentioned above, the computer system 102 preferably includes an external telephone instrument which connects through the computer system to the user telephony communication device 104. Alternatively, or additionally, software executing on the remote computer system implements a virtual phone on the computer screen, as desired. The external telephone set is preferably used in situations where privacy is desired.

The user telephony communication device 104 according to the present invention also provides the remote user with transparent access capability to the corporate office telephone system for faxing capabilities. Thus, data is transferred from the remote computer system to the corporate office telephone system and a fax protocol is applied to the data when the data is received at the corporate office, i.e. the data is locally modulated and demodulated depending upon the direction of the facsimile transmission.

FIGS. 12—Virtual Presence Server Modem System Block Diagrams

FIGS. 12*a* to 12*e* illustrate various embodiments of the server modem system 24 of FIG. 10*b*, i.e., the various modems and adapters 182, 183 and 184 of FIG. 2 referred to collectively as modem system 24. Various elements of the various embodiments of the modem system 24 are similar and therefore similar elements are numbered identically for clarity and simplicity. The primary differences between the embodiments relate to the interfaces employed between the modem system 24 and the PSTN and/or PBX 112. In particular, embodiments for at least two different interfaces employed described: analog telephone line interfaces and digital interfaces. In particular, T1 digital interface embodiments are described. However, ISDN, DDS or other digital telephony interfaces may be employed as desired. FIGS. 12a to 12e describe embodiments with various combinations of analog line and T1 interfaces for interfacing to the PSTN and/or PBX 112. Various elements of the telephony communication device 104, such as the SLT interface 64, the data pump 62, the vocoder 58, the memory 60 and the processor 52 are similar to elements comprised in the modem system 24 as will be described below.

The modem 24 system is described below with the assumption for illustration purposes that the telephony communication device 104 comprises an analog line interface with the PSTN. However, as discussed above, the telephony communication device 104 may employ various digital interfaces with the PSTN in addition to analog interfaces.

Figure 12A:
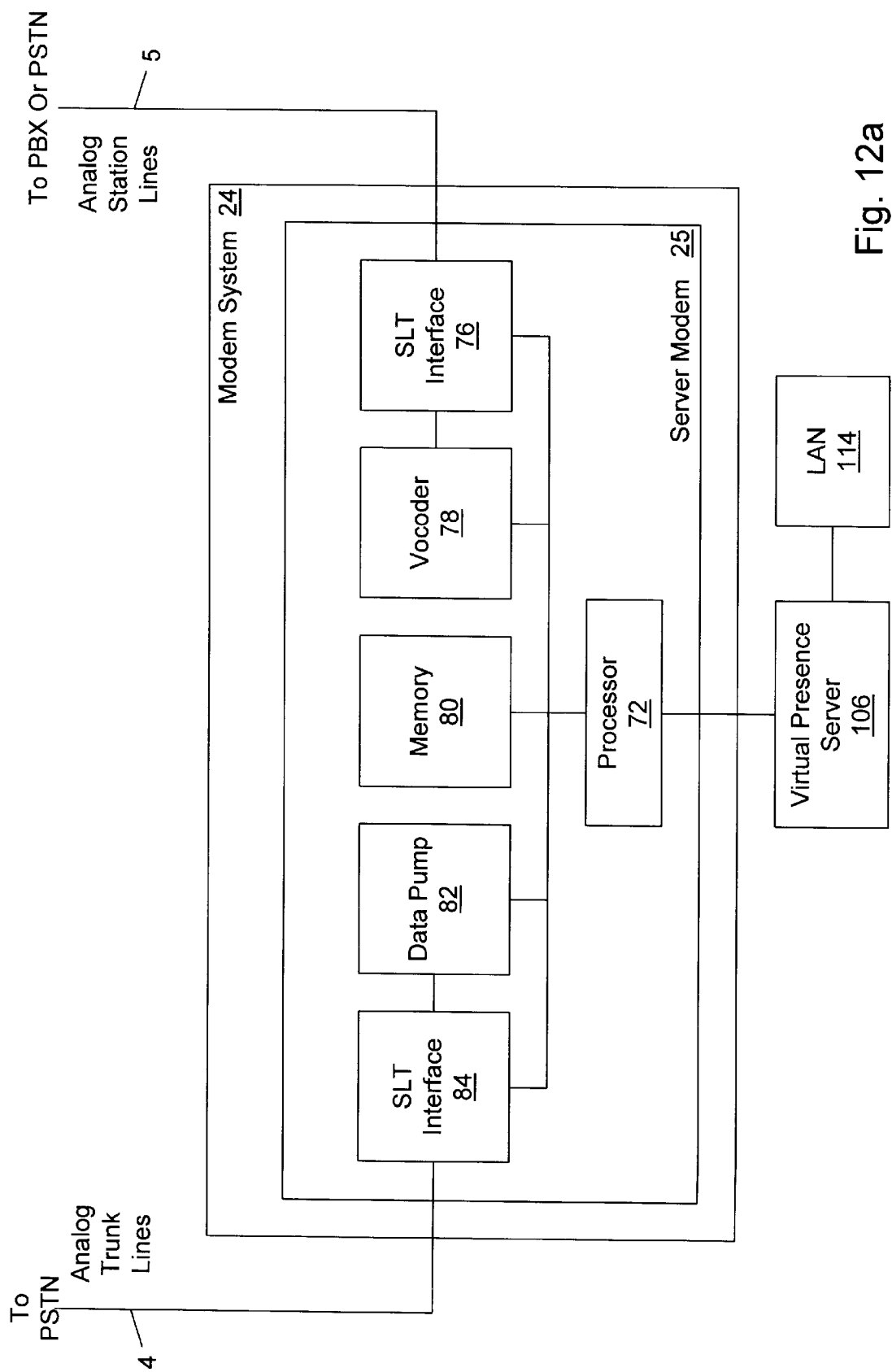
FIGS. 12a through 12e are block diagrams of different embodiments of the server modem system of FIG. 10a or 10b.

In the embodiment of FIG. 12a, the modem system 24 comprises a BeThere!® Personal Multiplexer (PX) manufactured by Data Race, Inc., similar to the PX comprised in the telephony communication device 104 as described above with reference to FIGS. 8a and 8b. The BeThere! Personal Multiplexer of FIG. 12a, however, is configured for operation in the virtual presence server 106 rather than in the user computer 102. In particular, the voice port of the PX of FIG. 12a is configured for coupling to the PBX 112 rather than to a telephone instrument 124 as in FIGS. 8a and 8b.

BeThere! software executing on the virtual presence server 106, referred to as BeThere! server software, operates to control the modem system 24 to perform various functions as will be described below. The BeThere! server software will be described in more detail below. Preferably, the modem system 24 and the virtual presence server 106 communicate over an expansion bus or via an I/O port of the virtual presence server 106. Preferably, the modem system 24 comprises status and control registers accessible by the virtual presence server 106 via I/O-mapped or memory-mapped addresses. Preferably, the modem system 24 further comprises memory storage, such as RAM (Random Access Memory), which is accessible by the virtual presence server 106 via memory-mapped addresses. The virtual presence server 106 reads and writes the status and control registers and memory to control the modem system 24. Furthermore, the modem system 24 generates one or more interrupt request signals to the virtual presence server 106 to notify the virtual presence server 106 of events. Examples of the events are the reception of telephony control messages or signals, and the reception of data.

Referring now to FIG. 12a, a block diagram of one embodiment of the server modem system 24 of FIG. 10a or 10b is shown. The modem system 24 of FIG. 12a comprises one or more modems 25 for interfacing with the PBX 112 and PSTN via two analog telephone interfaces per modem, as shown. The modem 25 comprises a first single line telephone (SLT) interface 84 for coupling to the PSTN via trunk line 4 and a second SLT interface 76 for coupling to the PBX 112 via station line 5. Modulated analog data signals are exchanged between the modem 25 and the user computer 102 on trunk line 4 via first SLT interface 84. The modulated data signals comprise multiplexed voice, data, fax and control information as described above. Analog voice signals are transferred between a third party subscriber and the telephone 124 on station line 5 via the SLT interface 76. SLT interfaces 76 and 84 will be described in more detail below with respect to FIG. 14.

The modem 25 further comprises a processor 72 coupled to a memory 80, a vocoder 78, a data pump 82, the SLT interface 84 and the SLT interface 76. The processor 72, memory 80, vocoder 78 and data pump 82 are similar to the processor 52, memory 60, vocoder 58 and data pump 62, respectively, of FIG. 8.

During operation of the modem 25, the data pump 82 receives modulated analog data signals from the trunk line 4 transmitted by the telephony communication device 104. The data pump 82 demodulates the analog data signals into digital data. The processor 72 receives the data and determines the type of data received. The processor 72 forwards the data containing user data such as Internet data, for example, or fax data to the virtual presence server 106. The data may be forwarded to the LAN 30 to other computers in the office. The processor 72 forwards the voice data to the vocoder 78. The vocoder 78 decompresses the compressed speech data and converts the decompressed speech into analog voice signals, which are provided to the PBX 112 on station line 5. The voice signals are forwarded by the PBX 112 and/or PSTN to the third party subscriber. The third party subscriber may be located within the office, in another part of the city, or in another state or country.

Preferably, the processor 72 notifies the BeThere! server software of the reception of various telephony control messages, such as messages to generate on/off hook conditions on the station line 5 or trunk line 4, or to perform PBX control functions such as transfer a call or put a call on hold. Preferably, the processor 72 also notifies the BeThere! server software of the detection of various telephony events, such as detection of on/off hook conditions on the station line 5 or trunk line 4 or detection of ringing signals on the station line 5 or trunk line 4.

Conversely, voice signals are forwarded by the PBX 112 from the third party subscriber to the modem 25 voice port. The vocoder 78 receives the voice signals and compresses the voice signals into voice data. The processor 72 receives the voice data from the vocoder 78 and multiplexes the voice data with user and fax data received from the virtual presence server 106 and with telephony control messages. The data may be received by the virtual presence server 106 from other computers in the office via the LAN 30. The multiplexed data is provided to the data pump 82 which modulates the data into analog data signals for transmission on the trunk line 4 to the telephony communication device 104.

Preferably, the processor 72 sends control messages to the telephony communication device 104 in response to commands from the BeThere! server software. An example of a control message is one which instructs the telephony communication device 104 to ring the telephone 124. Preferably, the BeThere! server software also sends commands to the processor 72 to perform various telephony actions, such as to generate on/off hook conditions on the station line 5 or trunk line 4.

Although only a single modem 25 is shown in FIG. 12a, preferably, the modem system 24 comprises a plurality of the modem 25 shown in FIG. 12a. Preferably, the virtual presence server 106 comprises multiple expansion bus slots for coupling to multiple modems 25 of FIG. 12a. In one embodiment, the modem system 24 comprises up to sixteen PX modems 25. Preferably, the plurality of trunk lines 4 are configured as a hunt group. Preferably, the user computer 102 calls a telephone number associated with the hunt group, and the PSTN rotors the call to the first non-busy modem in the modem system 24 on one of the trunk lines 4.

Thus, the modem system 24 enables the user computer 102 to perform data communications with the virtual presence server 106 and office LAN 30 while simultaneously performing voice communications with a third party subscriber. This simultaneous voice and data communications is performed on a single telephone line 2 to the user premises, thereby saving the user the cost of installing and maintaining a second telephone line. Furthermore, the user enjoys a virtual presence as if in the office even though the user is remotely located from the office, such as in his home. That is, the user may place and receive telephone calls as if present in the office and use the features of the office PBX 112.

Figure 12B:
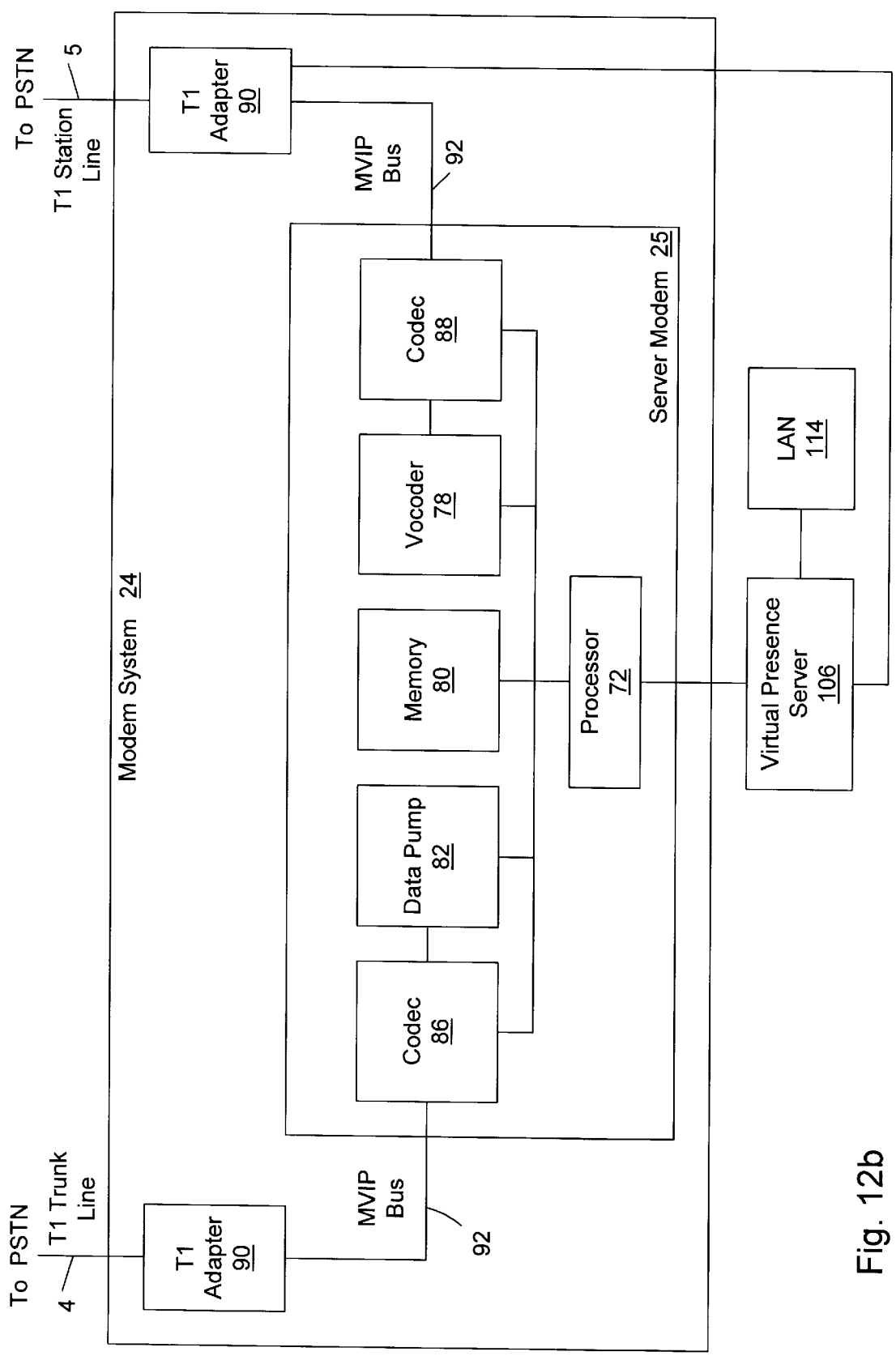

Referring now to FIG. 12*b*, a block diagram of another embodiment of the server modem system 24 of FIG. 10*a* or 10*b* is shown. Various elements of the modem system 24 of FIG. 12*b* are similar to those of the modem system 24 of FIG. 12*a* and corresponding elements are numbered identically for clarity and simplicity. The modem system 24 of FIG. 12*b* comprises an embodiment for interfacing with the PSTN via two T1 interfaces as shown. The modem system 24 comprises a T1 adapter 90 which couples to the PSTN via T1 trunk line 4 and station line 5. The T1 adapter 90 is further coupled to a plurality of modems 25 by an Multi-Vendor Integration Protocol (MVIP) bus 92. MVIP bus 92 conforms substantially to the MVIP-90 Standard Release 1.1 of October 1994, which is hereby incorporated by reference in its entirety as though fully set forth herein.

The T1 adapter 90 comprises a device capable of subdividing a 1.544 Mbit/second digital T1 connection into 24 separate digital channels. T1 adapters are well known in the art of digital telephony. In one embodiment, the T1 adapter 90 is capable of servicing two T1 lines of 24 channels each. In the preferred embodiment, the T1 adapter 90 couples to the virtual presence server 106 via an expansion bus slot, such as an Industry Standard Architecture (USA) slot or Peripheral Component Interconnect (PCI) slot. Thus, the BeThere! server software is operable to communicate with the T1 adapter 90. For example, the T1 adapter 90 communicates the reception of telephony signaling information or bits, such as ring detection and on/off hook detection, to the virtual presence server 106 via the virtual presence server 106 expansion bus. Conversely, the virtual presence server 106 commands the T1 adapter 90 to generate telephony signaling bits, such as ring generation and on/off hook condition generation, via the virtual presence server 106 expansion bus. In one embodiment, the T1 adapter 90 comprises a PRI-ISALC-2T T1 adapter manufactured by the Xircom® corporation.

The MVIP bus 92 comprises an 8-channel bus for transferring digital data between devices at high speeds. Preferably, one channel of the MVIP bus 92 is used to transfer data between the T1 adapter 90 and a codec 88 coupled to vocoder 78. A second channel of the MVIP bus 92 is used to transfer data between the T1 adapter 90 and a second codec 86 coupled to data pump 82. MVIP buses are well known in the art of digital telephony.

Although a single modem 25 is shown, preferably multiple of the modems 25 are comprised within one or more circuit board devices for coupling to the virtual presence server 106. In one embodiment, eight of the modems 25 are comprised in a given device. In one embodiment, the T1 adapter 90 is capable of servicing two T1 lines, that is, two lines of 24 channels each. Thus, preferably, three such eight modem devices may couple to a single T1 adapter 90. That is 24 channels may be transceived on the MVIP 92 between the T1 adapter 90 and 24 codecs 86, and 24 channels may be transceived on the MVIP 92 between the T1 adapter 90 and 24 codecs 88. Preferably, appropriate elements are shared among the multiple modems.

The modem 25 comprises a data pump 82 coupled to codec 86 and processor 72. The modem 25 further comprises a vocoder 78 coupled to codec 88 and processor 72. Codec 86 and codec 88 operate to convert digital signals received from the MVIP bus 92 into analog signals provided to the data pump 82 and vocoder 78, respectively. Additionally, codec 86 and codec 88 operate to convert analog signals received from the data pump 82 and vocoder 78, respectively, into digital signals provided to the MVIP bus 92.

During operation, the telephony communication device 104 transmits a stream of analog signals modulated with digital data on the telephone line 2 as described above. A T1 switch in the PSTN converts the modulated analog signals into digital signals. The T1 switch combines the digital signals associated with the telephony communication device 104 with up to 23 other streams or channels of digital signals and transmits the 24 channels of digital signals to the T1 adapter 90. The T1 adapter 90 forwards the digital signals on the MVIP bus 92 to the modems 25. The digital signals of the 24 channels are transmitted by the T1 adapter in a time-multiplexed manner on the MVIP bus 92. The codec 86 of each modem receives the digital data associated with its channel according to its respective time slice.

The codec 86 converts the digital signal into an analog signal, that is, a reproduction of the modulated analog signal originally sent by the telephony communication device 104. The data pump 82 receives the modulated analog signal and converts the analog signal into digital data. The processor 72 receives the digital data, which comprises voice, user data, fax data and control data as described above. The processor 72 forwards the user and fax data to the virtual presence server 106. The processor 72 notifies the BeThere! server software of the reception of control messages. In one embodiment, the codec 86 is not present and the data pump 82 is capable of receiving the digital signals from the T1 adapter 90, thereby eliminating the need to convert the digital signals to analog and then convert the analog signals back into digital signals.

The processor 72 forwards the compressed voice data to the vocoder 78. The vocoder 78 decompresses the compressed speech and converts the decompressed speech into analog voice signals. The codec 88 receives the analog voice signals and converts the analog voice signals to digital voice signals. The digital voice signals are digital reproductions of the user's speech from the telephone 124. The codec 88 provides the digital voice signals on the MVIP bus 92 to the T1 adapter 90. Each of the codecs 88 provides respective digital data to the T1 adapter 90 in a time-multiplexed manner according to the MVIP bus specification.

The T1 adapter 90 receives the 24 channels of multiplexed digital data from the codecs 88 and forwards the digital data on T1 station line 5 to the PBX 112. A T1 switch in the PSIN receives the digital data channels and separates the channels into individual streams or signals. The signals are then routed to the third party subscriber and the third party subscriber hears the speech generated by the user on the telephone 124.

Conversely, the T1 adapter 90 receives digital voice signals from the PBX 112 on the T1 station line 5 including speech from the third party subscriber. The T1 adapter 90 forwards the digital signals on the MVIP bus 92 to the codecs 88. Each respective codec 88 receives its respective digital data from the MVIP bus 92 according to its respective time slice. The codec 88 converts the digital voice data into an analog speech signal. The vocoder 78 receives the analog speech signal and converts the analog speech signal into a digital speech signal and compresses the digital speech signal into compressed speech. The processor 72 receives the compressed speech and multiplexes the compressed speech with user and/or fax data received from the virtual presence server 106 and with telephony control data. An example of a control message is one which instructs the telephony communication device 104 to ring the telephone 124. Preferably, the processor 72 sends control messages to the telephony communication device 104 in response to commands from the BeThere! server software.

The data pump 82 receives the multiplexed digital data stream created by the processor 72 and modulates the digital data stream into a modulated analog signal. The modulated analog signal is converted into a digital signal by the codec 86. The codec 86 forwards the digital signal on the MVIP bus 92 to the T1 adapter 90 during the appropriate time slice. The T1 adapter 90 combines the digital signals of the multiple modems 25 of the modem system 24 and transmits the combined channels to the PSTN on the T1 trunk line 4. A T1 switch in the PSTN separates out the 24 channels received on line 4. The channel which includes the speech from the third party subscriber, and which includes the user and/or fax data from the virtual presence server 106 for the telephony communication device 104, and which includes control signals for the telephony communication device 104, is converted to a modulated analog signal. The modulated analog signal is forwarded by the PSTN on line 2 to the telephony communication device 104. The voice included in the compressed speech data is reproduced on the telephone 124 for the user. The user and/or fax data are forwarded to the user computer 102. The telephony communication device 104 performs appropriate control actions, such as ringing the telephone 124, in response to the control messages.

Figure 12C:
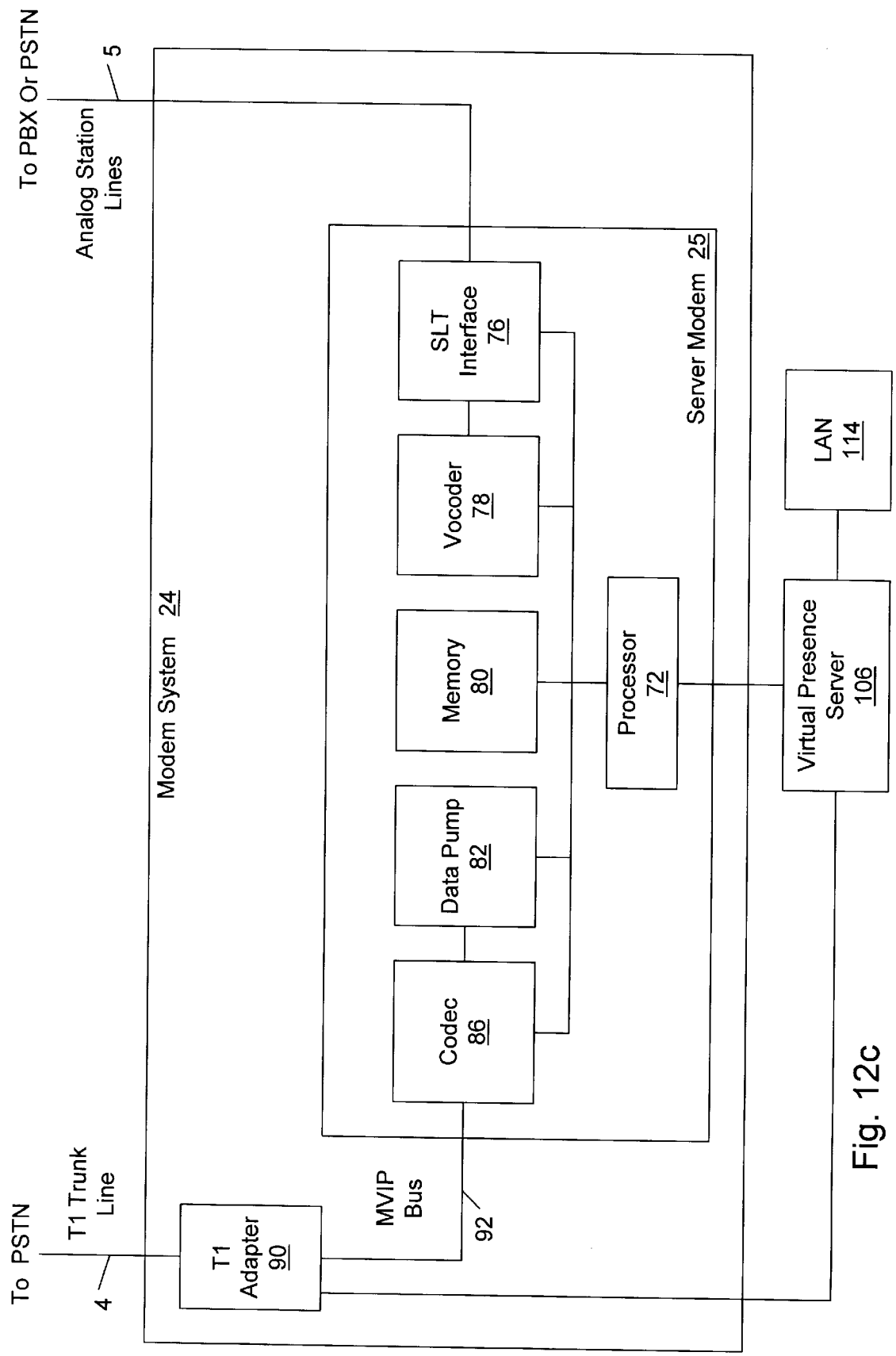

Referring now to FIG. 12*c*, a block diagram of another embodiment of the server modem system 24 of FIG. 10*a* or 10*b* is shown. Various elements of the modem system 24 of FIG. 12*c* are similar to those of the modem system 24 of FIG. 12*a* and FIG. 12*b* and corresponding elements are numbered identically for clarity and simplicity. The modem system 24 of FIG. 12*c* comprises an embodiment for interfacing with the PBX 112 via a T1 trunk line 4 and via analog station lines 5 as shown. The modem system 24 comprises a T1 adapter 90 coupled to a plurality of modems 25 by an MVIP bus 92.

The T1 adapter 90, codec 86, data pump 82 and processor 72 function similarly to the corresponding portion of the modem system 24 of FIG. 12*b*. That is, the modem system 24 receives digital data on the T1 trunk line 4 which includes voice, user and/or fax data, and control data from the telephony communication device 104. The modem system 24 demultiplexes the digital data and provides the data to the processor 72. The processor 72 forwards the user and/or fax data to the virtual presence server 106, forwards the voice data to the vocoder 78, and performs control actions in response to the control messages. Likewise, the SLT interface 76, vocoder 78 and processor 72 function similarly to the corresponding portion of the modem system 24 of FIG. 12*a*. That is, the compressed speech is converted to analog speech signals which are transmitted on the analog station lines 5 for transmission to the third party user.

As with the modem system 24 of FIG. 12*b*, preferably, the modem system 24 comprises a plurality of modems 25. In one embodiment, the modem system 24 comprises three devices each including eight modems 25 for servicing one T1 line and 24 analog station lines.

Figure 12D:
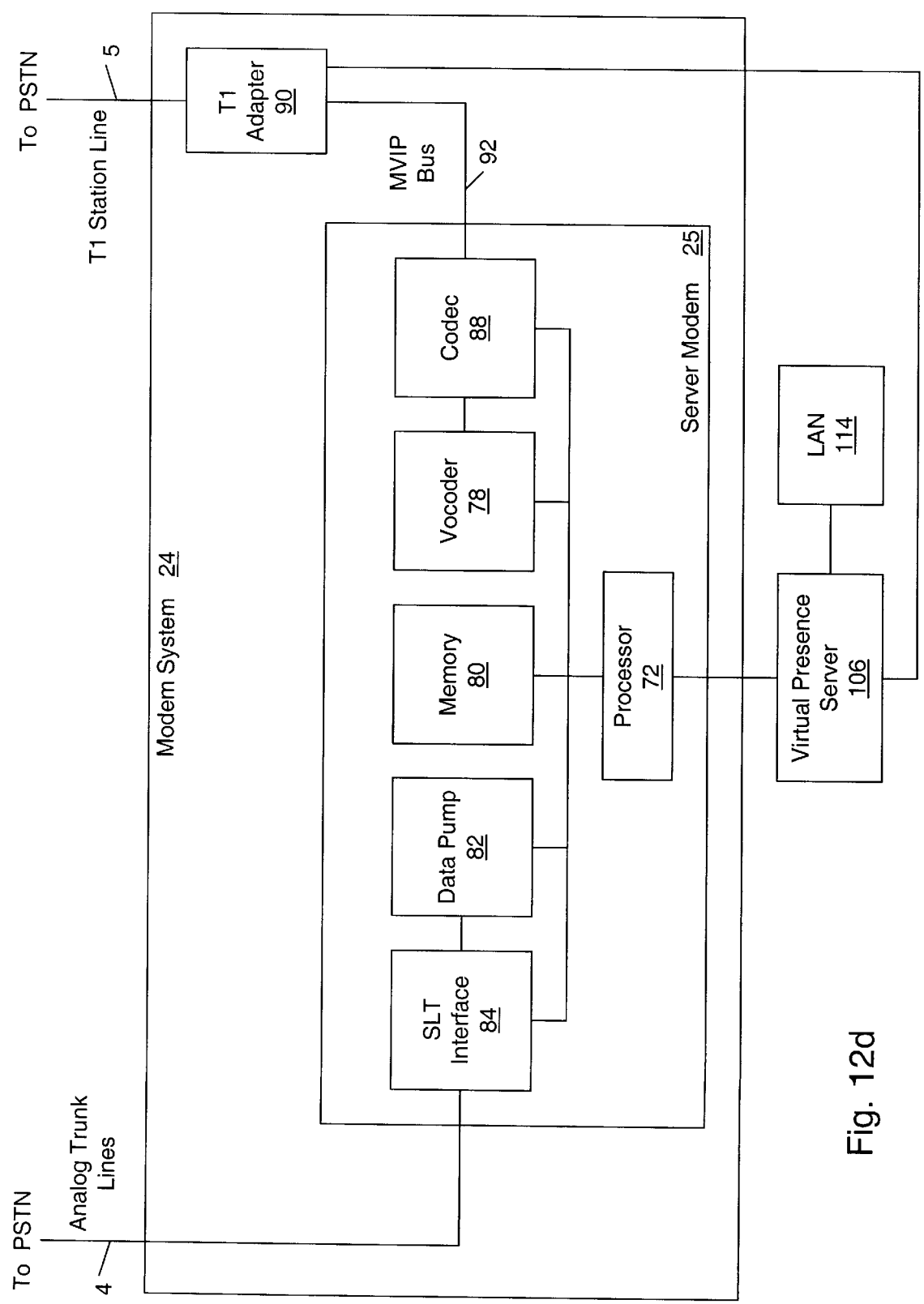

Referring now to FIG. 12*d*, a block diagram of another embodiment of the server modem system 24 of FIG. 10*a* or 10*b* is shown. Various elements of the modem system 24 of FIG. 12*d* are similar to those of the modem system 24 of FIG. 12*a* and FIG. 12*b* and corresponding elements are numbered identically for clarity and simplicity. The modem system 24 of FIG. 12*d* comprises an embodiment for interfacing with the PSTN via a T1 station line 5 and via analog trunk lines 4 as shown. The modem system 24 comprises a T1 adapter 90 coupled to a plurality of modems 25 by an MVIP bus 92.

The SLT interface 76, data pump 82 and processor 72 function similarly to the corresponding portion of the modem system 24 of FIG. 12*a*. That is, the modem system 24 receives modulated analog data signals on the analog trunk lines 4 which includes voice, user and/or fax data and control information from the telephony communication device 104 and converts the information into data for provision to the processor 72. The processor 72 forwards the user and/or fax data to the virtual presence server 106, forwards the voice data to the vocoder 78, and performs control actions in response to the control messages. Likewise, vocoder 78, codec 88, T1 adapter 90 and processor 72 function similarly to the corresponding portion of the modem system 24 of FIG. 12*b*. That is, the compressed speech is converted to analog speech signals, which are in turn converted into digital signals for provision on the T1 station line 5 to the PSTN for transmission to the third party user.

As with the modem system 24 of FIG. 12*b*, preferably, the modem system 24 comprises a plurality of modems 25. In one embodiment, the modem system 24 comprises three devices each including eight modems 25 for servicing one T1 line and 24 analog station lines.

Figure 12E:
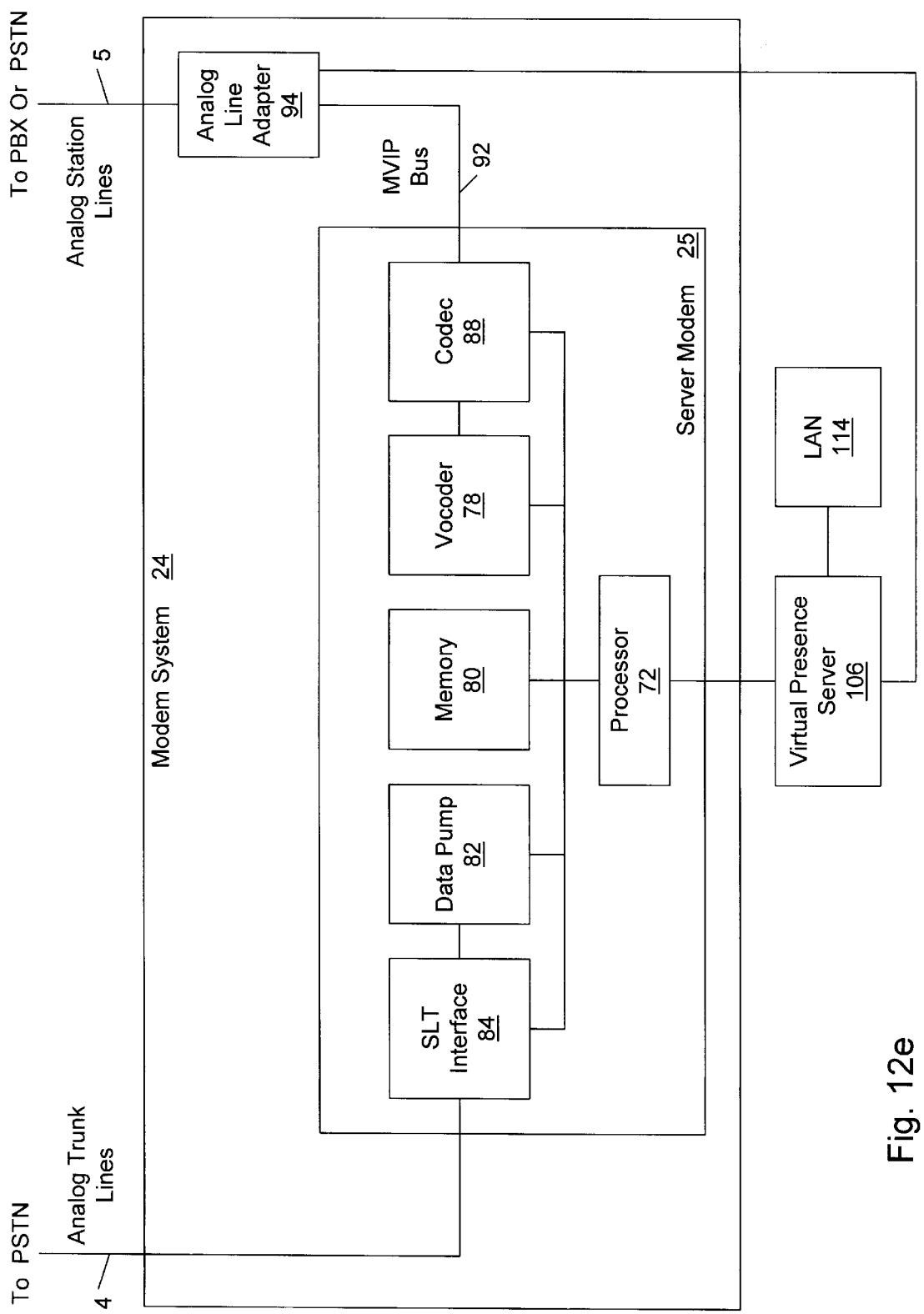

Referring now to FIG. 12*e*, a block diagram of another embodiment of the server modem system 24 of FIG. 10*a* or 10*b* is shown. Various elements of the modem system 24 of FIG. 12*e* are similar to those of the modem system 24 of FIG. 12*a* and FIG. 12*b* and corresponding elements are numbered identically for clarity and simplicity. The modem system 24 of FIG. 12*e* comprises an embodiment for interfacing with the PBX 112 via analog station lines 5 and the PSTN via analog trunk lines 4 as shown. The modem system 24 comprises an analog line adapter 94 coupled to a plurality of modems 25 by an MVIP bus 92 and coupled to the virtual presence server 106, preferably by an expansion bus such as an ISA bus or PCI bus.

The analog line adapter 94 is operable to interface an MVIP bus 92 to a plurality of analog station lines 5. The analog line adapter 94 receives digital audio signals from the MVIP bus 92 and converts the digital audio signals into analog audio signals for transmission on the analog station lines 5. Conversely, the analog line adapter 94 receives analog audio signals from the analog station lines 5 and converts the analog audio signals into digital audio signals for transmission on the MVIP bus 92. The analog line adapter 94 comprises a plurality of codecs for performing the digital to analog and analog to digital conversion of the audio signals.

The analog line adapter 94 further comprises a plurality of hook switches for generating on/off hook conditions on the analog station lines 5 in response to commands from the virtual presence server 106. The analog line adapter 94 further comprises a plurality of ring detector circuits for detecting ringing voltages generated by the PBX 112 on the analog station lines 5. Preferably, the analog line adapter 94 notifies the virtual presence server 106 of the detection of ringing voltages generated by the PBX 112. Preferably, the analog line adapter 94 comprises an R321 connector for coupling up to 24 analog station lines.

The modem system 24 of FIG. 12e functions similarly to the modem system of FIG. 12d except that the analog line adapter 94 converts the digital audio signals from the MVIP bus 92 into analog audio signals rather than forwarding digital audio signals as the T1 adapter 90 of FIG. 12d.

As with the modem system 24 of FIG. 12b, preferably, the modem system 24 comprises a plurality of modems 25. In one embodiment, the modem system 24 comprises three devices each including eight modems 25 for servicing 24 analog trunk lines and 24 analog station lines.

As previously mentioned, embodiments are contemplated in which one or more ISDN or DDS interfaces is provided by the modem system 24 for coupling to the PSTN and/or PBX 112 instead of analog or T1 interfaces. The ISDN or DDS embodiments are digital and are similar to the digital T1 embodiments, but provide an ISDN or DDS interface rather than a T1 interface.

Figure 14:
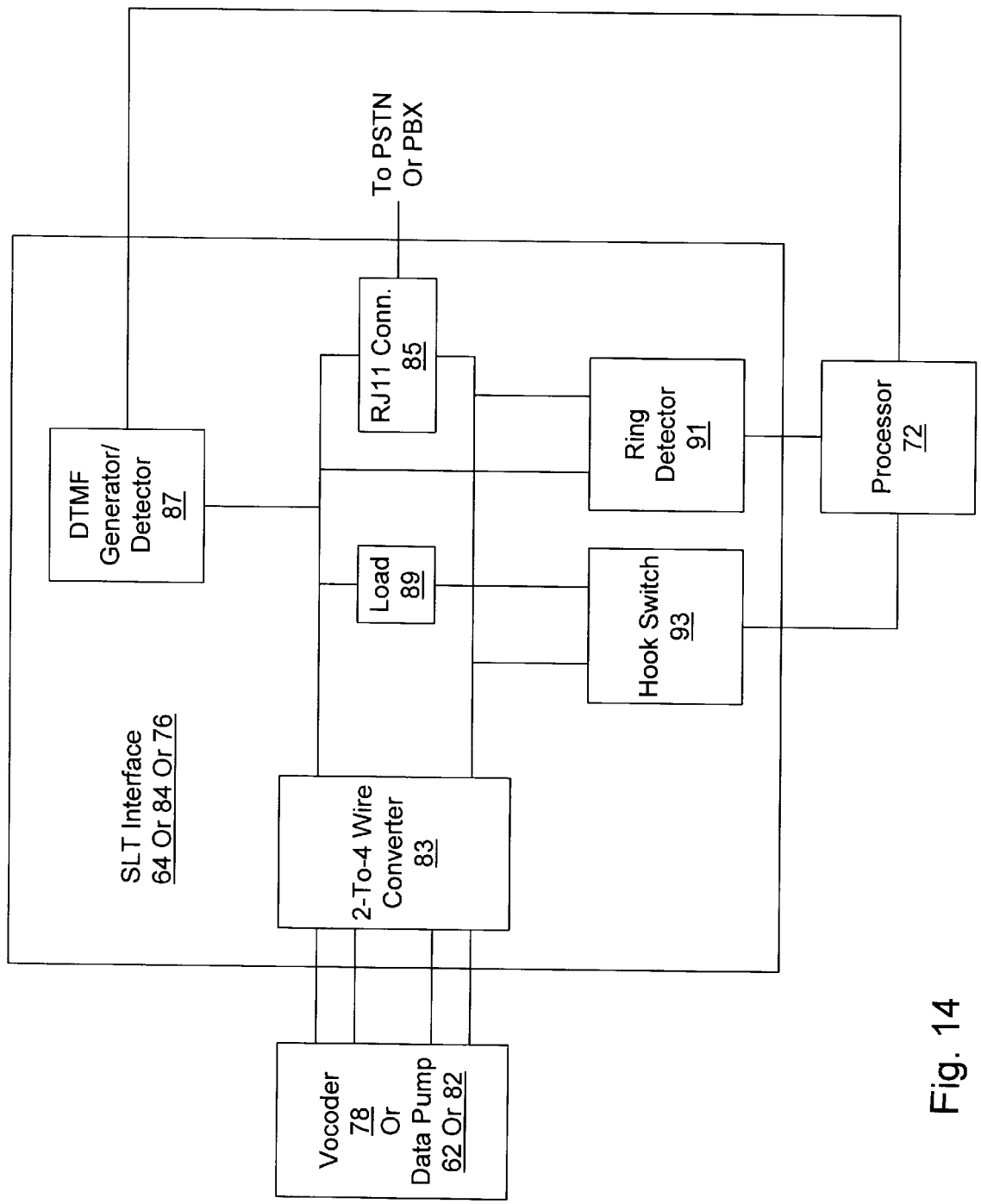
FIG. 14 is a block diagram of an Single Line Telephone (SLT) interface of FIGS. 8a or FIGS. 12a to 12e.

FIGS. 13 and 14—CO Interface and SLT Interface Block Diagrams

Referring now to FIG. 13, a block diagram of the CO interface 56 of FIG. 8a is shown. The CO interface 56 comprises a 2-to-4 wire converter 95 for interfacing with the vocoder 58. The vocoder 58 transmits analog audio signals uni-directionally on a pair of wires, and the vocoder 58 receives analog audio signals uni-directionally on a second pair of wires. The 2-to-4 wire converter 95 couples to the two pairs of wires and converts the audio signals into bidirectional audio signals on a pair of wires, commonly referred to as "tip" and "ring". The tip and ring signals are coupled to the telephone 124 of FIG. 8a through the relay 54. Preferably, the 2-to-4 wire converter 95 is a hybrid transformer circuit, which are well known in the art of telephony. The 2-to-4 wire converter 95 enables the vocoder 58 interface with the telephone 124.

The CO interface 56 further comprises a loop current detector 97 for detecting on/off hook conditions generated by the telephone 124. The loop current detector 97 provides a signal to the processor 52 indicating the detection of the on/off hook conditions. Preferably, in response to the loop current detector 97 indicating on/off hook conditions, the processor 52 notifies the BeThere! client software executing on the user computer 102, preferably via an interrupt, of the detection of the on/off hook conditions. Preferably, the user computer 102 commands the processor 52 to create and transmit a control message to the server modem system 24 to notify the server modem system 24 of the on/off hook conditions. In particular, when the telephone 124 generates an off hook condition to initiate a call, a control message is sent to the server modem system 24 to cause the modem system 24 to generate an off hook condition to the PBX 112 or PSTN on a respective station line 5 to obtain a dial tone. When the telephone 124 generates on off hook condition to answer a call, a control message is sent to the server modem system 24 to cause the modem system 24 to generate an off hook condition to the PBX 112 or PSIN on a respective station line 5 to answer an incoming call.

The CO interface 56 further comprises a ring generator 99 for generating a ringing voltage to the telephone 124. The ring generator 99 receives a control signal from the processor 52 for causing the ring generator 99 to generate the ringing voltage to the telephone 124. In particular, when the processor 52 receives a control message from the server modem system 24 to ring the telephone 124 the processor 52 notifies the BeThere! client software executing on the user computer 102 of the reception of the control message. Preferably, the user computer 102 commands the processor 52 to control the ring generator 99 to generate the ringing voltage to the telephone 124. The server modem system 24 sends a control message to ring the telephone 124 in response to the server modem system 24 receiving a ringing voltage from the PBX 112 or PSTN on a respective station line 5. The communication of the telephony communication device 104 and server modem system 24 in relation to the detection of on/off hook conditions and generation of ringing signals will be described in more detail below.

The CO interface 56 further comprises a tone generator/detector 81 for detecting and generating various telephony tones. The DTMF generator/detector 81 is operable to generate and detect, among others, dial tones, busy tones, ringing tones and DTMF dialing digit tones.

Referring now to FIG. 14, a block diagram of an SLT interface, such as SLT interface 64, 76, or 84 (referred to for simplicity as SLT interface 64 in the discussion of FIG. 14) of FIGS. 8a or FIGS. 12a to 12e is shown. The SLT interface 64 comprises a 2-to-4 wire converter 83, similar to 2-to-4 wire converter 95 of FIG. 13, for converting a transmit and receive uni-directional signal pair to a bi-directional signal pair, as described above. The 2-to-4 wire converter 83 couples to either the vocoder 78 of FIG. 3, or to the data pump 62 of FIGS. 2 or the data pump 82 of FIGS. 12a to 12e. The SLT interface 64 further comprises a connector 85 for coupling to a station line to the PSTN or PBX 112. Preferably, the connector 85 is an RJ11 connector.

The SLT interface 64 further comprises a hook switch 93 for generating on/off hook conditions to the PSTN or PBX 112. The processor 52 or 72 (referred to for simplicity as processor 52 in the discussion of FIG. 14) controls the hook switch 93 to open and close to generate off and on hook conditions, respectively. In particular, the SLT interface 64 generates off hook conditions to place or answer a call, and generates on hook conditions, i.e., hangs up, to end a call. Preferably, the processor 52 controls the hook switch 93 to generate on/off hook conditions in response to commands received from the BeThere! client/server software executing on the user computer 102/virtual presence server 106. The generation of on/off hook conditions by the telephony communication device 104 and server modem system 24 to the PSTN or PBX 112 will be described in more detail below.

The SLT interface 64 further comprises a ring detector 91 for detecting ringing voltages generated by the PSTN or PBX 112. The ring detector 91 communicates the detection of a ringing voltage to the processor 52. The processor 52 notifies the BeThere! client/server software executing on the user computer 102/virtual presence server 106, preferably via an interrupt, of the detection of a ringing voltage by the ring detector 91. Preferably, the BeThere! server software commands the processor 72 to send control messages to the telephony communication device 104 to indicate the detection of a ringing voltage generated by the PSTN or PBX 112 on station line 5. The detection of ringing voltages generated by the PSTN or PBX 112 and corresponding generated control messages for communication between the telephony communication device 104 and server modem system 24 will be described in more detail below.

The SLT interface 64 further comprises a tone generator/detector 87 for detecting and generating various telephony tones. The DTMF generator/detector 87 is operable to generate and detect, among others, dial tones, busy tones, ringing tones and DTMF dialing digit tones.

It is noted that telephony signaling, such as performed by the CO interface 56 and SLT interface 64 as described above with regard to analog POTS lines, is also performed in the T1 embodiments using digital signaling bits. The T1 adapter 90 receives digital signaling bits from the PSTN signifying a ringing signal from the PSTN to a trunk line 4 or station line 5. In response, the T1 adapter 90 notifies the BeThere! server software executing on the virtual presence server 106, preferably via an interrupt, of the reception of the ringing signal. Preferably, in response to the ringing signal notification, the BeThere! server software commands the processor 72 to control the hook switch 93 generate on/off hook conditions on the trunk line 4 or station line 5 as appropriate. Furthermore, the T1 adapter 90 transmits digital signaling bits to the PSTN on the trunk line 4 or station line 5 signifying on/off hook conditions. Thus in the present disclosure, the terms ringing voltage and ringing signal, for example, may denote digital signaling bits rather than actual standard voltage levels, such as ringing voltage levels. Similarly, the terms on/off hook may denote digital signaling bits rather than actual open/closed subscriber loops which insulate/conduct current. Digital telephony signaling on T1 interfaces is well known in the art of digital telephony.

Figure 15:
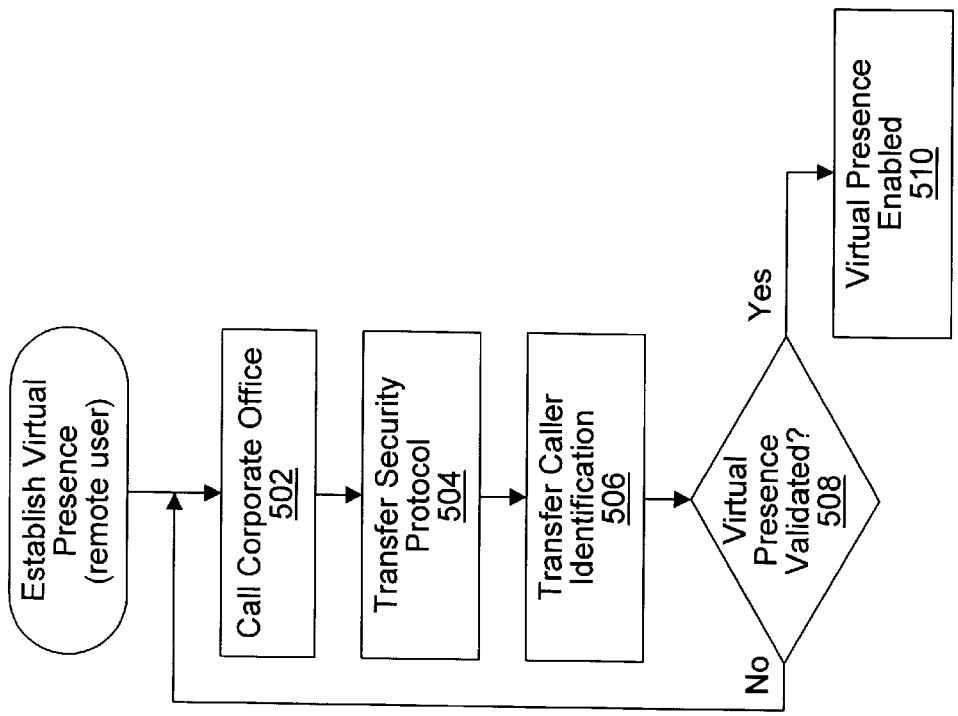
FIG. 15 is a flowchart diagram illustrating operation of the user telephony communication device of the present invention.

FIG. 15—User Telephony Communication Device Operation

Figure 15A:
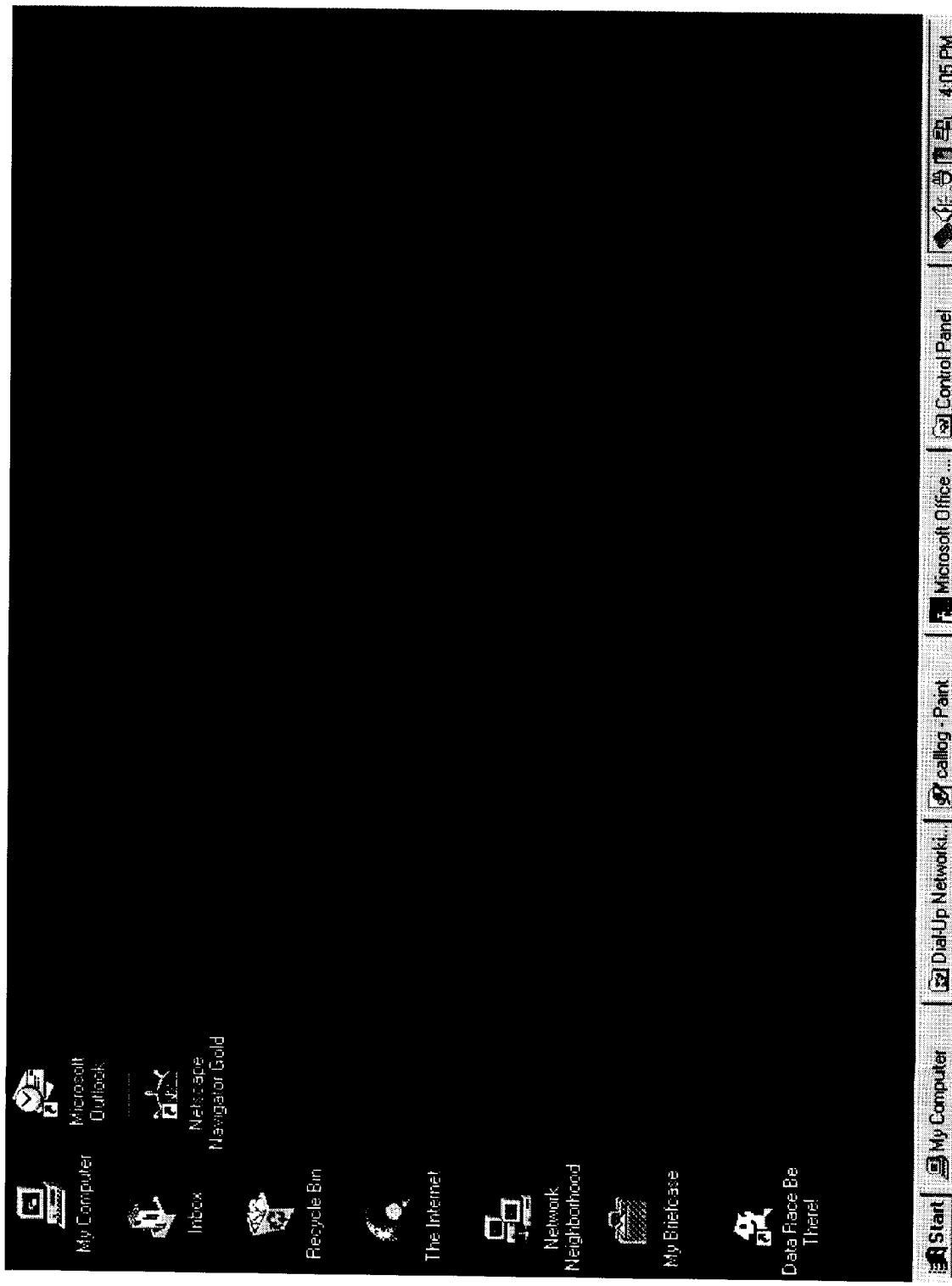
FIGS. 15a through 15d are screen shots illustrating various aspects of the user interface and operation of virtual presence software executing on the remote computer system of FIG. 1.

Referring now to FIG. 15, a flowchart diagram illustrating operation of the virtual presence software executing on the remote computer system according to the present invention is shown. In step 502, in response to user input, the remote computer system 102 establishes a connection to the host system, i.e., to the virtual presence server 106 at the corporate office. In the preferred embodiment, the virtual presence software presents a graphical user interface (GUI) on the screen, including an icon titled "BeThere!", as shown in FIG. 15a.

The user preferably clicks the mouse on the "BeThere!" icon to establish a connection between the remote computer system 102 and the corporate office. Clicking the mouse button on the "BeThere!" icon invokes an autodial routine, and the autodial routine operates to provide a connection between the remote computer system 102 and the corporate office. Alternatively, the user can initiate the autodial program routine from the operating system command line by typing in a respective command. This may be done in GUI-based operating systems, or in non-GUI operating systems, such as DOS.

It is noted that various telephone service set-up sequences may be performed before autodialing the virtual presence server 106, such as canceling call waiting. Also, the user telephony communication device or the virtual presence server 106 may instruct the telephone company Central Office to automatically route all calls made to the remote user's home number to the corporate office. Thus external parties who call the telecommuter's home phone number, i.e., personal calls, are routed to the corporate office, through the virtual presence server, and to the telecommuter at his home. The external party calling the telecommuter at his home will not be aware that the call was routed in this fashion.

In another embodiment, designed for telecommuters, when the user enters his office at his home or house and turns on his computer, the computer automatically executes a routine which connects to the virtual presence server 106 at the corporate office.

The entire telephone number used by the virtual presence software to call the host is preferably stored in memory and then automatically dialed. According to the preferred embodiment of the invention, the virtual presence software also provides the option for the user to manually enter a telephone number to establish a connection to the corporate office. This is necessary due to the various prefixes that may be required to obtain an outside telephone line from hotels and airports, etc. This option of allowing the user to manually enter the telephone number also provides the user with the ability to access alternative long distance carriers using calling cards. The virtual presence software also provides temporary storage of the manually entered number for repeat use.

Figure 15B:
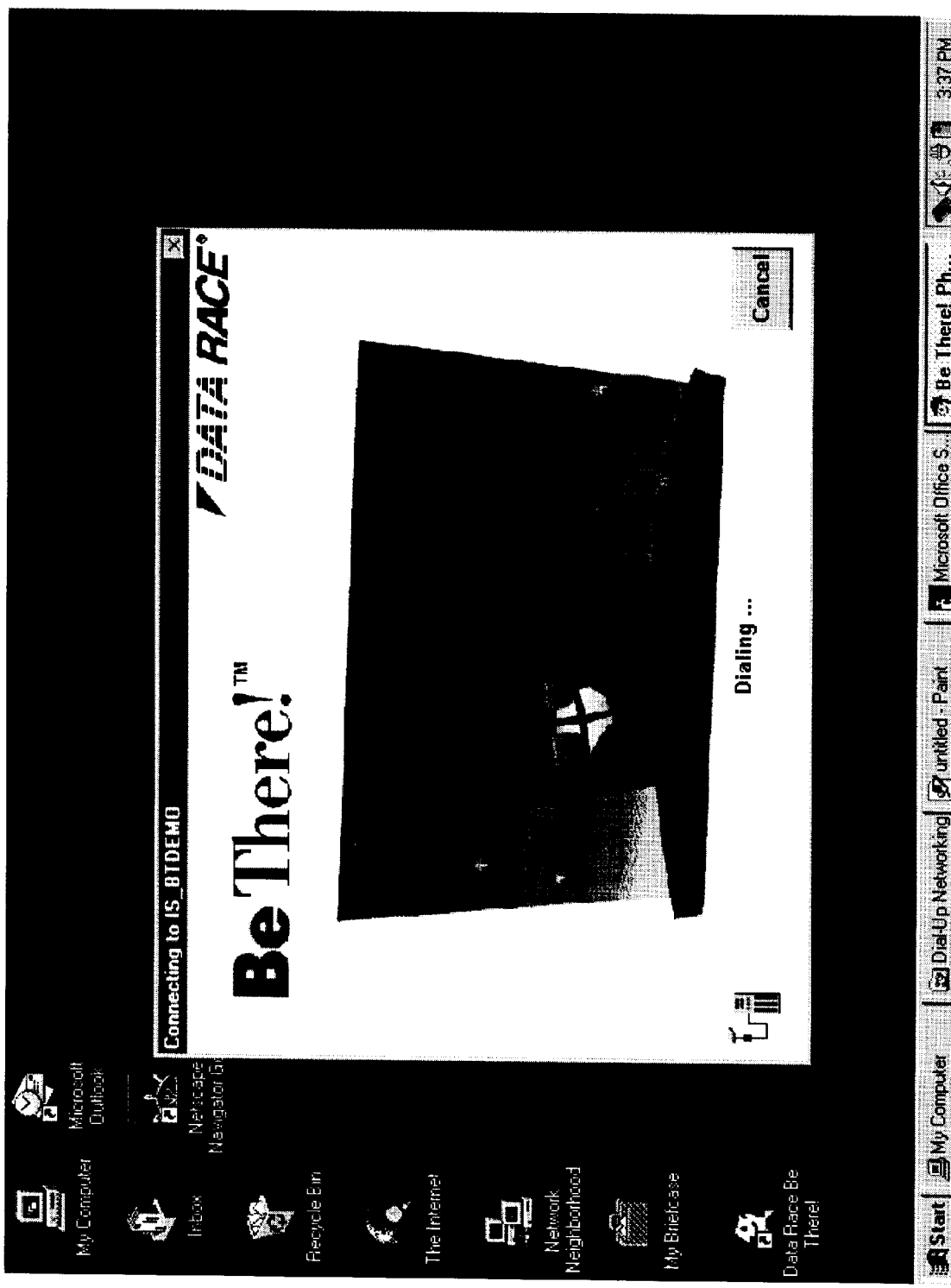

FIG. 15b illustrates the BeThere! client software dialing the virtual presence server 106. Preferably, the call is routed to an available data port of one of the modems 25 in the modem system 24 of the virtual presence server 106. The data port of the server modem 25 comprises the port, i.e., interface, which couples to the data line or trunk line 4. The PSTN generates a ringing voltage on the trunk line 4 if the trunk line 4 is an analog line, or the PSTN generates the appropriate signaling bits to indicate a ringing signal if the trunk line 4 is a T1 or ISDN line.

The modem 25 in the modem system 24 coupled to the available trunk line 4 detects the ringing signal generated by the PSTN or PBX 112 22 and answers the call by generating an off hook condition on the trunk line 4. Preferably, in the embodiments of FIGS. 3a, 3d and 3e, detecting the ringing signal comprises the ring detector 91 in the SLT interface 84 notifying the processor 72 of the detection of a ringing voltage on the trunk line 4, and the processor 72 notifying the BeThere! server software. Or, in the embodiments of FIGS. 3b and 3c (i.e., the analog trunk embodiments), detecting the ringing signal comprises the T1 adapter 90 receiving ringing signal bits and notifying the BeThere! server software of the ringing signal. Preferably, in the embodiments of FIGS. 3a, 3d and 3e (i.e., the digital trunk embodiments), generating an off hook condition on the trunk line 4 comprises the BeThere! server software commanding the processor 72 to control the hook switch 93 of the SLT interface 84 to close, thereby generating an off hook condition.

Upon reception of the call, the modem 25 data port and the user telephony communication device 104 establish a data connection. Preferably, the data connection is a V.34 connection or some other connection which facilitates simultaneous voice and data communication. Data connections, such as V.34 connections are well known in the art of digital telecommunications.

After the telephone number has been dialed and the remote computer system makes contact with the host system or virtual presence server 106 at the corporate office, in step 504 the remote computer system 102 transfers security information according to a security protocol to the virtual presence server 106 at the corporate office. Thus, identification is preferably exchanged for security. In the preferred embodiment, the user manually enters a password which is received and analyzed by the host system virtual presence server 106.

The system of the present invention performs telephony functions through computer system 102 to access the corporate office, and thus the computer system 102 can perform various modern authentication techniques. For example, the remote computer system 102 may utilize a unique code hard-wired into the communications device, e.g., modem, encryption of unique random numbers, and the use of credit cards with passwords which periodically change. Thus the present invention facilitates more secure voice telephony authentication than prior voice systems. In other words, the present invention provides more secure computer-based authentication for voice, telepresence, virtual presence, and remote access call forwarding (RACF) applications.

Figure 15C:
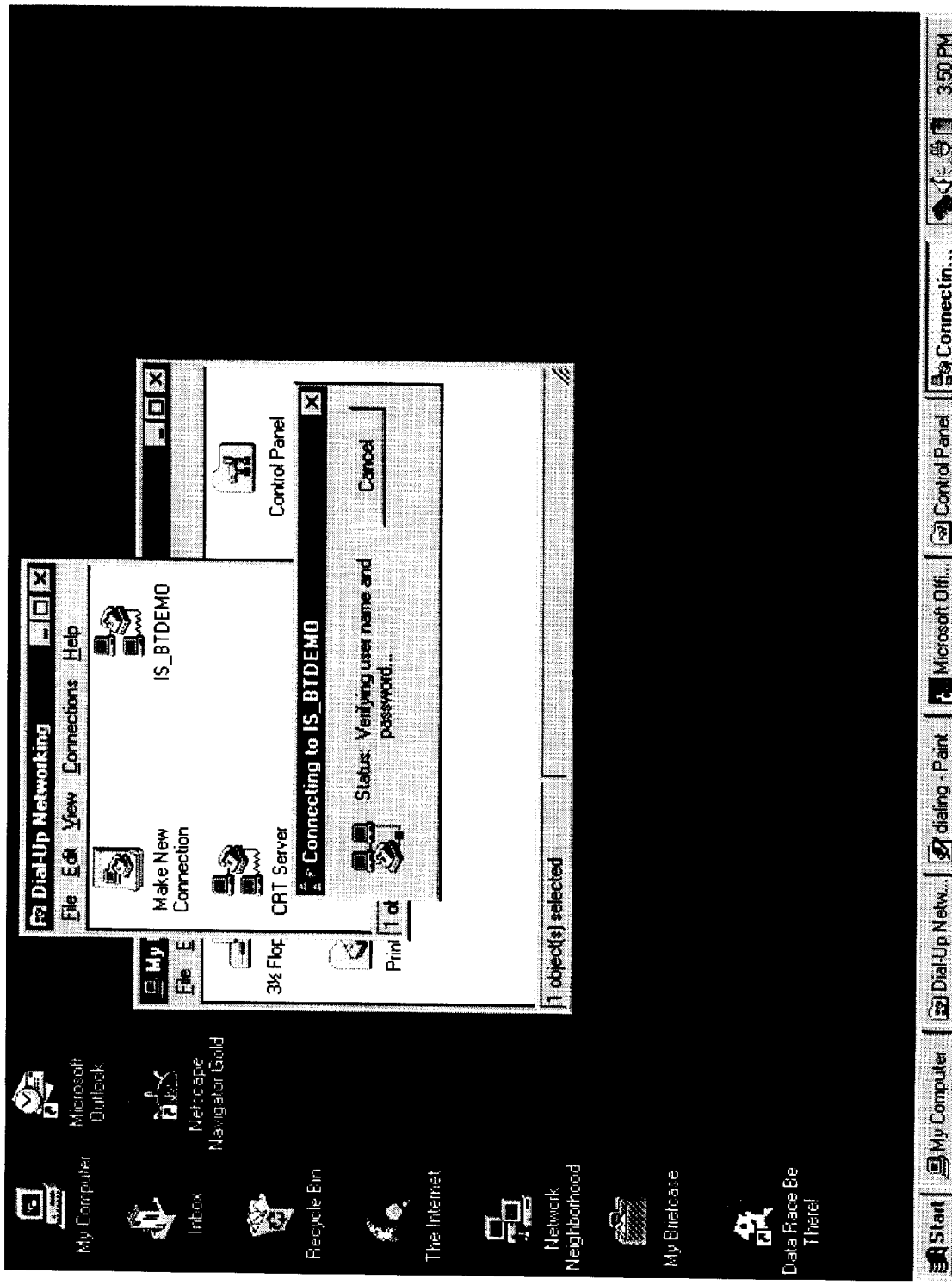
Figure 15D:

In one embodiment, Remote Access Software (RAS) executing on the virtual presence server 106 performs the security check to verify the user. FIG. 15c illustrates a screen shot at the user computer 102 of the BeThere! client software indicating that the server is verifying the user name and password of the user. If the user does not provide a correct user name and password comprised in an authorization database maintained within the virtual presence server 106, the user is denied access to the virtual presence server 106 and the data connection is disestablished. In one embodiment, BeThere! server software performs an additional authentication check of the user. FIG. 15d illustrates a screen shot at the user computer 102 of the BeThere! client software indicating that the BeThere! server software has accepted the username and password of the user. Advantageously, the RAS user verification and BeThere! authentication provide a level of security to prevent unauthorized intruders from establishing a virtual presence in the office.

After security negotiations have taken place in step 504, in step 506 the virtual presence software informs the virtual presence server 106 of the telephone number where the remote computer 102 is connected. The remote unit preferably utilizes caller ID information or uses other means to provide the telephone number where the remote computer is located. This telephone number can be used by the virtual presence server 106 to place a call to the current location where the remote computer 102 is physically located. This telephone number information received by the host virtual presence server 106 is stored by the virtual presence server 106 for the duration of the session.

After the proper security information and identity information have been transferred, in step 508 the remote computer system 102 receives a signal from the virtual presence server 106 indicating if the request for virtual presence has been accepted. If so, then in step 510 virtual presence is enabled. If not, i.e, if the wrong security information or caller information was transferred, then operation returns to step 502.

Once virtual presence has been enabled, the corporate PBX 112 preferably transmits telephony control data to the phone connected to the remote computer system 102 (or the virtual phone), including message indications, line indications, and LCD display information, etc. Thus the phone connected to the remote computer system 102 appears as an extension of the corporate PBX 112, just as if the phone were physically present at the corporate office.

Figure 16:
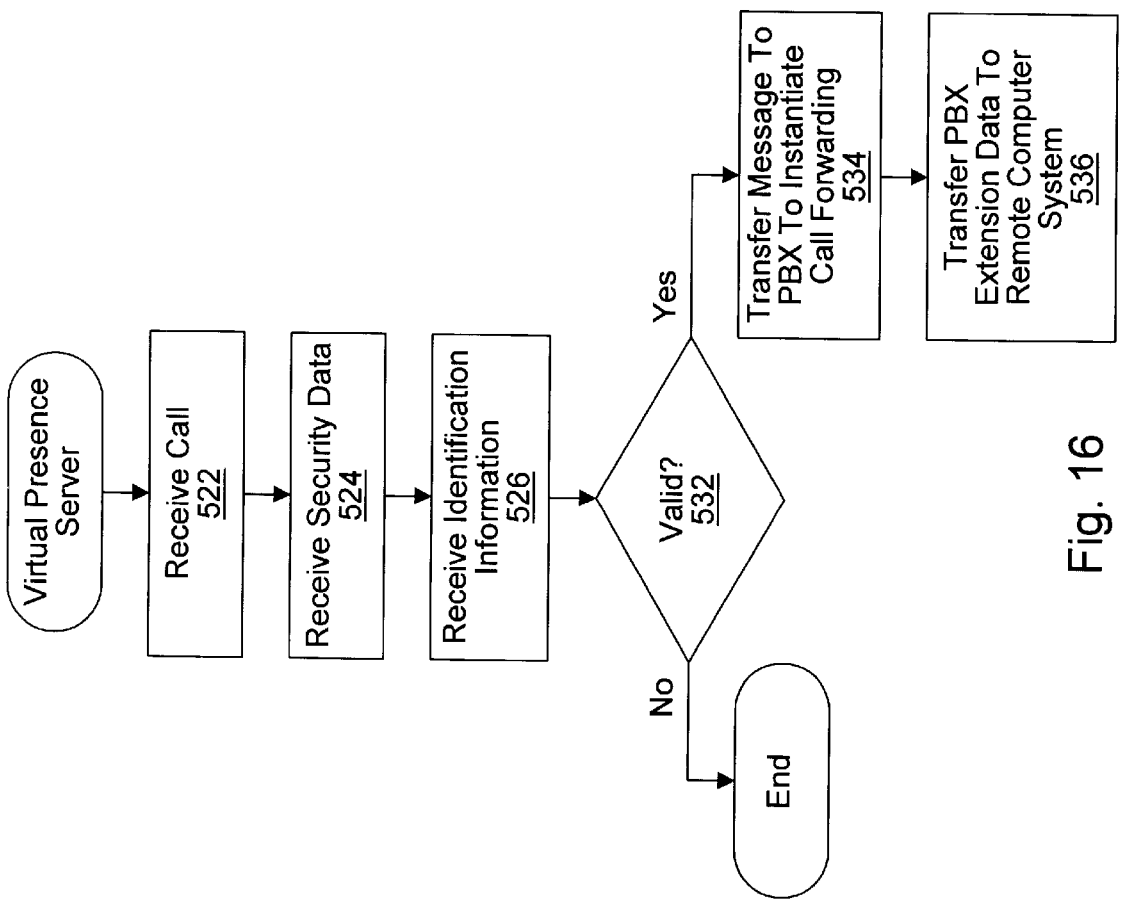
FIG. 16 is a flowchart diagram illustrating operation of the virtual presence server of the present invention.

FIG. 16—Virtual Presence Server Operation

Referring now to FIG. 16, a flowchart diagram illustrating operation of the virtual presence software executing on the virtual presence server 106 according to the present invention is shown. It is noted that the steps in FIG. 16 may occur in various orders, as desired.

In step 522 the virtual presence server 106 receives a call from the remote computer system 102, wherein the call is made by the remote computer system 102 in step 502 of FIG. 15. In step 524 the virtual presence server 106 receives security information from the remote computer system 102, wherein the security information is transferred by the remote computer system 102 in step 504 of FIG. 15.

In step 526 the virtual presence server 106 receives identification information from the remote computer system 102 which indicates how the remote computer system 102 can be accessed. In the preferred embodiment, the virtual presence server 106 receives caller ID information from the PSTN indicating the source telephone number. It is noted that this step of receiving caller ID information actually occurs in step 522 when the call is received. Alternatively, step 526 involves receiving other types of identification information in addition to, or instead of, caller ID information.

In response to receiving the call and the security information, in step 532 the virtual presence server 106 determines if the call is valid, i.e., if the security data or password is valid and the caller identification is valid. This step of validating the caller ID information preferably involves determining if the source of the call matches a database of valid callers. This embodiment is preferably used for telecommuters and workers in a branch office where the source of telephone calls to the virtual presence server 106 in the corporate office is predictable and thus can be regulated.

If the security data or password is not valid, or the caller identification information is not valid, then the virtual presence server 106 refuses access to the caller. The virtual presence server 106 also preferably logs the identity of the caller using caller ID information, and operation returns to step 522. In one embodiment, step 526 occurs after step 532 and only the security data or password is used to validate callers.

After validation in step 532, in step 534 the virtual presence server 106 transfers a message to the corporate PBX 112 to instantiate remote call forwarding. The virtual presence server 106 issues a command to the PBX 112 regarding the virtual presence of the remote user. It is noted that this command to the PBX 112 may be issued automatically or manually. The command includes the instruction to forward all telephone calls made or destined to the extension of the remote user at the corporate office, i.e., the office phone 122, to the virtual presence server 106. In particular, in one embodiment, the PBX 112 is instructed by the virtual presence server 106 to forward telephone calls destined for the office phone 122 to the voice port of the modem 25 with which the data connection was established on the modem 25 data port. That is, the calls are forwarded to the data port which received the call in step 522. When the virtual presence server 106 receives calls forwarded from the user's corporate office extension, the virtual presence server 106 operates to route these calls to the location of the remote user at his "virtual office." Thus external parties who call the user at the office are automatically routed to the user's remote location, thus providing the "virtual presence".

If the PBX 112 supports remote call forwarding, the virtual presence server 106 issues a sequence of tones, and hookflash if needed, on the line to the PBX 112 that direct the PBX 112 to forward the remote user's extension to the virtual presence server 106, so that these calls can then be routed to the remote user's actual location. It is noted that the virtual presence server 106 automatically issues a command to the corporate PBX 112 to perform the remote call forwarding where possible. It is noted that most PBXs, as well as the TAPI (Telephony Application Programming Interface) from Microsoft and the TSAPI Telephony Application Programming Interface) from Novell and AT&T, support remote all forwarding.

However, in embodiments where the PBX 112 does not support remote call forwarding, but rather has a master console, the PBX 112 is manually commanded to forward calls to the remote user. In one embodiment where the PBX 112 does not support remote call forwarding, a computer system is included between the virtual presence server 106 and the PBX 112. A human operator at the computer system receives a message from the virtual presence server 106 such as "please forward extension X to extension Y", and the operator manually enters commands to enable the call forwarding. Alternatively, the virtual presence server 106 includes a side path, such as a serial port, to the master console which enables remote call forwarding. However, it is noted that in the majority of instances the PBX 112 will generally support remote call forwarding, and in these instances the PBX 112 automatically routes calls to the virtual presence server 106, which then provides these calls to the remote user.

In one embodiment preferably used for telecommuters, the virtual presence server 106 also instructs the telephone company Central Office to automatically route all calls made to the remote user's home number to the user's corporate office phone number and/or the virtual presence server 106. Alternatively, the virtual presence server 106 instructs the CO to redirect calls made to the remote user's home number to the user's corporate office phone number and/or the virtual presence server 106 upon detection that the user's home number is busy. That is, if the user's telephone line 2 is busy, such as is the case once the call placed in step 502 is established, the CO redirects the call to the modem 25 voice port of the virtual presence server 106. Thus external parties who call the telecommuter's home phone number, i.e., personal calls, are routed to the corporate office, through the virtual presence server 106, and to the telecommuter at his home. The external party calling the telecommuter at his home will not be aware that the call was routed in this fashion.

RACF operations require identification codes which enable the CO or PBX 112 to authenticate the RACF operation. The identification codes provide a level of security to protect against unauthorized forwarding of a first subscriber's phone to a different location by an unauthorized second subscriber. The virtual presence server 106 stores the identification information for the office telephones 122.

Preferably, each time the virtual presence server 106 performs a RACF operation, the virtual presence server 106 stores a record of the RACF operation in a non-volatile storage location, such as a magnetic disk drive or FLASH memory. The records of the RACF operations may subsequently be used to cancel RACF's after the data connection is disestablished, as will be discussed below.

If the remote user disconnects from the corporate office, or if the user is intentionally or unintentionally disconnected, then the reverse process to step 534 preferably occurs. In other words, the virtual presence server 106 automatically sends a message to the console to forward future messages back to the user's corporate office extension.

Also, after validation in step 532, in step 536 the virtual presence server transmits telephony control data to the remote computer system, as discussed above.

Figure 17:
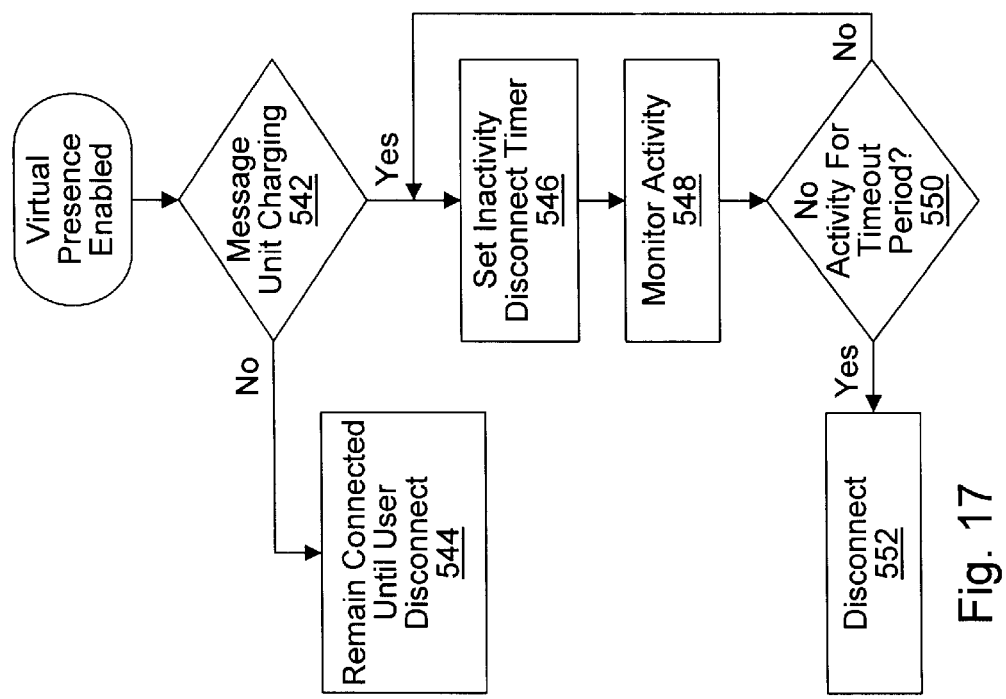
FIG. 17 is a flowchart diagram illustrating operation of the virtual presence server of the present invention.

FIG. 17—Connection Options

Referring now to FIG. 17, a flowchart diagram illustrating various connection options of the system of the present invention is shown. Once the remote computer system has established a connection to the virtual presence server 106, as described above with reference to FIGS. 15 and 16, in step 542 the virtual presence software operating in the remote computer system 102 preferably determines if message rate charging is in effect for the connection. In step 542 the remote computer system 102 determines if the corporate office and the remote user reside in a common Local Access Transport Area (LATA) that has no message unit transport charging. If so, then in step 544 the remote computer system 102 remains connected until the user manually disconnects, and thus the user preferably remains connected as long as desired. Thus, if the user resides within a local area code to the corporate office, and no message unit charging is in effect, the user preferably remains connected during the entire session, since there are no message unit charges.

If the corporate office and the remote user are determined in step 542 to not reside in a common Local Access Transport Area (LATA) and/or message unit transport charging is incurred, then in one embodiment the system of the present invention periodically disconnects during non-use or inactive periods to reduce connection expenses. In step 546 the virtual presence software sets an inactivity disconnect timer in the remote computer system. In step 548 the virtual presence software monitors the state of the timer as well as connection activity. Preferably, the timer counts down and generates an interrupt when the counter reaches 0. If in step 550 the virtual presence software determines that there has been no activity during the timeout period, then in step 552 the virtual presence software directs the remote computer system to disconnect from the virtual presence server 106. If activity has occurred during the timeout period, then operation returns to step 546, and the inactivity timer is reset. Thus, when connection activity occurs, the inactivity timer is reset accordingly and begins counting down.

Therefore, in one embodiment, a session established over long distance links or in areas where message unit charging is in effect is disconnected and reestablished based upon utilization in order to reduce costs. According to the present invention, the remote computer system includes a timer which is enabled during a session. The timer causes a link to be disconnected after a user determined period of no link activity. This type of disconnection is referred to as a "temporary disconnect" and is not apparent to the user. In the preferred embodiment, it is anticipated that the remote user will remain connected with a virtual presence at the corporate office for extended periods of time, regardless of any message unit charging.

The present invention also preferably operates to minimize LAN data traffic. ISDN is a message rate service where a user pays a set fee per minute. Bridges or routers between two LANs continually "ping" each other, asking each other if they are still connected to the network. In the preferred embodiment, the BO server 160 and the virtual presence server 106 perform spoofing to remove this traffic, as well as remove maintenance and overhead traffic.

Figure 18:
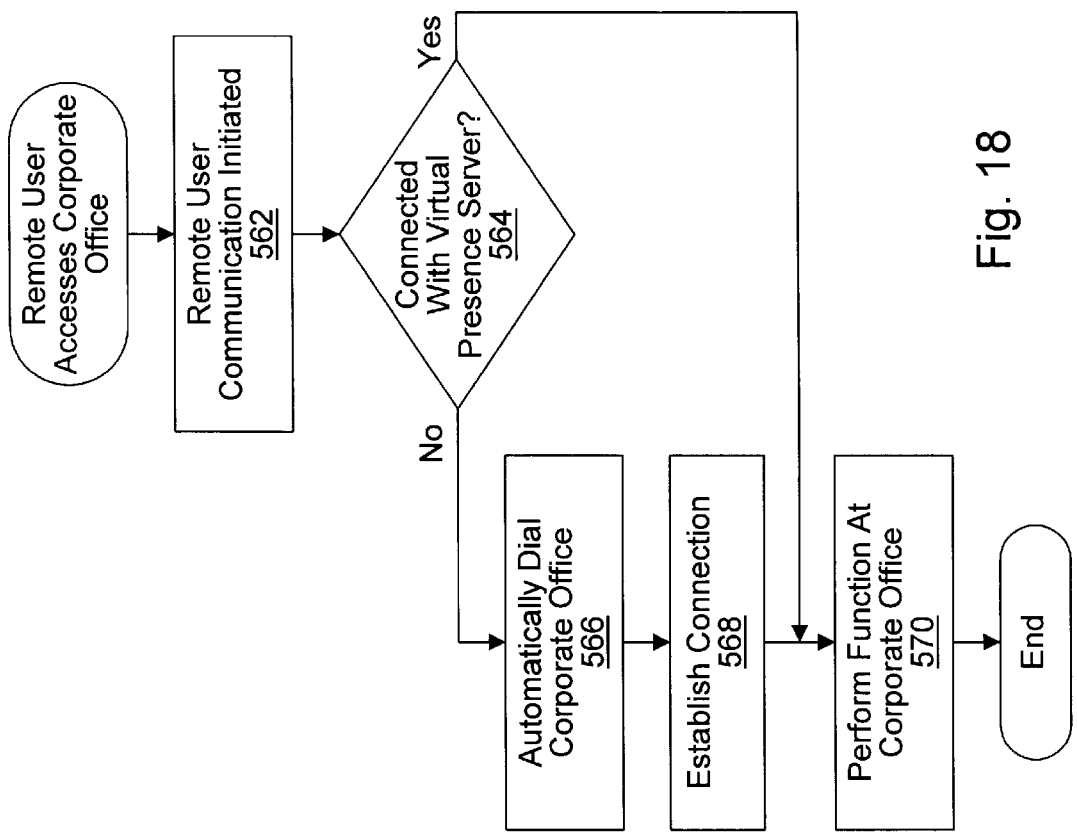
FIG. 18 is a flowchart diagram illustrating operation of the remote user accessing the corporate office.
Figure 19:
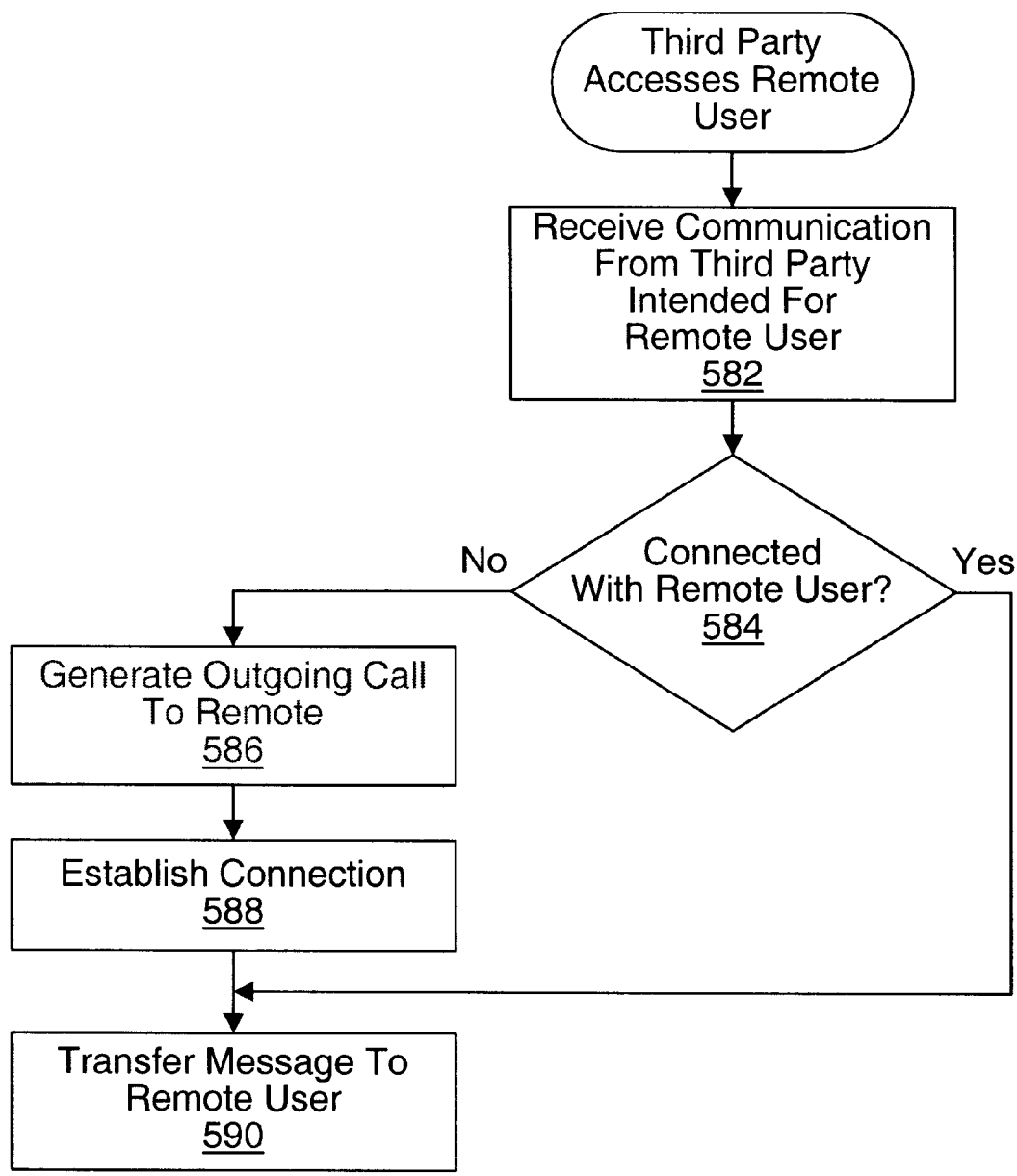
FIG. 19 is a flowchart diagram illustrating operation of the virtual presence server accessing the remote user.

FIGS. 18 and 19—Virtual Presence Operation

Referring now to FIG. 18 a flowchart diagram is shown illustrating operation of the present invention when the remote user accesses the corporate office. The flowchart of FIG. 18 presumes that virtual presence has been enabled as shown in step 510 of FIG. 15. In step 562 the remote user enables the communication device in the remote computer system 102. This may involve the user picking up the telephone 124 connected to the remote computer system 102 or placing the virtual telephone "off-hook" to begin a telephone call, such as by clicking on the "Handfree" button on the virtual telephone shown in FIG. 3a, or by pressing the "PgUp" button on the keyboard of the user computer 102. This may also involve the user initiating a modem or ISDN data transmission, initiating an Internet session, checking office email, etc.

Figure 18A:
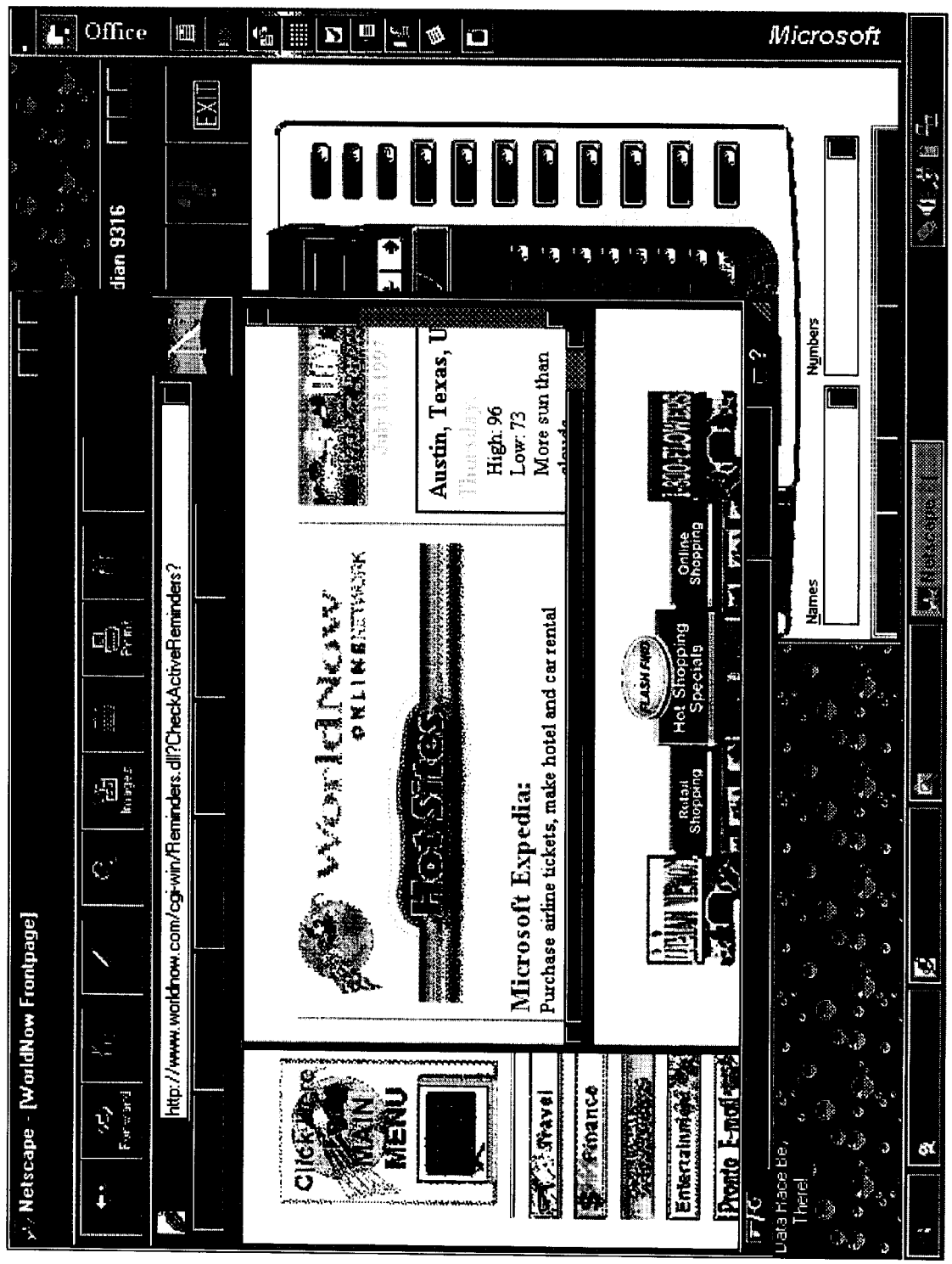
FIG. 18a is a screen shot illustrating the remote user surfing the Internet on a data connection established with the virtual presence server of FIG. 1.

In step 564 the virtual presence software executing on the remote computer system 102 determines if the remote computer system 102 is connected to the virtual presence server 106. If not, then in step 566 the virtual presence software automatically dials the corporate office. In step 568 the virtual presence software establishes a connection with the virtual presence server 106. Here it is noted that the connection is established as quickly as possible, and the security negotiations performed in step 504 of FIG. 15 are preferably not performed, with the possible exception of a reconnect password. In step 570 the remote computer system 102 performs the desired function at the corporate office, such as checking or sending email, calling an external party, or accessing the Internet, among others. FIG. 18a is a screen shot illustrating the user surfing the Internet using the Netscape® web browser application on the data connection established with the virtual presence server 106 on the telephone line 2.

Referring now to FIG. 19 a flowchart diagram is shown illustrating operation of the present invention when a party at the corporate office or elsewhere accesses the remote user. The flowchart of FIG. 19 presumes that virtual presence has been enabled as shown in step 510 of FIG. 15. In step 582 the virtual presence server 106 receives a communication from a party intended for the remote computer system 102. This may involve a co-worker at the corporate office dialing the local extension of the remote user, an external person or external party calling the remote user from outside the corporate office, a party sending an email or fax to the remote user, or other forms of communication. This may also involve the third party initiating a modem or ISDN data transmission to the remote user.

In step 584 the virtual presence software executing on the virtual presence server 106 determines if the remote computer system 102 is connected to the virtual presence server 106. If not, then in step 586 the virtual presence server 106 automatically dials the remote computer system 102, i.e., establishes a connection or places a call to the remote computer system. Once the virtual presence server 106 at the corporate office connects to the remote user, the virtual presence server 106 "knows" the identity of the remote user. In step 588 the virtual presence server 106 establishes a connection with the remote computer system 102. Here it is noted that the connection is established as quickly as possible, and the security negotiations performed in step 504 of FIG. 15 are preferably not performed. In step 590 the virtual presence server 106 performs the desired function or transfer to the remote computer system 102, such as sending an email transmitted from a third party, transferring or forwarding a call made by a third party, forwarding a fax message received from a third party, among others.

In systems where inactivity disconnects occur, the virtual presence server 106 preferably generates special tones or uses other means to distinguish the virtual presence server 106 calling the remote user versus a call from a third party directly to the remote user. In the preferred embodiment, caller ID information is used by the virtual presence software executing on the remote computer system to distinguish between calls from the virtual presence server 106 and calls from third parties directly to the remote user's remote location. The caller ID information is used by the remote computer system 102 between the first and second ring before the receiving telephone has come off-hook. This allows the remote computer system to immediately determine if the call is from the virtual presence server 106 or from somebody else.

If the remote computer system does not have access to caller ID, the telephone at the remote site comes off-hook and waits for one second and then listens for special tones. In this embodiment, the virtual presence server 106 preferably generates special tones or unique identifying tones in a similar manner to the tones generated by a fax machine. In another embodiment, the virtual presence server 106 uses V8.bis, which provides for user-defined calling tone fields.

Therefore, after a temporary disconnect, any virtual presence access by the remote computer system 102, whether using the telephone, accessing the LAN, or other functions, causes the link to be automatically redialed by the virtual presence software executing in the remote computer system. This reduces message unit charging costs while preferably being transparent to the user. Likewise, any accesses by a third party intended for the remote user cause the virtual presence server 106 to automatically re-establish the connection with the remote computer system 102. After the reconnection, the third party communications are automatically directed to the remote user. Thus if the user picks up the telephone or engages the virtual telephone on the remote computer to initiate a call, and if a temporary disconnect has occurred, the remote computer system 102 automatically dials the virtual presence server 106 to reconnect. Also if a PBX extension at the corporate office and assigned to the remote computer system rings at the corporate office, and a temporary disconnect has occurred, the virtual presence server 106 at the corporate office automatically redials the remote computer system to reestablish the link. In this latter case, the virtual presence server 106 uses the telephone numbers provided by the remote virtual presence software at the beginning of the session and stored by the virtual presence server 106 during the initial session negotiation.

It is noted that, on an ISDN or T1 link, re-establishment of a connection after a temporary disconnect occurs very quickly and is typically less than a second. Thus on an ISDN or T1 link, re-establishment of a connection is generally transparent to the user. However, re-establishment of analog links using V.34 modems typically requires over 40 seconds. Thus, in an embodiment where analog phone lines are used, the automatic disconnect feature is noticeable and preferably not used.

Remote User Connected to Virtual Presence Server

The following describes operations wherein a remote user accesses data and/or performs communications using the virtual presence server 106 at the corporate office.

Here it is assumed that the remote user desires to make a telephone call or otherwise communicate with a third party, wherein the remote user behaves just as if he were physically located at the corporate office.

As shown in FIG. 15, first in step 562 the remote user initiates a communication, i.e., picks up the telephone, or in some manner enables the telephone or modem to become "off-hook". For example, if the user is using a virtual telephone executing on the remote computer system, the user clicks a telephone call icon on the virtual telephone. If the remote user is connected to the virtual presence server 106 in step 564, or after a connection is established in step 568, then the following steps occur. In step 570 the corporate PBX 112 provides a dial tone to the remote user. The corporate PBX 112 provides the dial tone through the virtual presence server 106, through the public switched telephone network (PSIN) and through the open connection to the user's telephone instrument, or to the user's virtual telephone executing on the computer system 102. Thus the corporate PBX 112 provides the dial tone to the remote user's telephone, and the remote user acts as an extension to the corporate PBX 1 12.

Figure 19A:
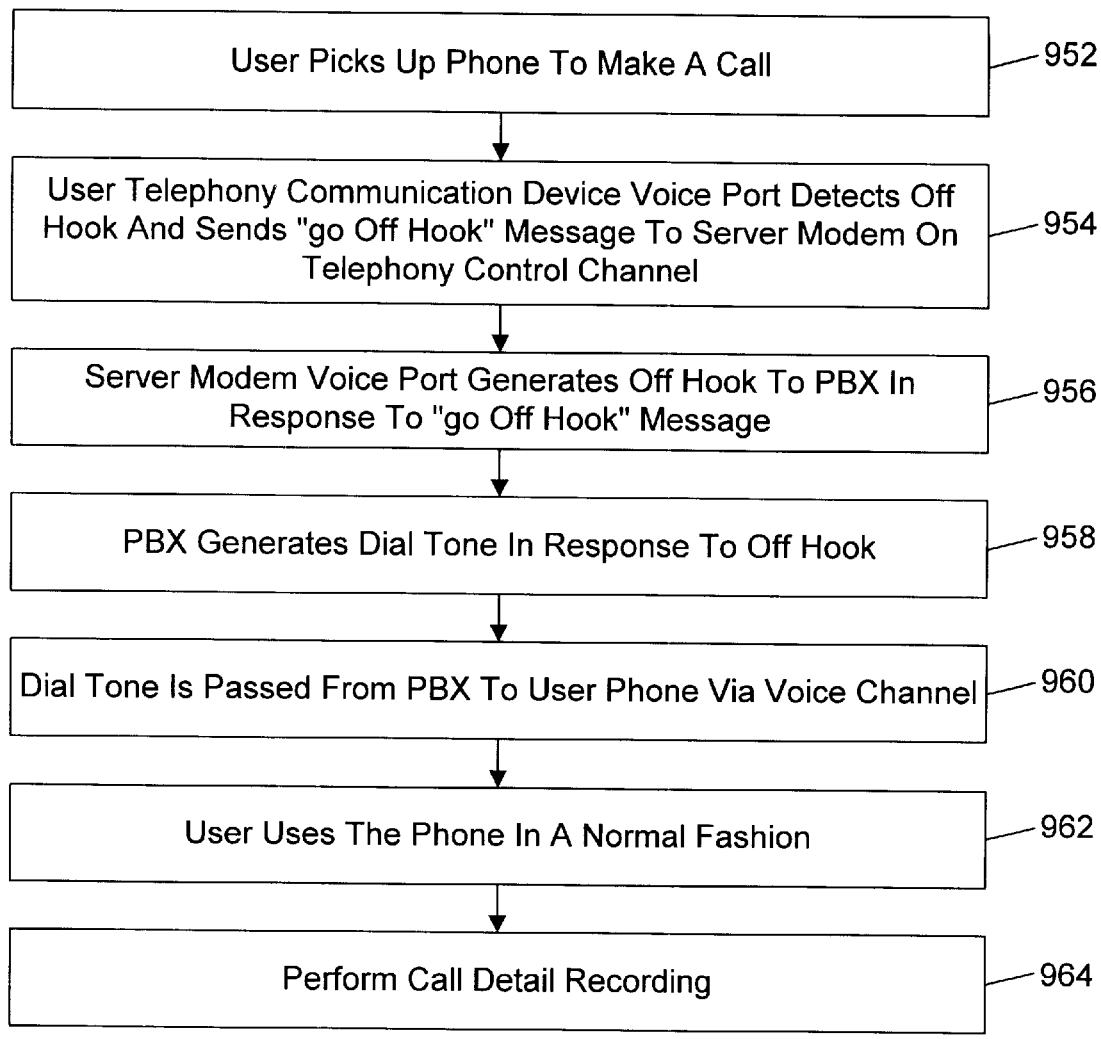
FIG. 19a is a flowchart illustrating steps for the PBX of FIG. 1 to provide the dial tone to the remote user.

Referring now to FIG. 19a, a flowchart illustrating steps for the corporate PBX 112 to provide the dial tone to the remote user is shown. The user picks up the telephone 124 to place a call, in step 952, after a data connection has been established between the telephony communication device 104 and the server modem 25. The telephony communication device 104 voice port detects the off hook condition and the telephony communication device 104 sends a "go off hook" message to the server modem 25 on the control channel, in step 954. Preferably, detecting the off hook condition comprises the processor 52 receiving notification from the loop current detector 97 and notifying the BeThere! client software, preferably via an interrupt. Preferably, in response the BeThere! client software commands the processor 52 to send a control message comprising a predetermined value in a predetermined location of the control message to the server modem 25.

In response to receiving the "go off hook" message from the telephony communication device 104, the server modem 25 voice port generates an off hook condition on the station line 5 to the PBX 112 22 or PSTN, in step 956. Preferably, receiving the "go off hook" message comprises the processor 72 receiving the control message from the telephony communication device 104 and notifying the BeThere! server software. In response, the BeThere! server software commands the processor 72 to control the hook switch 93 to close, thereby generating an off hook condition on the station line 5, in the analog station embodiments (i.e., the embodiments of FIGS. 12a and 12c). In the digital station embodiments (i.e., the embodiments of FIGS. 12b and 12d), the BeThere! server software commands the T1 adapter 90 to transmit off hook signaling bits on the station line 5 to generate an off hook condition. In the embodiment of FIG. 12e, the BeThere! server software commands the analog line adapter 94 to close a hook switch to generate an off hook condition on the station line 5.

The PSTN or PBX 112 22 detects the off hook condition generated by the server modem 25 voice port and generates a dial tone in response, in step 958. The server modem 25 receives the audio, i.e., the dial tone, from the PSTN or PBX 112 22 and forwards the dial tone audio to the telephony communication device 104 on the voice channel, in step 960. The telephony communication device 104 converts the audio data including the dial tone into an analog audio dial tone signal which is heard by the user on the telephone 124, and the user uses the telephone 124 in a normal fashion, in step 962. That is, the user dials a telephone number to place a call such as to a third party subscriber. In one embodiment, the user dials the telephone number using the keypad on the telephone 124 itself. In another embodiment, the user dials the telephone number using the user computer 102 mouse to click on digits on the keypad of the telephone displayed on the user computer 102 video screen by the BeThere! client software, as shown in FIG. 3a. In another embodiment, the user dials the telephone number using the keyboard of the user computer 102. In another embodiment, the user dials the telephone number by selecting an entry from a telephone directory provided on the user screen by the BeThere! client software.

In the preferred embodiment, the DTMF tones dialed by the user telephone 124 are detected by a DTMF detector 81 comprised in the CO interface 56 and reported to the processor 52. The processor 52 notifies the BeThere! client software of the DTMF tones. The BeThere! client software commands the processor 52 to send one or more control messages including information specifying the tones, or digits, dialed on the control channel to the server modem 25.

The server modem 25 receives the control messages and notifies the BeThere! server software of the received control messages including the tone information. In response, the BeThere! server software commands the processor 72 in the server modem 25 to control the DThW generator 87 in the server modem 25 voice port SLT interface 76 to generate the DTMF tones which were dialed on the user telephone 124 on the station line 5 to the PSTN or PBX 112 22. Thereby, the telephone number dialed by the user is dialed on the station line 5 as desired by the user to place an outgoing call.

After the server modem 25 voice port places the call, the server modem 25 detects the audio status of the telephone call. Preferably, the DTMF detector 87 engineering parameters are configured to detect the audio status of the call such as to detect a dial tone, a voice, a busy signal, silence, and other audio conditions.

Preferably, the DTMF generator in the telephony communication device 104 is used to "echo" the telephone number dialed by the user. That is, the telephony communication device 104 DTMF generator generates the DTMF tones to the user through the telephone 124 when a digit is dialed according to any of the methods just described.

In an alternate embodiment, the DTW tones generated by the user telephone 124 are transmitted on the voice channel through the server modem 25 on to the PSTN. The PSTN then operates as it would normally and the user and the third party subscriber perform voice communications while the user simultaneously performs data communications on his single telephone line 2.

Preferably, the BeThere! server software performs call detail recording, in step 964. That is, the BeThere! server software maintains a log file which comprises information regarding each of the calls placed by the virtual presence server 106 for the user, such as the calls described in FIG. 19a. The log file information comprises information identifying the user who was authenticated, the amount of time spent during the call, which modem 25 voice port telephone number the call was made on, the office telephone number associated with user, and other information. The log file information is particularly useful since tie station line 5 used to place the call is not actually the line which received the call from the user, i.e., is not the trunk line 4, and is also not the line to which the office telephone 12 is coupled. Thus, the call detail recording provides a means of accounting for resources used by each user. In another embodiment, the call detail recording information further includes information regarding each of the calls received by the virtual presence server 106 for the user.

Figure 19B:
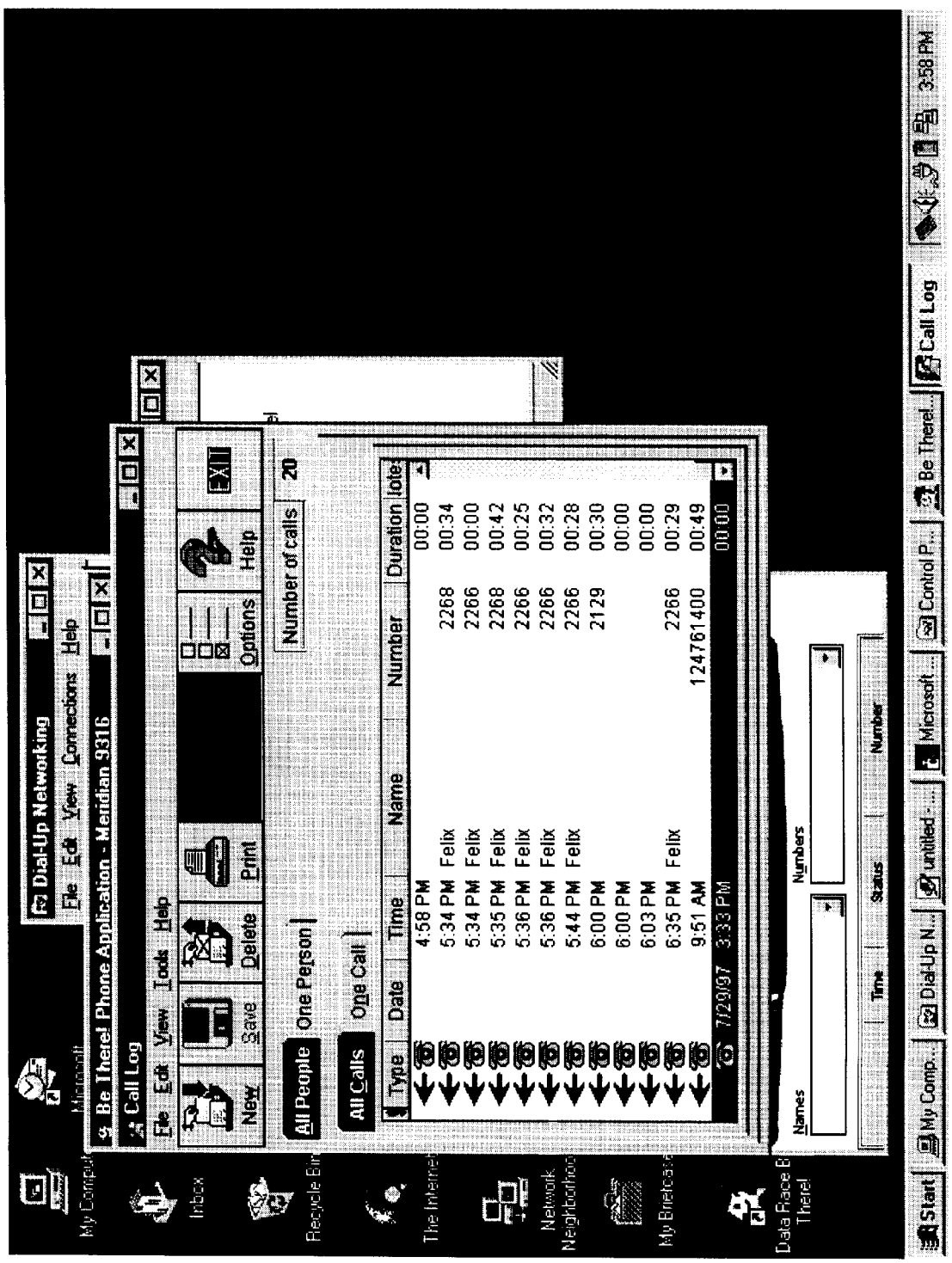
FIG. 19b is a screen shot illustrating a call log maintained by software executing on the remote computer system of FIG. 1.

The BeThere! client software maintains a call log of calls placed by the user to third party subscribers. FIG. 19b illustrates a screen shot of a call log maintained by the BeThere! client software.

If the user is performing a telephone call, then the user dials the desired number.

If the remote user desires to talk to a co-worker at the corporate office, the remote user dials the co-worker's three digit (or other type) extension. If the remote user dials a co-worker who is also a remote user that maintains a virtual presence, then the call is routed from the corporate office virtual presence server 106 to the co-worker remote user. If the remote user desires to talk to a third party using the corporate office WATTS line, the remote user dials just as if he/she were physically at the corporate office. Therefore, the telephone plugged into the remote computer system and/or the virtual telephone simulated by the remote office software appears as an extension on the corporate telephone system, i.e. the corporate PBX 112. The remote user also sends a fax or email, or logs on to the Internet, as if he were physically present at the corporate office.

Referring again to FIG. 19, when a telephone call is made to the user at the corporate office in step 582, then if the virtual presence connection is in place in step 584, or after the connection is established in step 588, in step 590 the PBX 112 and the virtual presence server 106 automatically route the call to the remote user. The automatic routing of the call to the remote user will be described in more detail below with respect to FIG. 23. Thus, when a co-worker at the corporate office dials the local N digit extension of the remote user, which typically rings at the user's "corporate office" office, the telephone call is routed through the PBX 112 and provided through the virtual presence server 106 to the remote user at his/her remote location. The virtual presence server 106 provides the proper tones to the telephone of the remote user to direct the remote user's telephone to ring. The remote user then may pick up or answer the telephone and complete the connection. Likewise, a received email or fax is routed to the remote user in this fashion.

Therefore, once the remote user has been connected to the corporate office, the remote user operates substantially as if the user were physically present at the corporate office. To illustrate operation of the present invention, consider a user who works out of his home and also includes an office at the corporate office. If a user is engaged in a session with the virtual presence server 106 at the corporate office, or otherwise has informed the virtual presence server 106 that the user is physically located at his home, then when an external party attempts to call the user at the corporate office, the PBX telephone system 112 at the corporate office automatically routes the call to the user's home.

Thus, when an external party makes a telephone call to the corporate office to attempt to reach the user, the corporate PBX 112 automatically routes the telephone call through the session created by the user and the telephone rings at the remote computer 102, i.e. at the telephone plugged into the remote computer system or the virtual telephone simulated by the remote office software. Therefore, an external party calling the user is unable to detect whether the user is actually physically located in the corporate office or in a remote location with a virtual presence according to the present invention.

If the user and the external party are discussing a document and the external party desires to fax the document to the user, the external party faxes the document to the corporate office. If the user has a dedicated phone number for a personal fax at the corporate office, then the virtual presence server 106 of the present invention operates to automatically direct the fax from the corporate office to the user's home. In this case, the external party faxes the document to a fax machine, or to the fax number, at the corporate office which is connected to the virtual presence server 106, and the virtual presence server 106 detects that remote user as the receiving party of the fax and automatically redirects the fax transmission data from the corporate office fax machine to the remote user's home office.

Thus, according to the present invention, an external party calls the remote user at the corporate office and also faxes a document to the remote user at the corporate office, and both the telephone call and the fax document are automatically redirected to the user's home since the user is physically located at home. This occurs unbeknownst to the external party, who has every reason to believe that the user is physically located in the corporate office.

If the remote user at his home has established a "virtual presence" at the corporate office according to the invention, and desires to make a long distance telephone call to an external party located in a different area of the country, according to the present invention the user simply performs the dialing routine to access the corporate office WATTS line at the corporate office, just as if the remote user were physically located in the corporate office. Thus the remote user can obtain and use the corporate office WATTS line to make a long distance telephone call to an external party at a much reduced rate, just as if the user were physically located in the corporate office.

If a remote user is connected to the corporate office according to the virtual presence system of the invention, the user may be talking on the phone and simultaneously sending a fax. The remote user is also connected through a LAN bridge to the corporate LAN. If the remote user launches an application which expects to use a modem in one embodiment, this opens a channel to the corporate office which then returns to use the remote user's modem. Thus, the modem located with the remote user is used in the application to dial the on-line service.

In one embodiment the remote user can access a modem from a modem server at the corporate office, and the modem at the corporate office acts as a slave to the remote user modem. Thus the modem at the corporate office performs desired communications, and the remote user's modem is only required for communications to and from the modem at the corporate office.

If a telecommuter desires to receive personal calls at home while connected to the virtual presence server, the telecommuter preferably instructs his friends and family to "call me at the office" to avoid a busy signal as a result of the virtual presence phone connection occupying the phone line. These calls are then routed to the telecommuter's home by the virtual presence server 106. Alternatively, the virtual presence server 106 and/or the user telephony communication device 104 instructs the telephone company Central Office to automatically route calls to the telecommuter's home number to the corporate office, and these calls are then routed to the telecommuter's home by the virtual presence server 106. Thus when a telecommuter is connected to the corporate office according to the virtual presence system of the invention, an external party who attempts to call the telecommuter at home is not blocked out, but rather is routed through the corporate office virtual presence server 106 to the telecommuter.

Thus the telecommuter is not required to have separate telephone lines for personal and business use, but rather is required to only have a single line for both personal and business communications. The single telephone line serves as the personal voice channel, the business voice channel, the corporate LAN data channel, and fax data channel.

When the user has completed operations and desires to terminate the session to the corporate office, the user preferably clicks on the "Go Home" button or "EXIT" buttons shown in FIG. 3a or enters a command at the operating system command line to terminate the remote virtual presence software.

Remote Access Call Forwarding

The present invention also provides a greatly improved system and interface for performing remote access call forwarding. In current systems, remote access call forwarding is not widely used due to the lack of a friendly user interface as well as the lack of a system which monitors the forwarding history and status of the user. The virtual presence server 106 and the computer system 102 including the user telephony communication device 104 of the present invention provide an automated means for performing remote access call forwarding. The virtual presence server 106 and computer system 102 include software which provides a friendly user interface that greatly simplifies remote access call forwarding. The virtual presence server 106 and computer system 102 also track the remote call forwarding status and history of the user, and thus remote access call forwarding can be easily undone. Also, the virtual presence server 106 and computer system 102 include recovery methods for situations where a link has gone down and/or other instances occur where the remote access call forwarding should be done. Further, the virtual presence server 106 and computer system 102 include authentication software as discussed above which provides the necessary security for remote access call forwarding.

Figure 20:
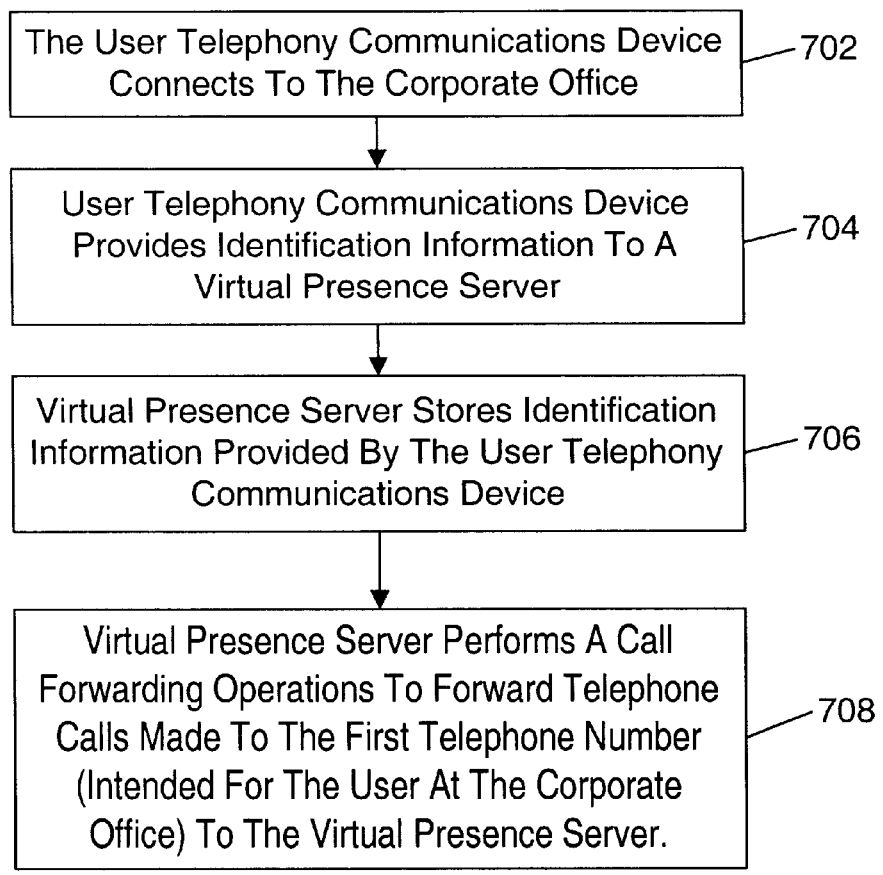
FIG. 20 is a flowchart diagram illustrating operation of the virtual presence system where the virtual presence server performs a call forwarding operation to forward the user's office extension telephone calls to the virtual presence server.
Figure 21:
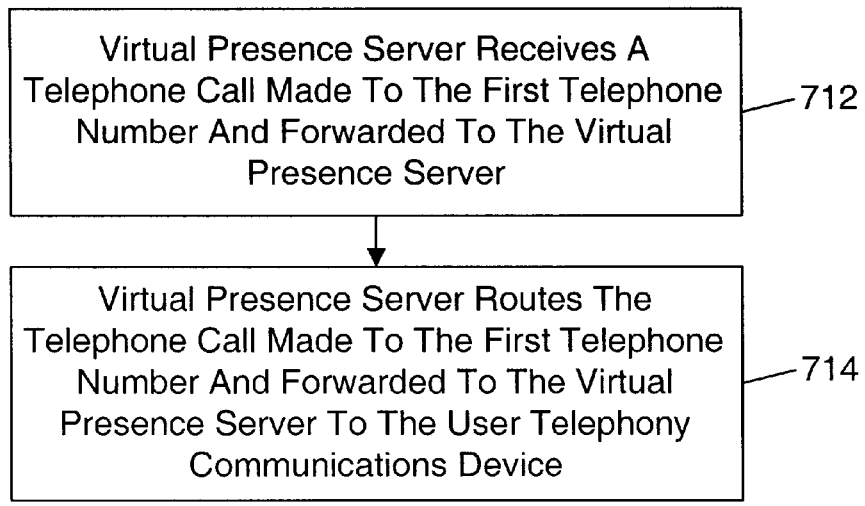
FIG. 21 is a flowchart diagram illustrating operation of the virtual presence server receiving a telephone call to the user's office extension and routing the call to the user's remote location.

FIGS. 20 and 21—Office Number Call Forwarding Operation

FIG. 17 illustrates a method for providing a remote user operating the user telephony communications device 104 with a virtual presence at a corporate office or data site. The corporate office or data site includes the virtual presence server 106 which routes communications between the corporate office and the telephony communications device 104. The corporate office or data site includes a first telephone number associated with the remote user, wherein the first telephone number is used to access the remote user at the corporate office or data site. In other words, the first telephone number is the user's office telephone number.

As shown, in step 702 the user telephony communications device 104 connects to the corporate office or data site. In step 704 the user telephony communications device 104 provides identification information to the virtual presence server 106 at the corporate office after connecting to the corporate office. The identification information includes an identity of the user operating the user telephony communications device 104. In step 706 the virtual presence server 106 stores the identification information provided by the user telephony communications device 104.

In step 708 the virtual presence server 106 performs a call forwarding operation to forward telephone calls made to the first telephone number which are intended for the user at the corporate office. The call forwarding operation directs the telephone calls made to the first telephone number to be forwarded to the virtual presence server 106. Preferably, the telephone calls made to the first telephone number are forwarded to the modem 25 of the virtual presence server 106 with which the user telephony communication device 104 connected in step 702. In particular, the connection was made in step 702 to a data port of the modem 25 and in step 708 the call forwarding operation is performed to forward calls to the voice port of the modem 25 with the corresponding data port. In another embodiment, the calls in step 708 are routed to available voice port of any of the modems 25 in the virtual presence server 106. The voice data is then routed by the virtual presence server 106 between the modem 25 to which the calls are forwarded and the modem 25 with which the connection was established in step 702. In one embodiment, the two modems 25 may even be in different servers and the voice data routed between the servers by an MVIP or SCSI bus. The virtual presence server performing the remote call forwarding operation includes the virtual presence server accessing the identification information received from the user telephony communications device 104 and then performing the remote call forwarding operation using the identification information.

Referring now to FIG. 21, when an external party calls the user at the office, i.e., en. dials the first telephone number to call the user at the office, the call forwarding operation performed in step 708 causes the telephone call to be received by the virtual presence server 106. As shown, in response to the call made to the first telephone number by the external party, in step 712 the virtual presence server 106 receives the telephone call made to the first telephone number and forwarded to the virtual presence server 106. In step 714 the virtual presence server 106 routes the telephone call made to the first telephone number and forwarded to the virtual presence server 106 to the user telephony communications device 104.

Thus the external party who calls the user at the office is automatically forwarded to the user at the remote location.

For example, if the user is at home and is connected to the virtual presence server 106 at the corporate office, calls made to the user's office telephone number are forwarded to the user's home telephone number. Thus if the user telephony communications device 104 includes a second telephone number used to access the user telephony communications device 104, the virtual presence server 106 routes telephone calls made to the first telephone number to the second telephone number. The routing of the telephone calls by the virtual presence server 106 to the user at the remote location will be described in more detail below with respect to FIG. 23.

Figure 22:
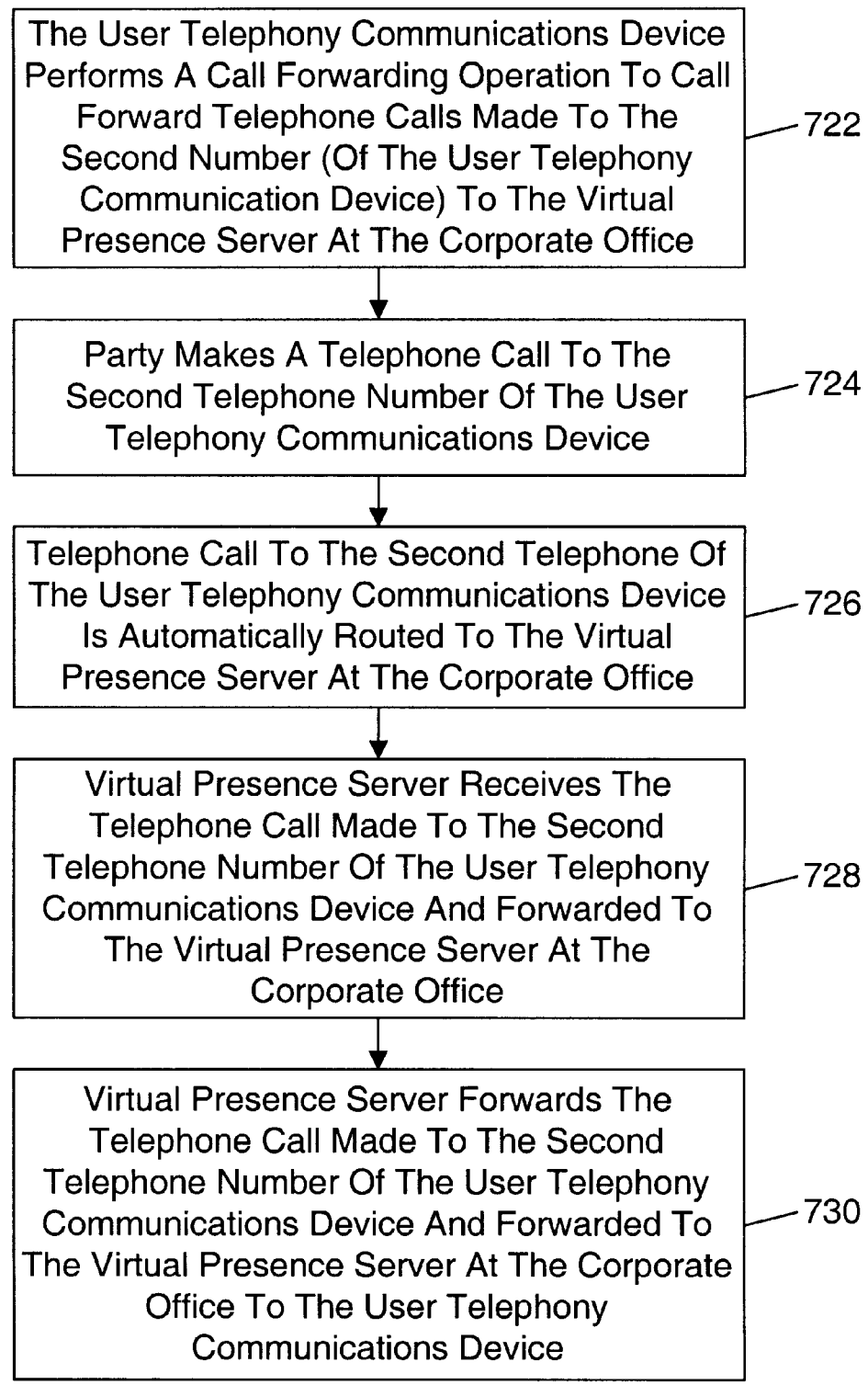
FIG. 22 is a flowchart diagram illustrating operation of the virtual presence system where the system performs a call forwarding operation to forward calls from external parties through the virtual presence server to the user's remote location.

FIG. 22—Remote Telephone Number Call Forwarding Operation

FIG. 22 is a flowchart diagram illustrating operation of the invention in enabling the remote user to receive calls made to his telephone number while the user is connected to the virtual presence server 106 at the corporate office. Here it is assumed that the user telephony communications device 104 includes a second telephone number which is used to access the user telephony communications device 104. For example, if the remote user is a telecommuter, the second telephone number is the user's home number.

As shown, in step 722 the user telephony communications device 104 performs a call forwarding operation to call forward telephone calls made to the second number. The call forwarding operation causes telephone calls made to the second number to be forwarded to the virtual presence server 106. As discussed below, this enables telephone calls made to the second telephone number to be forwarded to the virtual presence server 106 and then routed through by the virtual presence server 106 to the user telephony communications device 104.

In another embodiment, in step 722 the virtual presence server 106 performs the call forwarding operation to call forward telephone calls made to the second number, causing calls made to the second number to be forwarded to the virtual presence server 106.

In one embodiment, the call forwarding operation of step 722 comprises either the user telephony communication device 104 or the virtual presence server 106 performing a redirect on busy operation such that calls made to the second number are redirected to the virtual presence server 106 when the second number is busy. Thus, when the second number is busy due to the connection made in step 708 with the virtual presence server 106, calls made to the second number are redirected to the virtual presence server 106.

In the preferred embodiment, in step 722 the call forwarding operation directs telephone calls made to the second number to be forwarded to the first number at the corporate office. As noted above, calls intended for the first number at the corporate office are forwarded to the virtual presence server 106. Telephone calls intended for the first number at the corporate office are forwarded to the virtual presence server 106 due to the call forwarding operation performed in step 708. Thus, in this embodiment, telephone calls made to the second number are forwarded to the first number at the corporate office, and these calls forwarded to the first number at the corporate office are instead forwarded to the virtual presence server 106 due to the call forwarding operation of step 708.

After the call forwarding operation is performed in step 722, when an external party attempts to call the remote user at the remote location, e.g., attempts to call the telecommuter at home, the following occurs. As shown, in step 724, a party makes a telephone call to the second telephone number of the user telephony communications device. For example, if the remote user is a telecommuter, in step 724 a party makes a telephone call to the user's home.

In response to the call forwarding operation performed in step 722, in step 726 the telephone call to the second telephone number of the user telephony communications device 104 is automatically routed to the virtual presence server 106 at the corporate office. In step 728 the virtual presence server 106 receives the telephone call made to the second telephone number of the user telephony communications device 104 and forwarded to the virtual presence server 106 at the corporate office. In step 730 the virtual presence server 106 forwards or routes the telephone call made to the second telephone number of the user telephony communications device 104 and forwarded to the virtual presence server 106 at the corporate office to the user telephony communications device 104.

The virtual presence server 106 routes the telephone call to the user telephony communications device 104 on the same communication line or telephone line which is being used for the virtual presence connection. Thus the single communication line is used for the virtual presence connection as well as for receiving home telephone calls routed in the above fashion. The routing of the telephone calls by the virtual presence server 106 to the user telephony communication device 104 on the same communication line or telephone line which is being used for the virtual presence connection will be described in more detail below with respect to FIG. 23.

Figure 23:
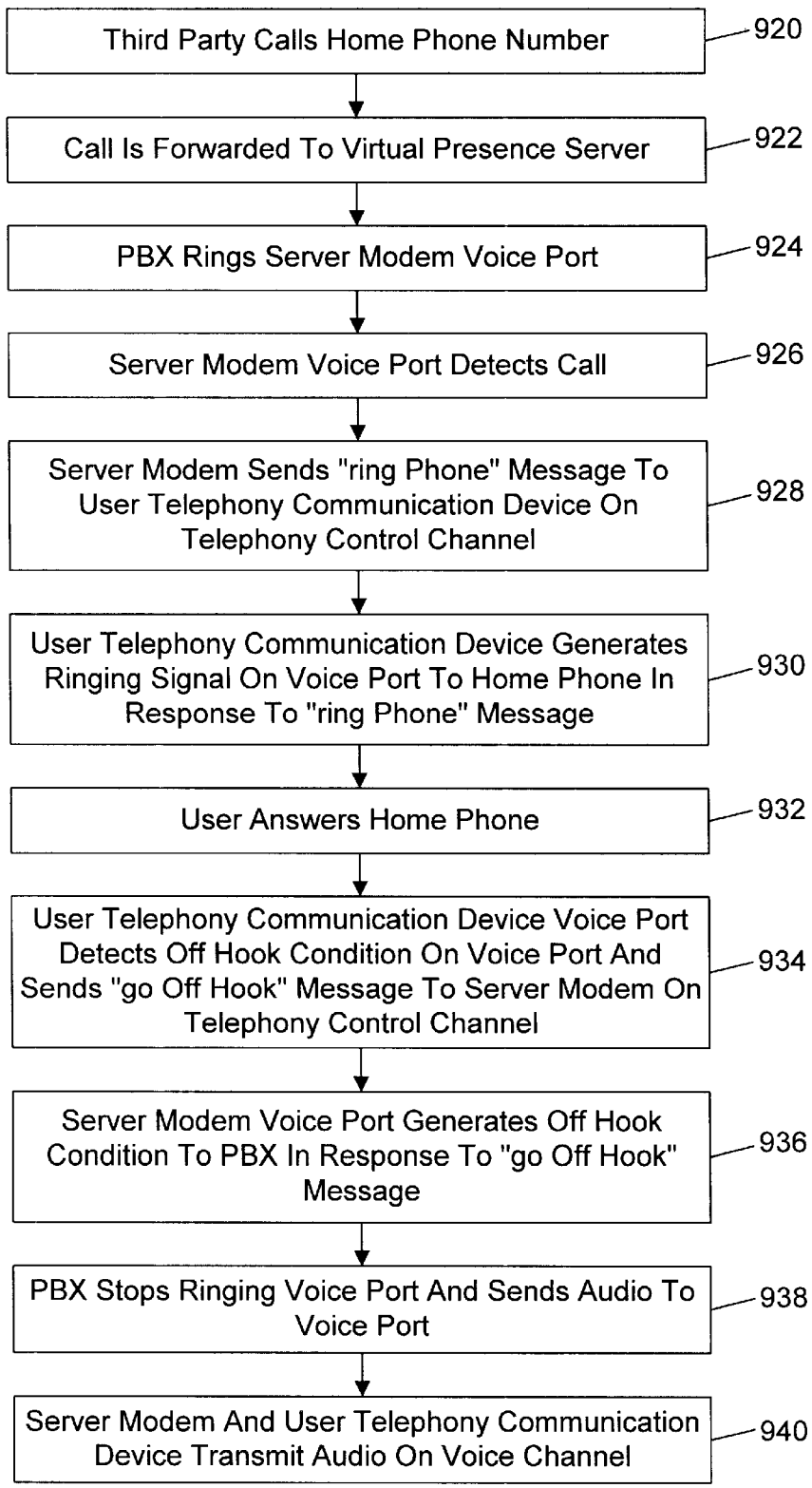
FIG. 23 is a flowchart illustrating in more detail steps performed in routing of telephone calls by the virtual presence server of FIG. 2 to the user telephony communication device of FIG. 2 on the same communication line which is being used for the virtual presence connection.

FIG. 23—Flowchart Detailing Routing of Telephone Calls to Remote User

Referring now to FIG. 23, a flowchart is shown illustrating in more detail steps performed in routing of telephone calls by the virtual presence server 106 to the user telephony communication device 104 on the same communication line or telephone line 2 which is being used for the virtual presence connection. A third party subscriber places a call to the second telephone number, i.e., to the line associated with the user telephone 124, i.e., associated with line 2, in step 920. Alternatively, the third party subscriber places a call to the first telephone number, i.e., to the office telephone number associated with the user's office telephone 122, and the call is forwarded, in step 922 below, to the virtual presence server 106. In either case the call arrives at the server modem 25 voice port, as will be described in step 922.

In step 922, the call is forwarded to the virtual presence server 106 as a result of the call forwarding operation performed previously, such as in step 722. As noted above, in one embodiment the PSTN forwards the call placed to the second telephone number to the first telephone number, i.e., to the number associated with the office telephone 122, as a result of the call forwarding operation performed in step 722. In response, the PBX 22 in turn forwards the call to the voice port of a server modem 25 in the virtual presence server 106. As also noted above, in one embodiment, the PSTN forwards the call placed to the second telephone number directly to the voice port of the server modem 25. As also noted above, the call may have been placed to the first telephone number, i.e., to the office telephone 122 number and forwarded by the PBX 22 to the server modem 25 voice port. For simplicity and ease of illustration, the remainder of FIG. 23 will be described with the assumption that the voice port to which the call is forwarded, whether directly or indirectly through the call forwarding of the first telephone number to the voice port, and the data port with which the data connection was established, such as in step 702 of FIG. 21, are comprised within the same server modem 25, rather than on separate modems and/or in separate virtual presence servers.

The call being forwarded to the server modem 25 voice port comprises the PBX 22 ringing the server modem 25 voice port, in step 924. In the analog station embodiments of the modem system 24 (i.e., FIGS. 12a, 12c and 12e), ringing the server modem 25 voice port comprises generating a ringing voltage. In the digital station embodiments of the modem 24 (i.e., FIGS. 12b and 12d), ringing the server modem 25 voice port comprises transmitting digital signaling bits, such as those defined for T1, IDSN or other digital telephony connections.

The server modem 25 voice port detects the incoming call and notifies the BeThere! server software. In the embodiments of FIGS. 12a and 12c, detecting the incoming call comprises the ring detector 91 of SLT interface 76 detecting the ringing voltage and notifying the processor 72. Notifying the BeThere! server software comprises the processor 72 notifying the BeThere! server software, preferably via an interrupt, of the detection of the ringing voltage. In the digital station embodiments, detecting the incoming call comprises the T1 adapter 90 detecting the transmission of digital signaling bits generated by the PBX 22 which indicate a ringing signal. Notifying the BeThere! server software comprises the T1 adapter 90 notifying the BeThere! server software, preferably via an interrupt, of the detection of the ringing signal bits. In the embodiment of FIG. 12e, detecting the incoming call comprises a ring detector 91 in the analog line adapter 94 detecting the ringing voltage. Notifying the BeThere! server software comprises the analog line adapter 94 notifying the BeThere! server software, preferably via an interrupt, of the detection of the ringing voltage.

In response to the detection of the ringing signal, the server modem 25 sends a "ring phone" message to the user telephony communications device 104 on a telephony control channel, in step 928. Preferably, sending a "ring phone" message comprises the BeThere! server software commanding the processor 72 to send a control frame to the user telephony communications device 104 on the trunk line 4 to instruct the user telephony communications device 104 to ring the user's telephone 14. That is, the server modem 25 sends a control message to the user telephony communication device 104 on a telephony control channel of the data connection established in step 702 between the user telephony communication device 104 and the server modem 25. Preferably, the "ring phone" message comprises a predetermined value in a predetermined location of the control frame.

In response to receiving the "ring phone" message, the user telephony communications device 104 generates a ringing signal on its voice port to ring the user's telephone 124, in step 930. Preferably, receiving the "ring phone" message comprises the processor 52 receiving the control message from the server modem 25 and notifying the BeThere! client software of the reception of the "ring phone" message. In response, the BeThere! client software commands the processor 52 to control the ring generator 99 of the CO interface to generate a ringing voltage on the user telephony communication device 104 voice port to ring the telephone 124. In the embodiment of FIG. 8b, preferably the BeThere! client software commands the user computer 102 to generate an audible or visible indication to the user of the incoming call. For example, the user computer 102 may beep, or synthesize the sound of a phone ringing on a sound device of the user computer 102, or flash a message on the video screen of the user computer 102.

The user answers the telephone 124, in step 932, thereby generating an off hook condition to the user telephony communications device 104 voice port. The loop current detector 97 of the CO interface 56 of the user telephony communications device 104 detects the off hook condition and signals the processor 52 which notifies the BeThere! client software of the off hook condition. In response the BeThere! client software commands the processor 52 to send a "go off hook" message to the server modem 25 on the telephony control channel, in step 934. Preferably, the "go off hook" message comprises a predetermined value in a predetermined location of a control frame sent by the user telephony communications device 104 to the server modem 25.

In response to receiving the "go off hook" message, the server modem 25 generates an off hook condition to the PBX 22 on the station line 5, in step 936. Preferably, receiving the "go off hook" message comprises the processor 72 receiving the control frame from the user telephony communications device 104 and notifying the BeThere! server software. In response, the BeThere! server software commands the processor 72 to control the hook switch 93 of the SLT interface 76 to close thereby generating an off hook condition on the station line 5, in the analog station embodiments (i.e., FIGS. 12*a* and 12*c*). In the digital station embodiments (i.e., FIGS. 12*b* and 12*d*), the BeThere! server software commands the T1 adapter 90 to generate off hook signaling bits thereby generating an off hook condition on the station line 5. In the embodiment of FIG. 12*e*, the BeThere! server software commands the analog line adapter 94 to close a hook switch thereby generating an off hook condition on the station line 5.

The PBX 22 detects the off hook condition, stops ringing the station line 5, and sends audio from the third party subscriber on the station line 5, in step 938. The user telephony communications device 104 and server modem 25 then transmit audio to one another on a voice channel via the trunk line 4, in step 940. That is, the user telephony communications device 104 receives audio from the telephone 124 and transmits the audio as compressed speech on the telephone line 2 to the server modem 25 as described above with regard to FIG. 8. Conversely, the user telephony communications device 104 receives compressed speech on the telephone line 2 from the server modem 25 and transmits the audio content of the compressed speech as an analog audio signal to the telephone 124 as described above with regard to FIG. 8. Similarly, the server modem 25 receives audio of the third party subscriber from the PBX 22 on the station line 5 and transmits the audio as compressed speech to the user telephony communications device 104 on the trunk line 4 as described above with regard to FIG. 12. Conversely, the server modem 25 receives compressed speech from the user telephony communications device 104 on the trunk line 4 and transmits the audio content in the compressed speech as an analog audio signal to the PBX 22 on station line 5 as described above with regard to FIG. 12.

Thus, the user is enabled to establish a virtual presence in the office.

Furthermore, wherein the office is an ISP, the user is enabled to perform data communications with the ISP on a single communications line while performing voice communications on the same communications line on which the data communications are being performed.

Figure 24:
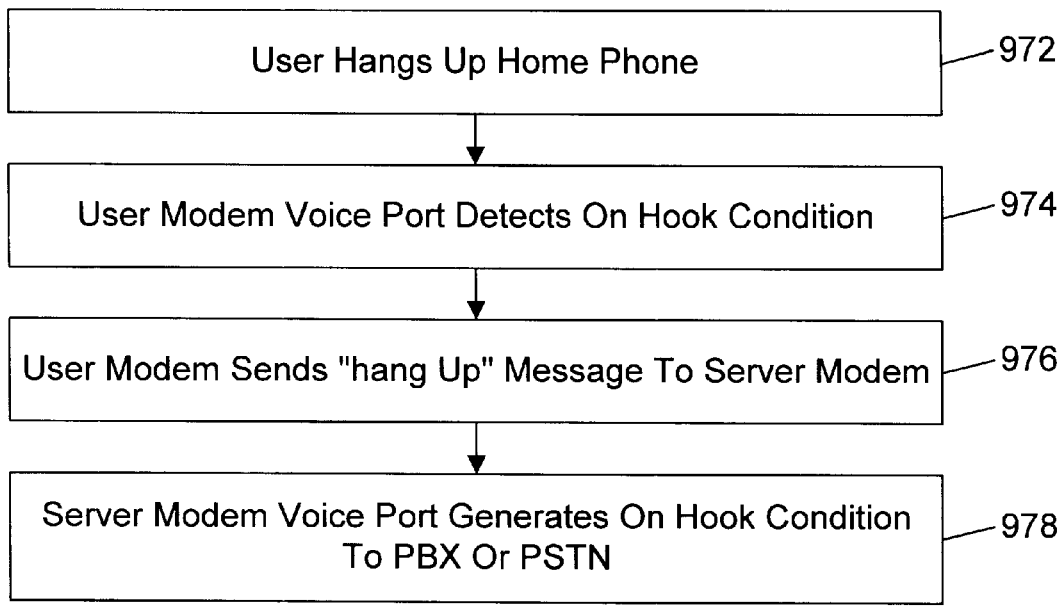
FIG. 24 is a flowchart illustrating steps taken during the termination of a telephone call.

FIG. 24—Flowchart of Voice Call Termination

Referring now to FIG. 24, a flowchart illustrating steps taken during the termination of a telephone call is shown. The user hangs up the telephone 124, in step 972. In one embodiment, the user clicks on the "Handfree" button on the virtual 30 telephone of FIG. 3*a* or presses the "PgDn" button on the user computer 102 keyboard, to terminate the voice connection between the user telephony communications device 104 and the server modem 25.

The user telephony communications device 104 voice port detects the on hook condition generated by the user hanging up the telephone 124, in step 974. That is, the loop current detector 97 in the CO interface 56 of the user telephony communications device 104 notifies the processor 52 of the detection of the on hook condition. Preferably, the processor 52 notifies the BeThere! client software of the on hook condition.

In response to the on hook condition, or to the user hanging up using the video the screen, the BeThere! client software commands the processor 52 of the user telephony communications device 104 to send a "hang up" message to the server modem 25, in step 976. That is, the user telephony communications device 104 sends a control frame to the server modem 25 which arrives at the server modem 25 on the trunk line 4 to instruct the server modem 25 to generate an on hook condition to the PBX 22. Preferably, the "hang up" message comprises a predetermined value in a predetermined location of the control frame.

In response to receiving the "hang up" message from the user telephony communications device 104, the server modem 25 voice port generates an on hook condition to the PBX 22 on the station line 5, in step 978, to terminate the voice call. Preferably, receiving the "hang up" message comprises the processor 72 notifying the BeThere! server software of the reception of the control frame from the user telephony communications device 104. Preferably, generating an on hook condition comprises the BeThere! server software commanding the processor 72 to control the hook switch 93 to open, thereby generating an on hook condition on the station line 5, in the analog station embodiments. In the digital station embodiments, the BeThere! server software commands the T1 adapter 90 to transmit on hook signaling bits on the station line 5 to generate an on hook condition. In the embodiment of FIG. 12*e*, the BeThere! server software commands the analog line adapter 94 to open a hook switch to generate an on hook condition on the station line 5.

Figure 25:
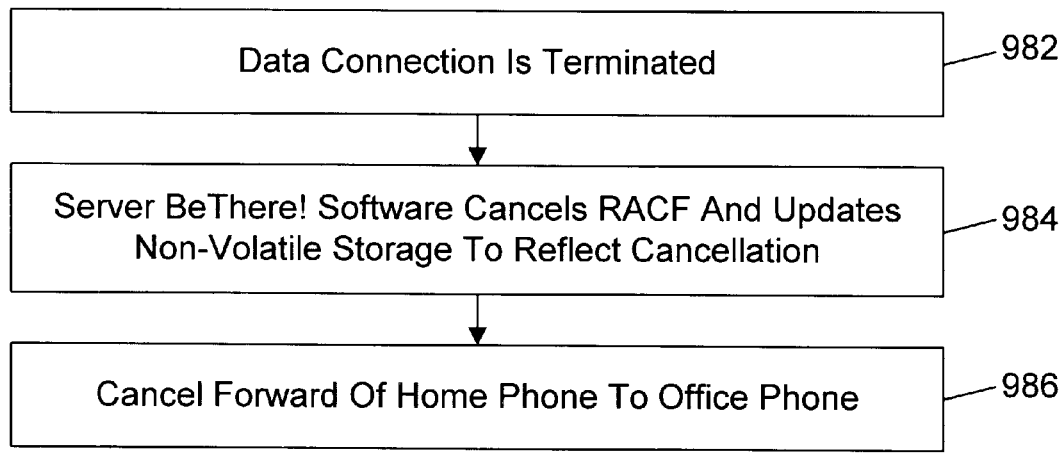
FIG. 25 is a flowchart illustrating steps taken during the termination of the data connection between the user telephony communications device of FIG. 2 and the server modem of FIGS. 12a through 12e.

FIG. 25—Flowchart of Data Connection Termination

Referring now to FIG. 25, a flowchart illustrating steps taken during the termination of the data connection between the user telephony communications device 104 and the server modem 25 is shown. The data connection between the user telephony communications device 104 and the server modem 25 is terminated, in step 982. That is, the user telephony communications device 104 data port generates an on hook condition to the telephone line 2 by opening hook switch 93. Preferably, the BeThere! client software commands the processor 52 to control the hook switch 93 to open thereby generating the on hook condition. In one embodiment, the user simply clicks on the "Go Home" button on the telephone or "EXIT" button in the upper right hand corner, as shown in FIG. 3*a*, to terminate the data connection between the user telephony communications device 104 and the server modem 25.

The BeThere! server software cancels the RACF which was performed previously, such as during step 708 or 534, and updates the non-volatile storage location to reflect the RACF cancellation, in step 984. The RACF cancellation instructs the PBX 22 to no longer forward calls made to the office telephone 122 number (i.e., the first telephone number) to the server modem 25 voice port, i.e., to the station line 5. Preferably, step 984 is performed prior to step 982. That is, preferably the RACF cancellation is performed prior to the user telephony communications device 104 hanging up the telephone line 2.

The call forwarding of the user telephone 124 (i.e., the second telephone number) to the office telephone 122 (i.e., the first telephone number), which was performed during step 722, or to the virtual presence server 106 directly, is then canceled, in step 986. Preferably, the call forwarding of the user telephone 124 to the office telephone 122 is canceled by the BeThere! client software, or is canceled by the user manually.

Figure 26:
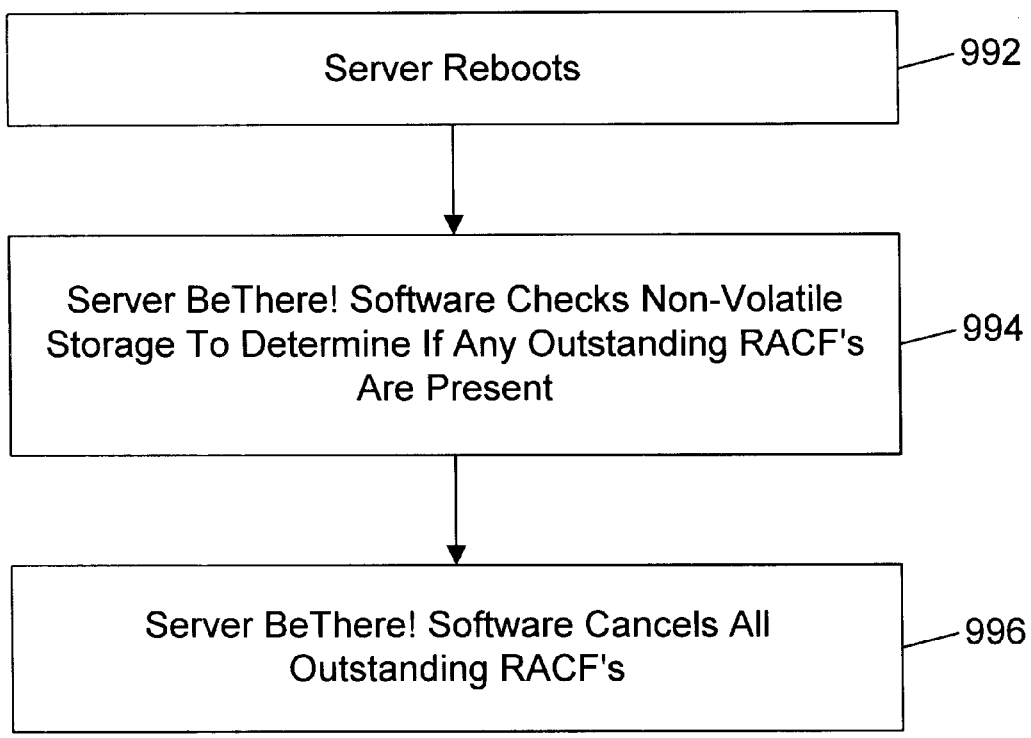
FIG. 26 is a flowchart illustrating steps taken to cancel outstanding RACF's.

FIG. 26—Flowchart of RACF Recovery

Referring now to FIG. 26, a flowchart illustrating steps taken to cancel outstanding RACF's is shown. A situation may occur where the data connection between the server modem 25 and user telephony communications device 104 is terminated prematurely. For example, a power outage on the virtual presence server 106 may occur or a line may be inadvertently severed physically. After the power outage, the virtual presence server 106 reboots, in step 992. The BeThere! software executing on the virtual presence server 106 checks the RACF records stored in the non-volatile storage during step 534 or 708 to determine if any outstanding RACF's are present, i.e., which were not canceled, in step 994. The BeThere! server software then cancels any outstanding RACF's found in the non-volatile storage, in step 996. Thus, advantageously, the virtual presence server 106 restores the state of the office telephone 122 so that calls may be received at the office telephone 122 normally rather than being forwarded to the server modem 25 when not desired.

Figure 27:
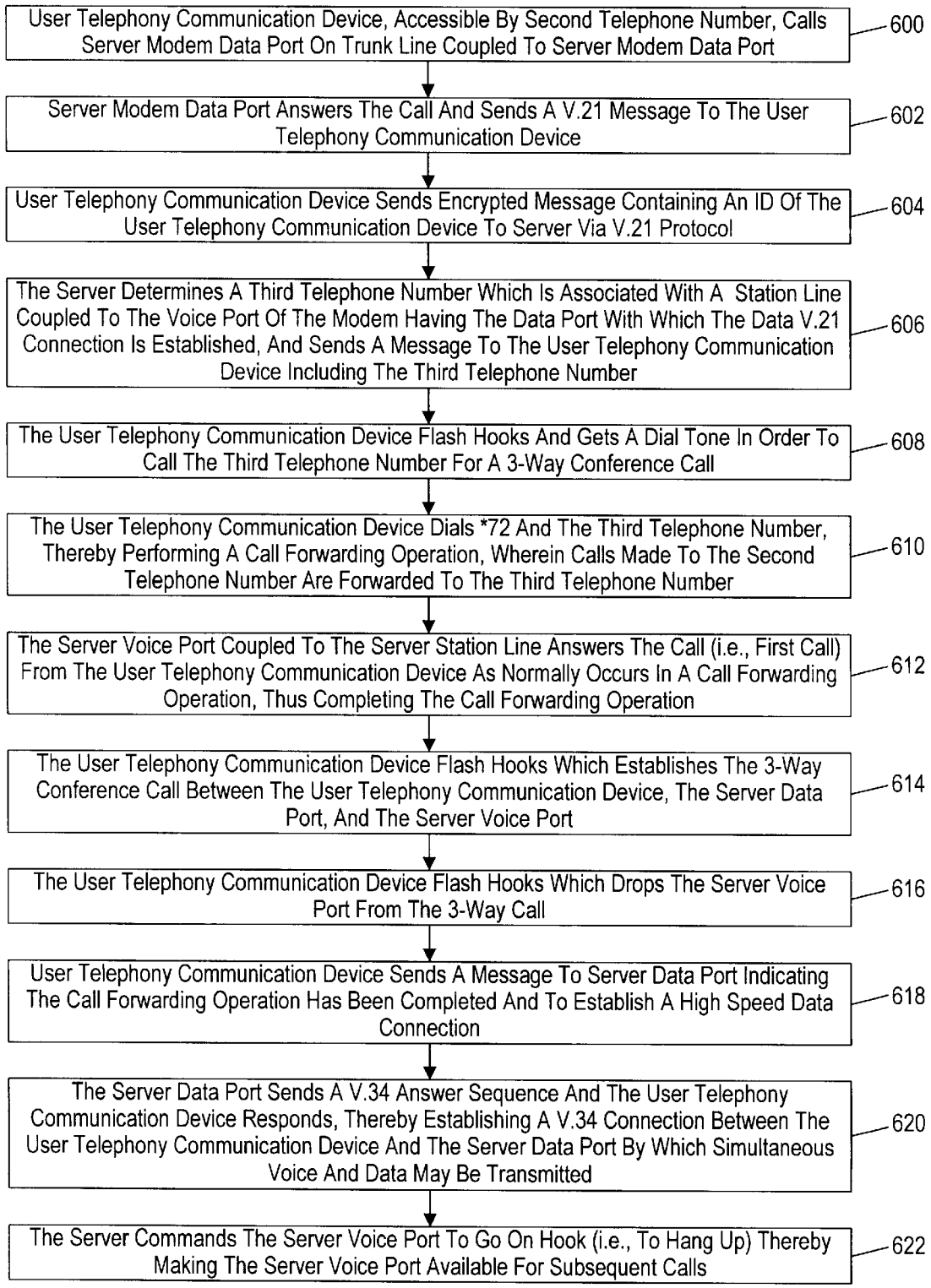
FIG. 27 is a flowchart illustrating a method which enables the user, such as a telecommuter or an Internet Service Provider (ISP) subscriber, operating the user telephony communications device of FIG. 2, to establish connectivity to the remote data site, i.e., office over the communication line coupled to the user telephony is communications device.

FIG. 27—Call Forwarding Operation Using Multi-Way Call Feature

Referring now to FIG. 27, a flowchart is shown illustrating a method which enables the user, such as a telecommuter or an Internet Service Provider (ISP) subscriber, operating the user telephony communications device 104, to establish connectivity to the remote data site, i.e., office over the communication line 2 coupled to the user telephony communications device 104. The method enables the user to receive and/or perform communications with a third party subscriber, using the communication line 2 when the user is connected to the remote data site using the communication line 2 according to the present invention.

First, the user telephony communications device 104, which is coupled to communication line 2 and is accessible by the second telephone number, goes off hook. In response to going off hook, the user telephony communications device 104 receives a dial tone from the PSTN. The user telephony communications device 104 dials an access phone number provided by the virtual presence server 106, such as an ISP access number or corporate office access number, in step 600. The access number is associated with a trunk line 4 of the virtual presence server 106, wherein the access number comprises a telephone number used to access a data port of a server modem 25. The call is routed by the PSTN, which sends a ringing signal to the trunk line 4. The ringing signal is received by the server modem 25 data port.

In response to the ringing signal, the server modem 25 data port goes off hook (i.e., answers the call) and sends a message to the user telephony communications device 104, in step 602. In one embodiment, the message is a V.21 protocol message, although other protocols could be used. The V.21 protocol advantageously is able to be put on hold, i.e., receive silence, and still maintain data communications. Since the connection will be put on hold during the forthcoming 3-way call operation, the protocol must be able to tolerate being put on hold. In one embodiment, the user telephony communications device 104 and server modem 25 data port exchange a set of messages, wherein the user telephony communications device 104 sends a message uniquely identifying itself to the virtual presence server 106, in step 604. Preferably, the identification message is encrypted by an encryption mechanism to increase the security of the communication system. After receiving and verifying the identification message, the virtual presence server 106 sends a message to the user telephony communications device 104 including a third telephone number, the telephone number of the voice port of the server modem 25 with which the data connection was established, in step 606.

In response to receiving the server modem 25 voice port phone number, the user telephony communications device 104 initiates a 3-way conference call. The user telephony communications device 104 initiates a 3-way conference call by performing a flash hook operation and receiving a dial tone from the PSTN, in order to call the server modem 25 voice port, i.e., the third telephone number, in step 608. The flash hook operation places the server modem 25 data port on hold. In response to the dial tone, the user telephony communications device 104 dials the appropriate sequence to perform a call forwarding operation, i.e., to instruct a central office within the PSTN to forward calls directed at the user telephony communications device 104 telephone number to the server modem 25 voice port phone number in step 610. Preferably, performing the call forwarding operation comprises dialing a call forward sequence, receiving a dial tone such as a stutter dial tone, and dialing the phone number to which the calls are to be forwarded, particularly the server modem 25 voice port phone number, i.e., the third telephone number. In one embodiment, the call forward sequence is "* 72", while in another embodiment, the call forward sequence is "72 #".

In response to the call forwarding operation performed by the user telephony communications device 104, the PSTN sends a ringing signal to the server modem 25 voice port. The server modem 25 voice port detects the ringing signal and goes off hook to answer the first call as normally occurs in call forwarding operations, in step 612. In one embodiment, the server modem 25 voice port sends a message to the user telephony communications device 104 to indicate the establishment of a valid connection between the user telephony communications device 104 and the server modem 25 voice port. Preferably, the validation message is a Dual Tone Multi-Frequency (DTMF) sequence generated by the DTMF generator 87.

In response to the call being answered by the server modem 25 voice port, i.e., the connection being established between the user telephony communications device 104 and the server modem 25 voice port, the user telephony communications device 104 performs another flash hook operation. In response to the flash hook operation, the PSTN reconnects the server modem 25 data port, thereby establishing a 3-way call between the user telephony communications device 104 , the server modem 25 data port, and the server modem 25 voice port, in step 614. Preferably, the user telephony communications device 104 performs a delay of approximately one half second after performing the flash hook operation in order to allow the CO to make the connection back to the server modem 25 data port, thereby establishing the 3-way call. In one embodiment, the user telephony communications device 104 sends a validation message to the server modem 25 voice port, such as a DTMF sequence, to confirm the 3-way call connection.

The user telephony communications device 104 then performs another flash hook operation to drop the server modem 25 voice port line from the 3-way call, but leaving the connection between the user telephony communications device 104 and the server modem 25 data port intact, in step 616. At this point, the server modem 25 voice port line would appear busy to anyone calling the server modem 25 voice port.

After dropping the server modem 25 voice port, the user telephony communications device 104 sends a message to the server modem 25 on the server modem 25 data port informing the virtual presence server 106 that calls have been forwarded from the user telephony communications device 104 to the server modem 25 voice port. The user telephony communications device 104 also instructs the server modem 25 data port to establish a high speed communications connection with the user telephony communications device 104, in step 618. In response to the message from the user telephony communications device 104, the server modem 25 data port establishes a high speed communications connection with the user telephony communications device 104, in step 620. Preferably, the high speed connection between the user telephony communications device 104 and the server modem 25 data port is a connection in which voice and data may be simultaneously transferred between the user telephony communications device 104 and server modem 25 data port. In one embodiment, the high speed connection is a V.34 communications connection, in which establishing the connection comprises the server modem 25 data port sending a V.34 answer sequence to the user telephony communications device 104 and the user telephony communications device 104 sending a V.34 originate sequence to the server modem 25 data port. In an alternate embodiment, the server modem 25 data port establishes the high speed communications connection with the user telephony communications device 104 of step 620 according to a timed sequence, rather than in response to a message from the user telephony communications device 104.

Preferably, the BeThere! server software commands the server modem 25 voice port to go on hook (i.e., to hang up), in step 622, in order to make the server modem 25 voice port available for subsequent calls. Preferably, the server modem 25 voice port goes on hook after the high speed connection is established in order to avoid the possibility of a call coming in to the server modem 25 voice port before the high speed connection is established, thereby advantageously avoiding the gap between the time calls are forwarded and the time when the high speed connection is established.

Thus, the method described in the flowchart of FIG. 27, which uses a 3-way call operation in conjunction with a call forwarding operation, advantageously prevents the server modem 25 voice port from going on hook, i.e., from being available to receive calls, until the call forwarding operation has completed and the high speed communication connection has been established. This feature avoids the gap of time between the call forwarding operation and the establishment of the data communication connection between the user telephony communications device 104 and the server modem 25, as may occur in other embodiments.

Figure 29:
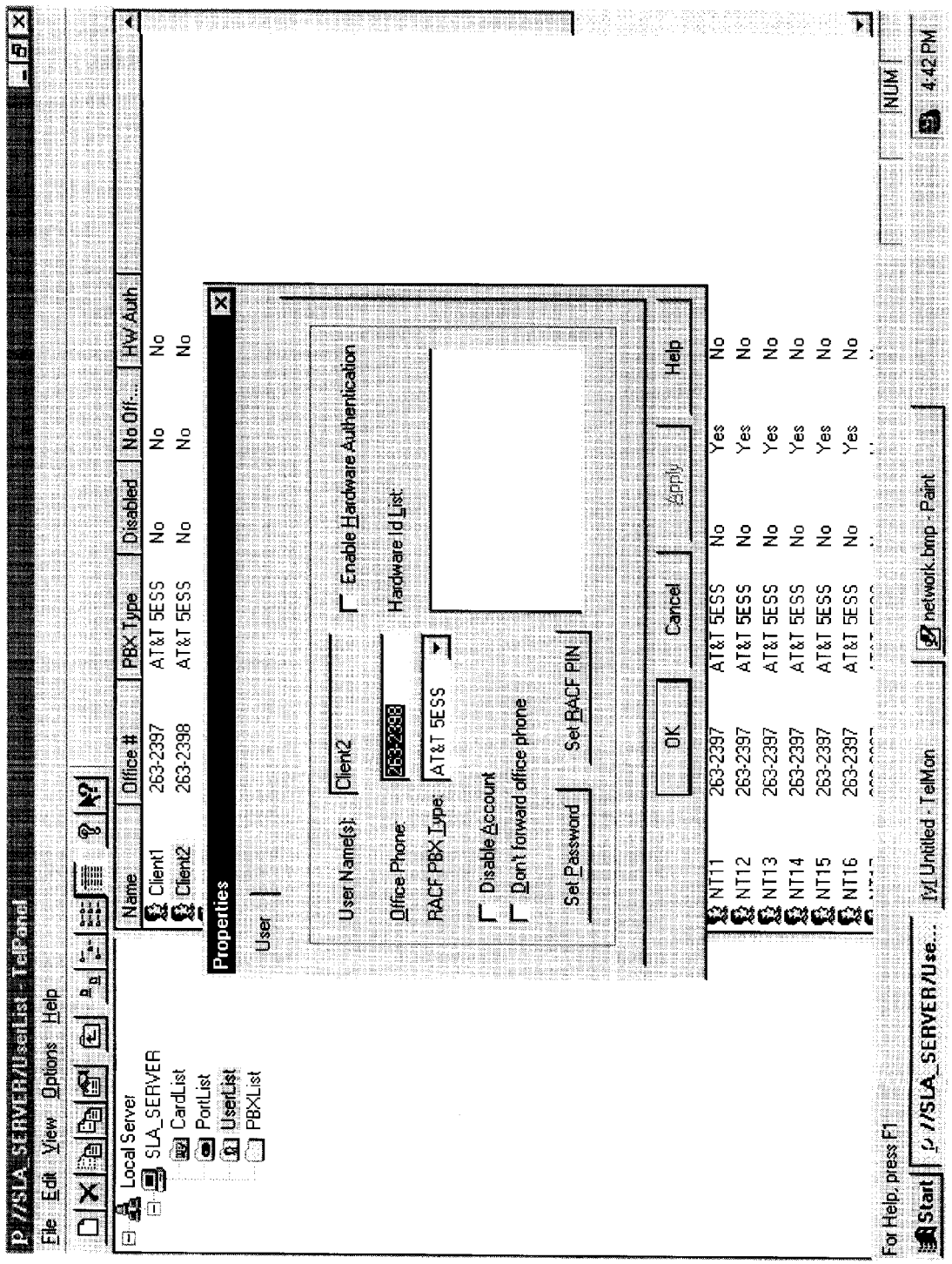
FIG. 29 is a screen shot of one embodiment of the user interface of software executing on the virtual presence server of FIG. 2 to configure various parameters associated with virtual presence.

FIGS. 28 and 29—Virtual Presence Server software Screen Shots

Referring now to FIG. 28, a screen shot of one embodiment of the user interface of software executing on the virtual presence server 106 to monitor status is shown. The screen shot of FIG. 28 shows 24 COM ports, identified as COM11 through COM34. The 24 COM ports are associated with 24 server modems 25 of a modem system 24 of the virtual presence server 106, such as in the T1 embodiment of FIG. 12*b*. The screen displays, for each COM port, or modem 25, the status of the modem 25. A "Running" status indicates that the modem 25 is available, that is, the modem 25 data port is free to receive an incoming data call from a user telephony communication device 104. A "Connected" status indicates that a data connection has been established on the data port of the modem 25. An "Offhook" status indicates that both a data connection has been established on the data port and that a voice connection has been established on the voice port. A "Disabled" status indicates that the modem 25 will not be selected to receive an incoming call.

For each COM port, i.e., each modem 25, the "PBX#" is listed. The "PBX#" refers to the server modem 25 voice port telephone number. This is the number to which calls are forwarded either from the user's office telephone 122 or from the user's home telephone 124. The "User Connected" field lists the user name associated with remote user which is currently connected to the respective modem 25. The "Fwd From" field lists the telephone number which is forwarded to the modem 25 voice port. That is, the "Fwd From" field lists either the user's office telephone number or the user's remote telephone number. The "PBX Type" field lists the type of PBX 22 coupled to the modem system 24 and office telephone 122.

Referring now to FIG. 29, a screen shot is shown of one embodiment of the user interface of software executing on the virtual presence server 106 to configure various parameters associated with virtual presence. The screen shot of FIG. 29 shows a window which enables an administrator of the virtual presence server 106 to specify an office telephone number for users of the virtual presence server 106. The office telephone number is then used by the virtual presence server 106 to perform RACF operations as described above.

The administrator is further enabled to specify that type of PBX 22 which is coupled to the modem system 24 and office telephone 122. FIG. 29 shows an AT&T 5ESS(R) switch type connected to the user's telephone and to the modem system 24. The RACF PBX type information is used by the virtual presence server 106 to determine which sequence of tones to send to the PBX to accomplish a RACF operation, since RACF sequences vary among PBXs. The user interface of FIG. 29 also allows setting of a password associated with the user, i.e., with the user name (such as Client2 shown). The password is used to validate users wishing to establish a connection with the virtual presence server 106. The user interface of FIG. 29 also allows setting of a RACF PIN (personal identification number) for each user. The RACF PIN is used by the virtual presence server 106 when performing the RACF operations as described above. The administrator is also enabled to disable a client's account and to disable forwarding of the user's office telephone, as shown.

Figure 30:
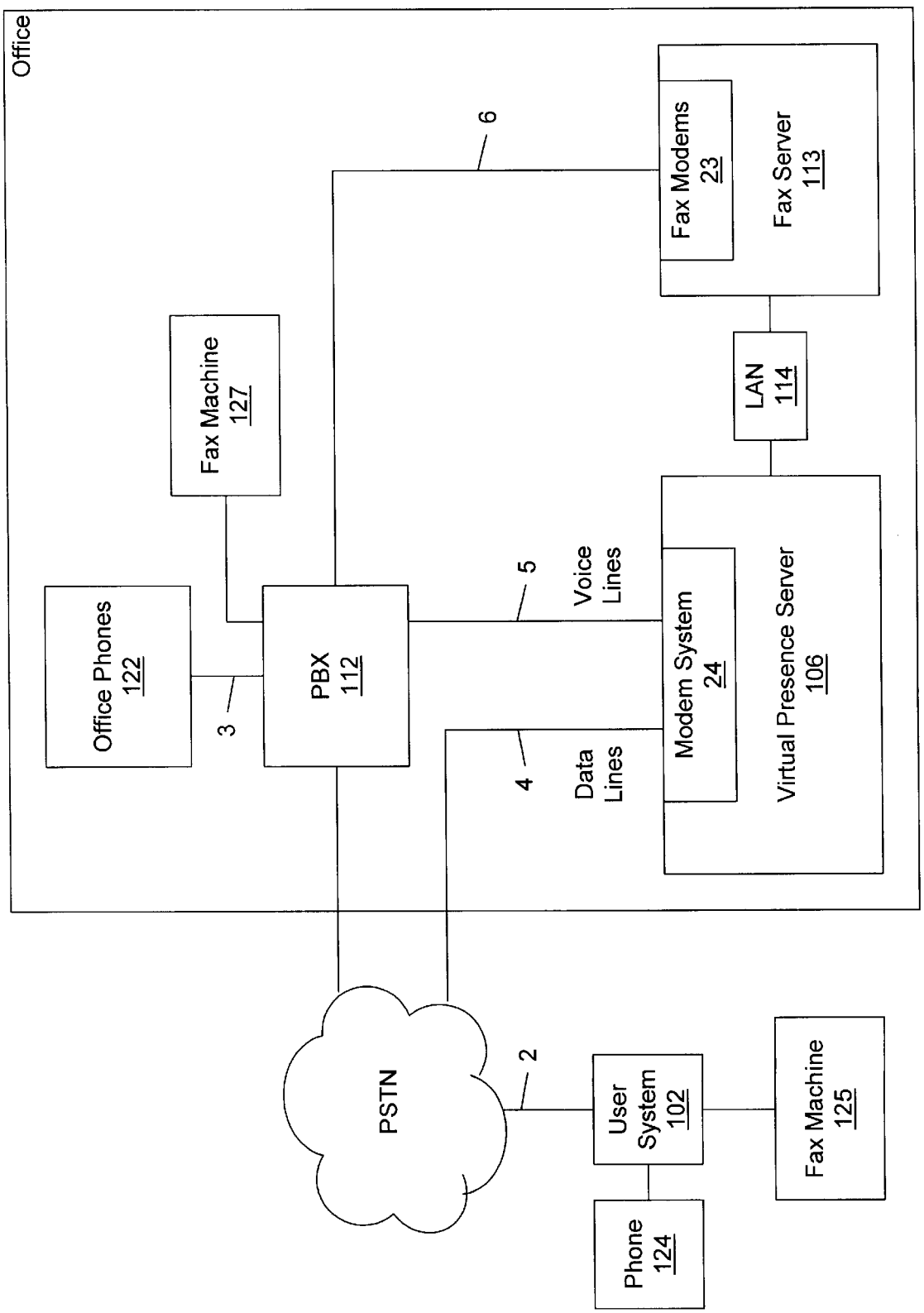
FIG. 30 is a block diagram of the virtual presence system of FIG. 1 which illustrates fax capabilities of the system.

FIGS. 30 through ???—Fax Subsystem

Referring now to FIG. 30, a block diagram of the virtual presence system of the present invention is shown which illustrates the fax capabilities of the system. The system of FIG. 30 is similar to the system of FIG. 10*a* but also includes a remote fax machine 125 coupled to the user system 16, an office fax machine 127 coupled to the office PBX 22, and a fax server 113 coupled to the virtual presence server 106 via the office LAN 114. The remote fax machine 125 resides at the user's location, such as in a telecommuter's home. The remote fax machine 125 is coupled to a fax terminal adapter in the remote computer 102 as will be discussed below. The office fax machine 127 resides in the user's office and is the fax machine at which the user would typically receive faxes if present in the office. The office fax machine may be called via an office fax telephone number.

The fax server 113 comprises a server similar to the virtual presence server 106, except that the fax server 113 comprises one or more fax modems 27 for receiving and sending faxes. The fax server 113 receives faxes from the telephone line 6 or from the virtual presence server 106 via the office LAN. The fax server 113 also forwards faxes to the virtual presence server 106 and/or stores the faxes on storage devices comprised in the fax server 113. The fax server 113 also transmits faxes on the telephone line 6 or to the virtual presence server 106. In one embodiment, the fax modems 27 are comprised in the virtual presence server 106, and thus the fax server 113 is comprised in the virtual presence server 106.

The system of FIG. 30 enables the remote user to transmit and receive fax documents with his remote fax machine 125. The system of FIG. 30 enables the remote user to transmit and receive fax documents with fax software from the remote computer 102. The system of FIG. 30 enables the remote user to have fax documents sent to the office fax machine 127 routed to his remote computer 102 while the user has a virtual presence established with the virtual presence server 106. The system of FIG. 30 enables the remote user to have fax documents sent to the remote telephone number, i.e., the telephone number associated with his remote telephone line 2, to be routed to the virtual presence server 106 and then to his remote computer 102 while the user has a virtual presence established with the virtual presence server 106. The operation of these capabilities will be described below.

Figure 31:
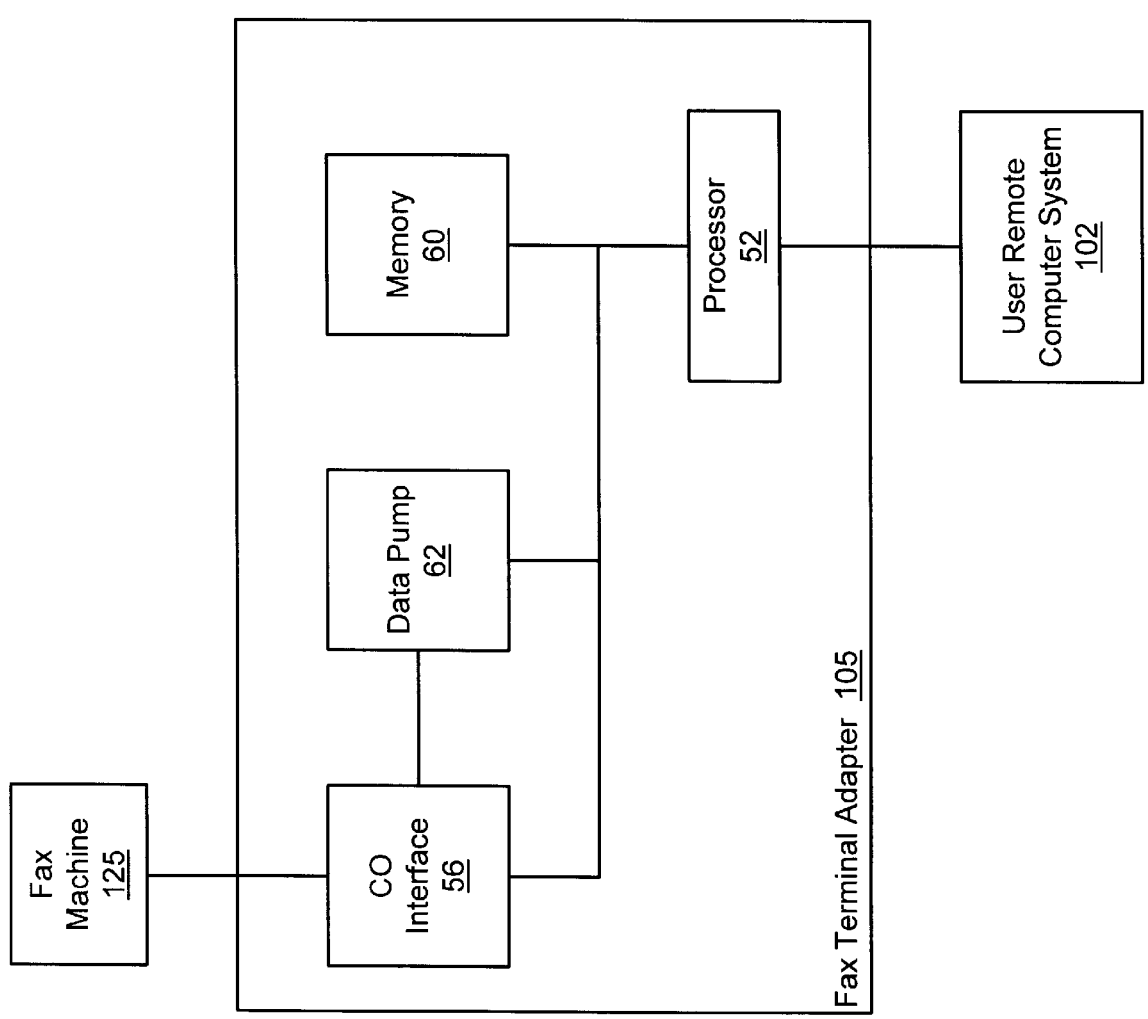
FIG. 31 is a block diagram of a fax terminal adapter of the user system of FIG. 30.

Referring now to FIG. 31, a block diagram of a fax terminal adapter 105 of the user system 16 of FIG. 30 is shown. The fax terminal adapter 105 is coupled to the remote computer 102. The fax terminal adapter 105 is also coupled to the remote fax machine 125. Preferably, the fax terminal adapter 105 is comprised in the user telephony communication device 104. In one embodiment, the fax terminal adapter 105 comprises a separate device or circuit board coupled to the remote computer 102 via an expansion bus of the remote computer 102, such as an ISA or PCI bus. In one embodiment, the terminal adapter 105 comprises a daughter card coupled to the user telephony communication device 104.

The fax terminal adapter 105 interfaces the remote fax machine 125 to the remote computer 102. The fax terminal adapter 105 receives fax data from the remote fax machine 125 and provides the fax data to the remote computer 102. Conversely, the fax terminal adapter 105 receives fax data from the remote computer 102 and provides the fax data to the remote fax machine 125. The fax terminal adapter 105 provides the necessary telephony signaling to communicate with the remote fax machine 125 as a CO of the PSTN would communicate with the remote fax machine 125. That is, the fax terminal adapter 105 appears to the remote fax machine 125 as a CO.

The fax terminal adapter 105 comprises a CO interface 56 coupled to the remote fax machine 125. The CO interface 56 is similar to the CO interface 56 shown in FIG. 13. The provides to the remote fax machine 125 an interface which appears to the remote fax machine 125 as a CO.

The fax terminal adapter 105 further comprises a data pump 62, similar to the data pump 62 of FIGS. 7 and 12, for modulating and demodulating fax data to and from the remote fax machine 125, respectively. The fax terminal adapter 105 further comprises a processor 52 and memory 60 similar to those of FIG. 7.

Figure 32:
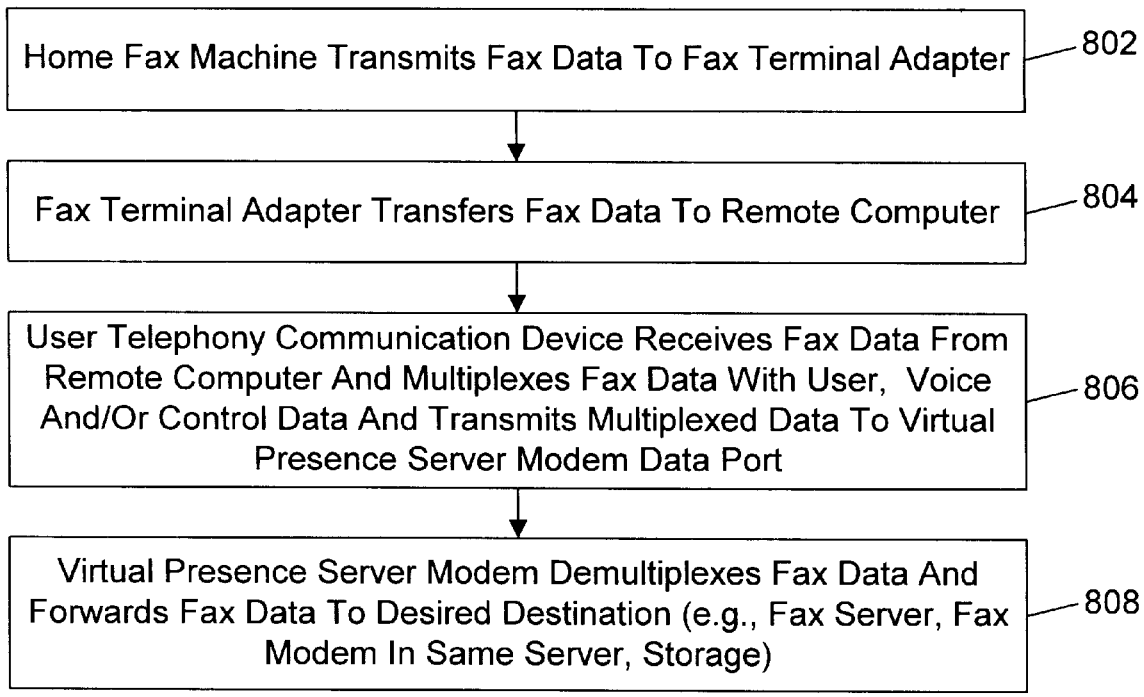
FIG. 32 is a flowchart illustrating operation of the system of FIG. 30 to transmit fax documents with the remote fax machine.

Referring now to FIG. 32, a flowchart illustrating operation of the system of Ad FIG. 30 to transmit fax documents with the remote fax machine 125 is shown. In step 802, the remote fax machine 125 transmits fax data to the fax terminal adapter 105. The fax terminal adapter 105 CO interface 56 detects an off hook condition generated by the remote fax machine 125 and performs the necessary telephony protocol with the remote fax machine 125 to receive the fax data from the remote fax machine 125.

The fax terminal adapter 105 transfers the fax data to the remote computer 102, in step 804. Preferably, the remote computer 102 stores the fax data on a storage device of the remote computer 102, such as a disk drive. Preferably, the software executing on the remote computer 102 is notified of the fax data and performs the storage of the fax data and subsequent transfer to the user telephony communication device 104. In one embodiment, the fax terminal adapter 105 transfers the fax data directly to the user telephony communication device 104.

The user telephony communication device 104 receives the fax data and multiplexes the fax data with other data, such as user, voice and/or control data and transmits the multiplexed data to the virtual presence server modem 25 data port which with the remote computer 102 has a virtual presence connection established, in step 806. Preferably, the fax data is transmitted on the data channel rather than the voice channel. Thus, advantageously the integrity of the voice channel is not jeopardized. The virtual presence server 106 receives the multiplexed data and demultiplexes the data, in step 808. The virtual presence server 106 then forwards the fax data to the desired destination, such as to the fax server 113, a fax modem in the virtual presence server 106 or a storage device in the fax server 113 or virtual presence server 106. The multiplexing, transfer of the multiplexed data and demultiplexing of the data is as described above with reference to the previous figures.

If the user desires to transmit fax documents with fax software from the remote computer 102, then the user provides input to a fax program executing on the remote computer 102 which controls the user telephony communication device 104 to perform steps 806 and 808. Thus, the user is enabled to transmit fax documents either from the remote fax machine 125 or using fax software on the single telephone line 2 while simultaneously transferring user data between the remote computer 102 and the virtual presence server 106 and/or performing voice communications with a third party subscriber on the telephone line 2.

Figure 33:
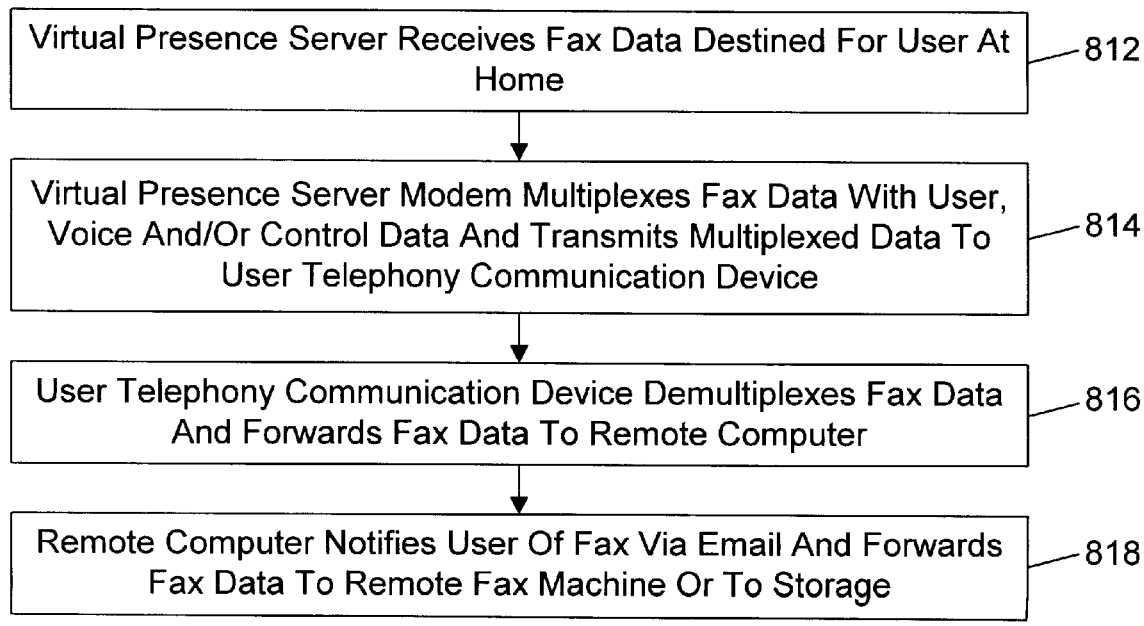
FIG. 33 is a flowchart illustrating operation of the system of FIG. 30 to receive fax documents with the remote fax machine.

Referring now to FIG. 33, a flowchart illustrating operation of the system of FIG. 30 to receive fax documents with the remote fax machine 125 is shown. The virtual presence server 106 receives fax data which is to be transmitted to the user at the user premises, in step 812. The virtual presence server 106 modem multiplexes the fax data with user, voice and/or control data and transmits multiplexed to the user telephony communication device 104, in step 814. The user telephony communication device 104 receives the multiplexed data, demultiplexes the fax data from the other data and forwards the fax data to the remote computer 102, in step 816. Preferably, the remote computer 102 notifies the user of the incoming fax via email, in step 818. If the fax is intended for the remote fax machine 125, the fax data is forwarded to the fax terminal adapter 105 which transmits the fax data to the remote fax machine 125. If the fax is intended for fax software executing on the remote computer 102, then the fax data is forwarded to the fax software and the user may, for example, view the fax on a video screen of the remote computer 102.

Thus, the user is enabled to receive fax documents either for the remote fax machine 125 or for fax software on the single telephone line 2 while simultaneously transferring user data between the remote computer 102 and the virtual presence server 106 and/or performing voice communications with a third party subscriber on the telephone line 2.

Figure 34:
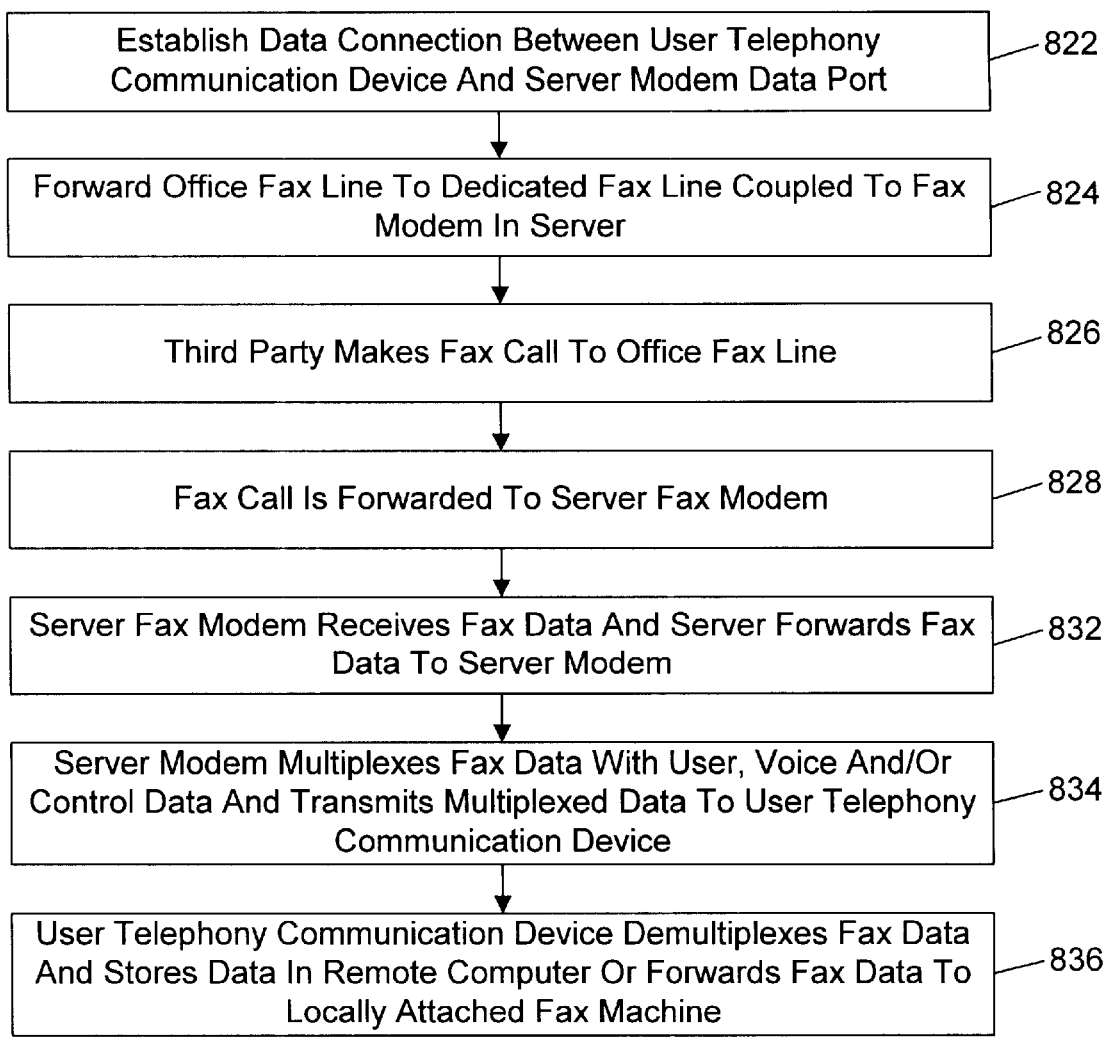
FIG. 34 is a flowchart illustrating operation of the system of FIG. 30 to enable the remote user to have fax documents sent to the office fax machine routed to his remote computer while the user has a virtual presence established with the virtual presence server.

Referring now to FIG. 34, a flowchart is shown illustrating operation of the system of FIG. 30 to enable the remote user to have fax documents sent to the office fax machine 127 routed to his remote computer 102 while the user has a virtual presence established with the virtual presence server 106. In step 822, the remote computer 102 and the virtual presence server 106 establish a data connection on the user telephony communication device 104 and the server modem 25. In step 824, the telephone number associated with the office fax machine 127 is forwarded to a fax line, such as one of lines 6 coupled to the fax modems 23 in the fax server 113. Preferably, the virtual presence server 106 performs a RACF to call forward the office fax number to the fax server 113.

A third party makes a fax call to the office fax machine 127, i.e., to the telephone number associated with the office fax machine 127, in step 826. In step 828, the fax call is forwarded by the PBX 22 to the server fax modem 23 to which the RACF was performed in step 824. In step 832, the fax modem 23 receives the fax data and forwards the fax data to the virtual presence server 106 and the fax data is provided to the server modem 25 with which the virtual presence connection was established in step 822.

In step 834, the server modem 25 multiplexes the fax data with user, voice and/or control data and transmits the multiplexed data to the user telephony communication device 104 on the virtual presence server 106 connection which was established in step 822. Preferably, the fax data is transmitted to the user telephony communication device 104 on the data channel rather than the voice channel thereby advantageously not jeopardizing the voice quality of the speech between the remote user and the third party subscriber.

Figure 35:
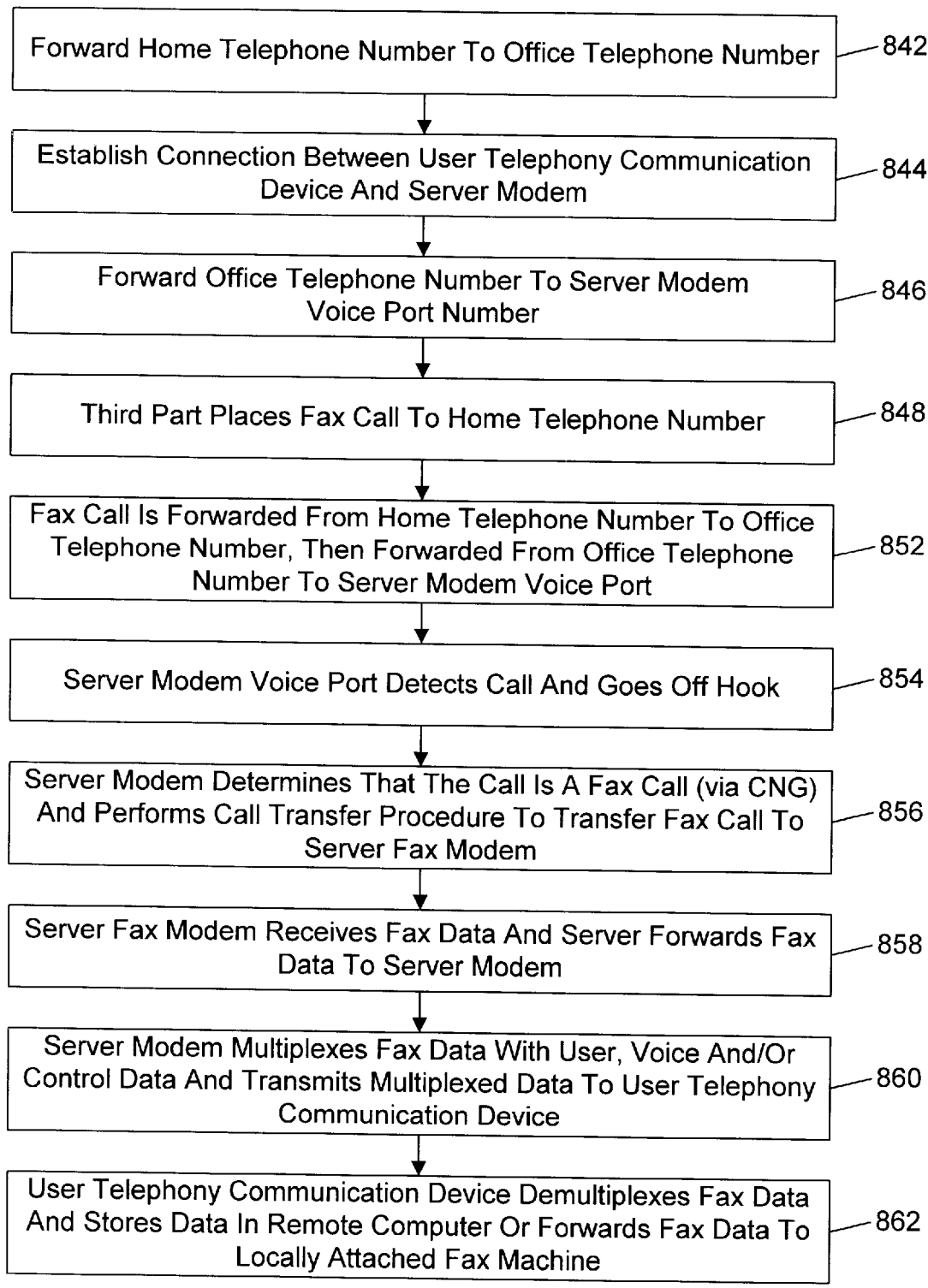
FIG. 35 is a flowchart illustrating operation of the system of FIG. 30 to enable the remote user to have fax documents sent to the remote telephone number to be routed to the virtual presence server and then to the remote computer while the user has a virtual presence established with the virtual presence server.

In step 836, the user telephony communication device 104 receives the multiplexed data from the virtual presence server 106 and demultiplexes the fax data and user and/or voice data. The user telephony communication device 104 either stores the fax data for later use by the remote user or forwards the fax data to the remote fax machine 125. Thus, the remote user is enabled to have fax documents sent to the office fax machine 127 routed to his remote computer 102 while having a virtual presence with the virtual presence server 106 Referring now to FIG. 35, a flowchart is shown illustrating operation of the system of FIG. 30 to enable the remote user to have fax documents sent to the remote telephone number, i.e., the telephone number associated with his remote telephone line 2, to be routed to the virtual presence server 106 and then to his remote computer 102 while the user has a virtual presence established with the virtual presence server 106. In step 842, the remote telephone number is forwarded to the office telephone number, i.e., with the telephone line 3 associated with the office phone 122. Preferably, the remote computer 102 performs the call forwarding operation to call forward the remote telephone number to the office telephone number. In step 844, the remote computer 102 and the virtual presence server 106 establish a data connection on the user telephony communication device 104 and the server modem 25. In step 846, the telephone number associated with the office telephone 122 is forwarded to the server modem 25 voice port, i.e., to the voice port of the server modem 25 with which the data connection was established in step 844. Preferably, the virtual presence server 106 performs a RACF to call forward the office telephone number to the server modem 25 voice port.

A third party makes a fax call to the remote telephone number, in step 848. In step 852, the fax call is forwarded by the PSTN to the office telephone number and then by the PBX 22 to the server modem 25 voice port. In step 854, the server modem 25 voice port detects the fax call and goes off hook to answer the call. In step 856, the server modem 25 voice port determines that the call is a fax call, preferably via an CNG signal, and performs a call transfer procedure to transfer the fax call to one of the fax modems 23 in the fax server 113 on one of the fax lines 6. That is, the server modem 25 voice port instructs the PBX 22 to transfer the fax call to the fax modem 23.

In step 858, the fax modem 23 receives the fax data and forwards the fax data to the virtual presence server 106 and the fax data is provided to the server modem 25 with which the virtual presence connection was established in step 844.

In step 860, the server modem 25 multiplexes the fax data with user, voice and/or control data and transmits the multiplexed data to the user telephony communication device 104 on the virtual presence server 106 connection which was established in step 844. Preferably, the fax data is transmitted to the user telephony communication device 104 on the data channel rather than the voice channel thereby advantageously not jeopardizing the voice quality of the speech between the remote user and the third party subscriber.

In step 862, the user telephony communication device 104 receives the multiplexed data from the virtual presence server 106 and demultiplexes the fax data and user and/or voice data. The user telephony communication device 104 either stores the fax data for later use by the remote user or forwards the fax data to the remote fax machine 125. Thus, the remote user is enabled to have fax documents sent to the remote telephone number to be routed to the virtual presence server 106 and then to the remote computer 102 while having a virtual presence established with the virtual presence server 106.

Include the software block diagram from Jay Nelson.

CONCLUSION

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system, comprising:
   a remote site having a user communication device configured to connect to an office site over a communication line, wherein said user communication device is remote from said office site;
   said office site comprising:
      a telephony server configured to provide telephony functionality to a plurality of office users over a plurality of office communication lines, wherein one of said office communication lines has an office number assigned to said user;
      a local area network configured to provide data communication; and
      a server configured to automatically provide access for said user communication device to said local area network and to said telephony server in response to said user communication device connecting to the office site, wherein said server is configured to automatically invoke a call forwarding operation in response to said user communication device connecting to the office site so that calls made to said office number intended to reach the user at said office site are forwarded to said server, wherein said server sends said calls to said user communication device over said communication line, and wherein said server is firther configured to send data communications from said office data network to said user communication device over said communication line while sending said calls to said user communication device over said communication line.

2. The system as recited in claim 1, wherein said telephony server comprises a private branch exchange (PBX).

3. The system as recited in claim 1, wherein said server is further configured to communicate telephony control data between the user communication device and the telephony server over the communication line so that one or more telephony functions provided to the user at the office site are provided to the user through said user communications device.

4. The system as recited in claim 3, wherein said server is configured to automatically provide access to said local area network and to said telephony server for a plurality of user communication devices.

5. The system as recited in claim 3, wherein said user communication device is coupled to a remote computer that provides a virtual telephone to the user having substantially the same telephony functions as an office telephone assigned to the user at said office number.

6. The system as recited in claim 5, wherein said server is configured to automatically provide access to said local area network and to said telephony server for a plurality of user communication devices.

7. The system as recited in claim 5, wherein said one or more telephony functions include extension dialing so that the user enters only an extension number at the remote site to call a co-worker at said office site.

8. The system as recited in claim 7, wherein said server is configured to automatically provide access to said local area network and to said telephony server for a plurality of user communication devices.

9. The system as recited in claim 1, wherein said call forwarding operation comprises said server instructing said telephony server to automatically forward calls made to said office number to said server.

10. The system as recited in claim 9, wherein said server is configured to automatically provide access to said local area network and to said telephony server for a plurality of user communication devices.

11. The system as recited in claim 9, wherein said calls made to said office number include in-office extension calls and outside calls, so that both internal and external calls intended to reach the user at said office site are sent to the user communication device at the remote site.

12. The system as recited in claim 11, wherein said server is configured to automatically provide access to said local area network and to said telephony server for a plurality of user communication devices.

13. The system as recited in claim 1, wherein said server is coupled to said telephony server on one or more PBX extension lines, and wherein said remote site includes a virtual or physical telephone coupled to the user communication device, wherein said virtual or physical telephone operates as a PBX extension telephone to said office site.

14. The system as recited in claim 1, wherein said server is configured to create three communication channels to said user communication device: a data channel, a voice channel, and a telephony control data channel.

15. The system as recited in claim 1, wherein in response to the user communication device establishing a connection to the office site, said server is configured to provide to the user access to said local area network and said telephony server so that the user operates substantially as if the user were physically present at the office site.

16. The system as recited in claim 1, wherein said server is configured to provide the user at the remote site with the ability to send and receive email as if the user were at the office site.

17. The system as recited in claim 1, wherein said server is configured to provide the user at the remote site with Internet access as provided at the office site.

18. The system as recited in claim 1, wherein the server is configured to provide the user at the remote site with the ability to send and receive faxes as if the user were at the office site.

19. The system as recited in claim 1, wherein said server is configured to send fax transmissions sent to a fax number assigned to the user at the office site to said user communication device.

20. The system as recited in claim 1, wherein in response to said user communication device establishing a connection to said office site, said server is configured to provide the user at the remote site with a virtual presence on said local area network and said telephony server.

21. The system as recited in claim 1, wherein said server is configured to receive information identifying the user when the user communication device establishes a connection to the office site.

22. The system as recited in claim 1, wherein said server is configured to receive security information when the user communication device establishes a connection to the office site.

23. The system as recited in claim 1, wherein said call forwarding operation is a remote access call forwarding (RACF) operation.

24. The system as recited in claim 1, wherein said server is configured to transmit voice and data comprised within Internet Protocol (IP) packets to the user communication device.

25. The system as recited in claim 1, wherein said server is further configured to provide remote access server (RAS) functionality.

26. The system as recited in claim 1, wherein said server is configured to automatically cancel said call forwarding operation when said user communication device disconnects from said office site.

27. The system as recited in claim 1, wherein the server is configured to provide the user at the remote site with the ability to make outgoing calls through said telephony server.

28. The system as recited in claim 27, wherein the server is configured to maintain a log file which comprises information regarding each of said outgoing calls placed by said server for the user.

29. The system as recited in claim 1 wherein said communication line has a remote telephone number assigned to the user at said remote site.

30. The system as recited in claim 1, wherein said server is configured to automatically provide access to said local area network and to said telephony server for a plurality of user communication devices.

31. A server system at an office site, comprising:
    at least one communication device configured to be able to support a communication link with a remote site having a user communication device;
    an interface to a telephony server configured to provide telephony functionality to a plurality of office users over a plurality of office communication lines;

an interface to a local area network configured to provide data communication; and wherein the server system is configured to automatically provide access for said user communication device to said local area network and to said telephony server in response to said user communication device connecting to the office site, wherein the server system is configured to automatically invoke a call forwarding operation in response to said user communication device connecting to the office site so that calls intended to reach the user at said office site are forwarded to the server system, wherein the server system sends said calls to said user communication device over said communication link, wherein the server system is further configured to send data communications from said office data network to said user communication device over said communication link while sending said calls to said user communication device over said communication link.

32. The server system as recited in claim 31, wherein said interface to a telephony server comprises an interface to a private branch exchange (PBX).

33. The server system as recited in claim 31, wherein the server system is further configured to communicate telephony control data between the user communication device and the telephony server over the communication link so that one or more telephony functions provided to the user at the office site are provided to the user through said user communications device.

34. The server system as recited in claim 33, wherein the server system is configured to automatically provide access to said local area network and to said telephony server for a plurality of user communication devices.

35. The server system as recited in claim 33, wherein said one or more telephony functions include extension dialing so that the user enters only an extension number at the remote site to call a co-worker at said office site.

36. The server system as recited in claim 33, wherein the server system is configured to automatically provide access to said local area network and to said telephony server for a plurality of user communication devices.

37. The server system as recited in claim 31, wherein one of said office communication lines has an office number assigned to said user, and wherein said call forwarding operation comprises the server system instructing said telephony server to automatically forward calls made to said office number to the server system.

38. The server system as recited in claim 37, wherein the server system is configured to automatically provide access to said local area network and to said telephony server for a plurality of user communication devices.

39. The server system as recited in claim 37, wherein said calls made to said office number include in-office extension calls and outside calls, so that both internal and external calls intended to reach the user at said office site are sent to the user at the remote site.

40. The server system as recited in claim 39, wherein the server system is configured to automatically provide access to said local area network and to said telephony server for a plurality of user communication devices.

41. The server system as recited in claim 31, wherein said interface to said telephony server comprises one or more PBX extension lines, and wherein the server system is configured to provide PBX extension functionality to said remote site.

42. The server system as recited in claim 31, wherein the server system is configured to create three communication channels to said user communication device: a data channel, a voice channel, and a telephony control data channel.

43. The server system as recited in claim 31, wherein in response to the user communication device establishing a connection to the office site, the server system is configured to provide to the user access to said local area network and said telephony server so that the user operates substantially as if the user were physically present at the office site.

44. The server system as recited in claim 31, the server system is configured to provide the user at the remote site with the ability to send and receive email as if the user were at the office site.

45. The server system as recited in claim 31, wherein the server system is configured to provide the user at the remote site with Internet access as provided at the office site.

46. The server system as recited in claim 31, wherein the server system is configured to provide the user at the remote site with the ability to send and receive faxes as if the user were at the office site.

47. The server system as recited in claim 31, wherein the server system is configured to send fax transmissions sent to a fax number assigned to the user at the office site to said user communication device.

48. The server system as recited in claim 31, wherein in response to said user communication device establishing a connection to said office site, the server system is configured to provide the user at the remote site with a virtual presence on said local area network and said telephony server.

49. The server system as recited in claim 31, wherein the server system is configured to receive information identifying the user when the user communication device establishes a connection to the office site.

50. The server system as recited in claim 31, wherein the server system is configured to receive security information when the user communication device establishes a connection to the office site.

51. The server system as recited in claim 31, wherein said call forwarding operation is a remote access call forwarding (RACF) operation.

52. The server system as recited in claim 31, wherein the server system is configured to transmit voice and data comprised within Internet Protocol (IP) packets to the user communication device.

53. The server system as recited in claim 31, wherein the server system is firther configured to provide remote access server (RAS) functionality.

54. The server system as recited in claim 31, wherein the server system is configured to automatically cancel said call forwarding operation when said user communication device disconnects from said office site.

55. The server system as recited in claim 31, wherein the server is configured to provide the user at the remote site with the ability to make outgoing calls through said telephony server.

56. The server system as recited in claim 55, wherein the server is configured to maintain a log file which comprises information regarding each of said outgoing calls placed by the server system for the user.

57. The server system as recited in claim 31 wherein said communication link has a remote telephone number assigned to the user at said remote site.

58. The server system as recited in claim 31, wherein the server system is configured to automatically provide access to said local area network and to said telephony server for a plurality of user communication devices.

59. A method, comprising:
establishing a communication link from a remote site through a user communication device to an office site, wherein said user communication device is remote from said office site;

in response to said establishing, automatically providing access for a user at said remote site to a local area network at said office site and a telephony server at said office site;

wherein said providing access allows the user at the remote site to receive calls made to an office number assigned to the user at the office site while performing data communications with said local area network.

60. The method as recited in claim 59, wherein said providing access comprises invoking a call forwarding operation to said telephony server so that said calls made to an office number assigned to the user are forwarded to server at said office site, and said server sending said calls on to said user communication device over said communication link.

61. The method as recited in claim 60, further comprising said server automatically providing access to said local area network and to said telephony server for a plurality of user communication devices.

62. The method as recited in claim 59, wherein said telephony server comprises a private branch exchange (PBX).

63. The method as recited in claim 59, firther comprising said server communicating telephony control data between the user communication device and the telephony server over the communication link so that one or more telephony functions provided to the user at the office site are provided to the user through said user communications device.

64. The method as recited in claim 63, further comprising said server automatically providing access to said local area network and to said telephony server for a plurality of user communication devices.

65. The method as recited in claim 63, wherein said one or more telephony functions include extension dialing so that the user enters only an extension number at the remote site to call a co-worker at said office site.

66. The method as recited in claim 65, further comprising said server automatically providing access to said local area network and to said telephony server for a plurality of user communication devices.

67. The method as recited in claim 59, wherein said calls made to said office number include in-office extension calls and outside calls, so that both internal and external calls intended to reach the user at said office site are sent to the user at the remote site.

68. The method as recited in claim 63, firther comprising said server automatically providing access to said local area network and to said telephony server for a plurality of user communication devices.

69. The method as recited in claim 59, further comprising said server creating three communication channels to said user communication device: a data channel, a voice channel, and a telephony control data channel.

70. The method as recited in claim 59, firther comprising in response to the user communication device establishing a connection to the office site, said server providing to the user access to said local area network and said telephony server so that the user operates substantially as if the user were physically present at the office site.

71. The method as recited in claim 59, further comprising said server providing the user at the remote site with the ability to send and receive email as if the user were at the office site.

72. The method as recited in claim 59, further comprising said server providing the user at the remote site with Internet access as provided at the office site.

73. The method as recited in claim 59, further comprising the server providing the user at the remote site with the ability to send and receive faxes as if the user were at the office site.

74. The method as recited in claim 59, further comprising said server sending fax transmissions sent to a fax number assigned to the user at the office site to said user communication device.

75. The method as recited in claim 59, further comprising in response to said user communication device establishing a connection to said office site, said server providing the user at the remote site with a virtual presence on said local area network and said telephony server.

76. The method as recited in claim 59, further comprising said server receiving information identifying the user when the user communication device establishes a connection to the office site.

77. The method as recited in claim 59, further comprising said server receiving security information when the user communication device establishes a connection to the office site.

78. The method as recited in claim 59, wherein said call forwarding operation is a remote access call forwarding (RACF) operation.

79. The method as recited in claim 59, further comprising said server transmitting voice and data comprised within Internet Protocol (IP) packets to the user communication device to provide access to said local area network and said telephony server.

80. The method as recited in claim 59, further comprising said server providing remote access server (RAS) functionality.

81. The method as recited in claim 59, firther comprising said server automatically canceling said call forwarding operation when said user communication device disconnects from said office site.

82. The method as recited in claim 59, further comprising the server providing the user at the remote site with the ability to make outgoing calls through said telephony server.

83. The method as recited in claim 82, further comprising the server maintaining a log file which comprises information regarding each of said outgoing calls placed by said server for the user.

84. The method as recited in claim 59 wherein said communication link includes a remote telephone number assigned to the user at said remote site.

85. The method as recited in claim 59, further comprising said server automatically providing access to said local area network and to said telephony server for a plurality of user communication devices.

86. A system, comprising:

a user communications device physically located remotely from a corporate office, wherein the user communications device is operated by the remote user, wherein the user communications device is adapted for coupling to a transmission media;

wherein the user communications device transmits communications to the corporate office;

a server located at the corporate office, wherein the server is coupled to a telephony server and a local area network, wherein the server is further coupled to the transmission media, wherein the server is configured to receive communications from said user communications device;

a memory configured to store information identifying said user communication device;

a communication device configured to couple the server to the transmission media, wherein said communication device is operable for providing voice, data and telephony control information to the user communications device;

wherein communications intended for the remote user of said user communications device are forwarded from either of the telephony server or the local area network to said server which sends said communications to said user communications device;

wherein the server uses said information stored in said memory to determine if said communications received by either of the local area network or the telephony server are intended for the remote user of said user communications device.

87. The system of claim 86, wherein said server sends facsimiles received by the telephony server to said user communications device if said facsimiles are intended for the remote user of said user communications device.

88. The system of claim 86, further comprising:

a telephone coupled to said user communications device and physically located remotely from said corporate office;

wherein said server communicates said telephony control information with said user communications device; and wherein said telephone coupled to said user communications device receives said telephony control information and operates as an extension to the telephony server at said corporate office according to said received telephony control information.

89. The system of claim 88, wherein the remote user uses said telephone coupled to said user communications device to call a party when the user communications device is connected to the server, wherein the remote user operates the telephone as an extension to the telephony server.

90. The system of claim 89, wherein the corporate office further includes a plurality of telephones coupled to the telephony server, wherein each of the plurality of telephones coupled to the telephony server have a local extension, and wherein the remote user uses said telephone coupled to said user communications device to call a co-worker at the corporate office when the user communications device is connected to the server, wherein the remote user dials a local extension of a telephone associated with said co-worker.

91. The system of claim 88, wherein said telephone coupled to said user communications device and physically located remotely from said corporate office operates substantially as if said telephone were physically located in said corporate office.

92. The system of claim 88, wherein said telephone coupled to said user communications device comprises a virtual telephone executing on said user communications device.

93. The system of claim 92, wherein said virtual telephone operates substantially as if said virtual telephone were a real telephone physically located in said corporate office.

94. The system of claim 86, wherein said user communications device is operable to determine if message rate charging is in effect during communications with the corporate office, and wherein said user communications device is operable to disconnect the user communications device during periods of inactivity to reduce message rate charging.

95. The system of claim 94, wherein said user communications device is further operable to automatically reconnect to the server in response to the remote user initiating communications and in response to the user communications device not being connected to the corporate office, and wherein the user communications device communicates with the server after the user communications device automatically reconnects to the server.

96. The system of claim 94, wherein said server is further operable to automatically reconnect to the user communications device in response to an external party initiating communications and in response to the user communications device not being connected to the corporate office, and wherein the server communicates with the user communications device after the server automatically reconnects to the user communications device.

97. The system of claim 86, wherein said user communications device transmits communications including address information of said user communications device where said user communications device can be contacted, wherein said memory stores said communications address received from said user communications device, and wherein said server accesses said address information from said memory to send said communications received by either of the local area network or the telephony server which are intended for the remote user of said user communications device to said user communications device.

98. The system of claim 97, wherein said address information comprises a telephone number.

99. The system of claim 86, wherein the remote user is a telecommuter working at home, wherein the telecommuter's home has a telephone number, wherein the server is operable to instruct a telephone company central office to automatically route telephone calls made to the telephone number of the telecommuter's home to the corporate office, and wherein said telephone calls made to the telephone number of the telecommuter's home are routed through said server to said telecommuter's home.

100. The system of claim 86, wherein the user communications device operates as a node to the local area network when said user communications device is connected to said server.

101. The system of claim 86, wherein said user communications device includes an analog modem for coupling to an analog telephone line.

102. The system of claim 86, wherein said user communications device comprises a computer system including a communications device.

103. The system of claim 86, wherein the telephony server is located at the corporate office and controls a plurality of telephones, and wherein the local area network is located at the corporate office and includes a plurality of interconnected computer systems, wherein said server is coupled to said telephony server and said local area network.

104. A method, comprising:

a user communications device connecting to a corporate office;

the user communications device providing information to a server at the corporate office after said user communications device connects to the corporate office, said information including an identity of the user operating the user communications device;

a server storing said information provided by the user communications device;

and the server communicating telephony control information with said user communications device, wherein said user communications device operates as an extension to the telephony server located at the corporate office.

105. A method, comprising:

a user communications device connecting to a server at a corporate office;

the user communications device providing information to the server at the corporate office after the user communications device connecting to the corporate office, said information including an identity of the user operating said user communications device;

the server storing said information provided by the user communications device;

a telephony server in the corporate office receiving communications from a party, wherein said communications are intended for a telephone in the corporate office associated with the user of said user communications device; and the server sending said communications from said telephony server to said user communications device.

106. A method, comprising:

a user communications device connecting to a host office;

the user communications device providing information to a server at the host office after said user communications device connecting to the host office, said information including an identity of a remote user of said user communications device;

the server storing said information provided by the user communications device;

the user communications device connecting to a host office local area network, wherein said user communications device operates as a node to said local area network;

the user communications device operating as an extension of a telephony server in the host office;

the host office receiving communications from a party, wherein said communications are intended for the remote user of said user communications device; and the server automatically sending said communications from said host office to said user communications device.

107. A system, comprising:

a plurality of user communications devices physically located in a branch office, wherein the branch office is located remotely from a corporate office, wherein the user communications devices are operated by a plurality of workers at the branch office;

a branch office server physically located in the branch office and coupled to each of said plurality of user communications devices, wherein said branch office server includes one or more communications devices for coupling to a transmission media, wherein the branch office server transmits communications to the corporate office, wherein said communications include information identifying said branch office server;

a server located at the corporate office and operable for coupling to a telephony server and a local area network located in the corporate office, wherein the branch office server is operable to connect to the server, wherein the server includes:

a plurality of interfaces to transmission media, wherein one or more of said plurality of interfaces receives communications from said branch office server;

a memory for storing said information received from said branch office server, and a communication device coupled to said memory and said plurality of interfaces for providing voice, data and telephony control information to the branch office server;

wherein the server sends communications received by either of the local area network or the telephony server which are intended for workers in said branch office from either of the telephony server or the local area network to said branch office server in said branch office, wherein the server uses said information stored in said memory to determine if said communications received by either of the local area network or the telephony server are intended for one of said plurality of workers in said branch office.

108. A server system, comprising:

one or more interfaces for coupling to a telephony server and a local area network;

one or more interfaces for coupling to a transmission media, wherein the one or more interfaces for coupling to a transmission media are for receiving communications from a user communications device physically located remotely from the server system;

a memory for storing information received from a user communications device; and a communications device coupled to said memory and coupled to said one or more interfaces for coupling to a transmission media, wherein said communications device is operable to provide voice, data and telephony control information to the user communications device, wherein the server sends communications received by either of the local area network or the telephony server which are intended for the remote user of the user communications device from either of the telephony server or the local area network to the user communications device, wherein the server uses said information stored in said memory to determine if said communications received by either of the local area network or the telephony server are intended for the remote user of said user communications device.

109. A system, comprising:

a user communications device physically located remotely from a corporate office, wherein the user communications device is operated by a remote user, wherein the user communications device is adapted for coupling to a transmission media, wherein the user communications device transmits communications to the corporate office, wherein said communications include information identifying said user communications device;

a telephony server located at the corporate office, wherein the telephony server controls a plurality of telephones;

a local area network located at the corporate office, said local area network including one or more interconnected computer systems; and a server located at the corporate office and coupled to said telephony server and said local area network, wherein the user communications device is operable to connect to the server, wherein the server includes:

a plurality of inputs for coupling to transmission media, wherein one or more of said plurality of inputs receives communications from said user communications device;

a memory for storing said information received from said user communications device; and a communication device coupled to said memory for providing voice, data and telephony control information to the user communications device;

wherein the server sends communications received by either of said local area network or said telephony server which are intended for the remote user of said user communications device from either of said telephony server or said local area network to said user communications device, wherein the server uses said information stored in said memory to determine if said communications received by either of said local area network or said telephony server are intended for the remote user of said user communications device.

110. A method, comprising:

a user telephony communications device connecting to a corporate office on a communication line;

a corporate office server invoking a call forwarding operation to forward telephone calls made to a first telephone number assigned to a user which are intended for the user at the corporate office to said corporate office server; and the corporate office server communicating telephony control information with the user telephony communications device on the communication line, wherein said communicating telephony control information enables the user telephony communications device to behave as an extension to a telephony server at the corporate office;

wherein the corporate office server invokes said call forwarding operation and communicates said telephony control information in response to the user telephony communications device connecting to the corporate office.

111. A system which provides a remote user with access capabilities to a corporate office, comprising:

a user telephony communications device physically located remotely from the corporate office, wherein the user telephony communications device is operated by the remote user, wherein the user telephony communications device is adapted for coupling to a transmission medium, wherein the user telephony communications device transmits communications to the corporate office on the transmission medium, wherein said communications include information identifying the remote user;

a telephony server located at the corporate office, wherein the telephony server controls a plurality of telephones, wherein the corporate office includes a first telephone number associated with the remote user, wherein the first telephone number is used to access the remote user at the corporate office; and a server located at the corporate office and coupled to said telephony server, wherein the user telephony communications device is operable to connect to server, wherein the server includes:

at least one input for coupling to the transmission medium, wherein said at least one input receives communications from said user telephony communications device on the transmission medium;

a memory for storing said information received from said user telephony communications device; and a communication device coupled to said memory and to said at least one input for communicating with the user telephony communications device on the transmission medium;

wherein the server is operable to invoke a call forwarding operation to forward telephone calls made to said first telephone number which are intended for the user at the corporate office to said server;

wherein the server is operable to send said telephone calls made to said first telephone number and forwarded to said server to the user telephony communications device on the transmission medium;

wherein the server is operable to communicate telephony control information with the user telephony communications device on the transmission medium, wherein said telephony control information enables the user telephony communications device to behave as an extension to the telephony server at the corporate office; and wherein the server is operable to invoke said call forwarding operation and communicate said telephony control information in response to the user telephony communications device connecting to the corporate office and providing said information.

112. A system which provides a remote user with access capabilities to a corporate office, wherein the system is located at the corporate office, wherein the remote user operates a user telephony communications device physically located remotely from the corporate office, wherein the corporate office includes a first telephone number associated with the remote user, wherein the first telephone number is used to access the remote user at the corporate office, wherein the system includes:

at least one input for coupling to a transmission medium, wherein said at least one input receives communications from the user telephony communications device on the transmission medium;

a memory for storing information identifying the user telephony communications device; and a communication device coupled to the memory and to the at least one input for communicating voice and data information to the user telephony communications device on the transmission medium;

wherein the system is operable to invoke a call forwarding operation to forward telephone calls made to said first telephone number which are intended for the user at the corporate office to said system;

wherein the system is operable to send said telephone calls made to said first telephone number and forwarded to said system to the user telephony communications device on the transmission medium;

wherein the system is operable to communicate telephony control information with the user telephony communications device on the transmission medium, wherein said telephony control information enables the user telephony communications device to behave as an extension to a telephony server at the corporate office; and wherein the system is operable to invoke said call forwarding operation and communicate said telephony control information in response to the system receiving a communication from the user telephony communications device and receiving said information from the user telephony communications device.

* * * * *